United States Patent
Martinez Botella et al.

(10) Patent No.: US 12,552,797 B2
(45) Date of Patent: Feb. 17, 2026

(54) PROCESS FOR MAKING (3-[CYCLOPROPYLETHOXY(difluoro)methyl]-6-6[5-fluoro-6-(2,2,2-trifluoroethoxy-3-pyridyl]- [1,2,4]triazolo[4,3-a]pyrazine

(71) Applicant: Praxis Precision Medicines, Inc., Boston, MA (US)

(72) Inventors: Gabriel Martinez Botella, Wayland, MA (US); Andrew Mark Griffin, L'lle Bizard (CA)

(73) Assignee: Praxis Precision Medicines, Inc., Boston, MA (US)

( * ) Notice: Subject to any disclaimer, the term of this patent is extended or adjusted under 35 U.S.C. 154(b) by 785 days.

(21) Appl. No.: 17/780,570

(22) PCT Filed: Nov. 25, 2020

(86) PCT No.: PCT/US2020/062317
§ 371 (c)(1),
(2) Date: May 27, 2022

(87) PCT Pub. No.: WO2021/108625
PCT Pub. Date: Jun. 3, 2021

(65) Prior Publication Data
US 2023/0348466 A1 Nov. 2, 2023

Related U.S. Application Data

(60) Provisional application No. 62/941,322, filed on Nov. 27, 2019, provisional application No. 62/941,319, filed on Nov. 27, 2019, provisional application No. 63/001,801, filed on Mar. 30, 2020, provisional application No. 63/001,906, filed on Mar. 30, 2020, provisional application No. 63/028,229, filed on May 21, 2020, provisional application No. 63/082,857, filed on Sep. 24, 2020, provisional application No. 63/082,864, filed on Sep. 24, 2020.

(51) Int. Cl.
C07D 487/04 (2006.01)
A61K 9/14 (2006.01)
A61P 25/06 (2006.01)

(52) U.S. Cl.
CPC .............. *C07D 487/04* (2013.01); *A61K 9/14* (2013.01); *A61P 25/06* (2018.01)

(58) Field of Classification Search
CPC .................................................... C07D 487/04
USPC ......................................................... 544/350
See application file for complete search history.

(56) References Cited

U.S. PATENT DOCUMENTS

| | | |
|---|---|---|
| 3,845,770 A | 11/1974 | Theeuwes et al. |
| 4,112,095 A | 9/1978 | Allen, Jr. et al. |
| 4,230,705 A | 10/1980 | Allen, Jr. et al. |
| 4,242,515 A | 12/1980 | Trust et al. |
| 4,326,525 A | 4/1982 | Swanson et al. |
| 4,902,514 A | 2/1990 | Barclay et al. |
| 4,992,445 A | 2/1991 | Lawter et al. |
| 5,001,139 A | 3/1991 | Lawter et al. |
| 5,023,252 A | 6/1991 | Hsieh et al. |
| 5,616,345 A | 4/1997 | Geoghegan et al. |
| 5,905,079 A | 5/1999 | Sargent et al. |
| 6,589,952 B2 | 7/2003 | Bakthavatchalam et al. |
| 7,863,279 B2 | 1/2011 | Even et al. |
| 8,030,305 B2 | 10/2011 | Lu et al. |
| 8,173,654 B2 | 5/2012 | Lu et al. |
| 8,198,448 B2 | 6/2012 | Albrecht et al. |
| 8,212,041 B2 | 7/2012 | Albrecht et al. |
| 8,217,177 B2 | 7/2012 | Albrecht et al. |
| 8,524,900 B2 | 9/2013 | Albrecht et al. |
| 8,937,060 B2 | 1/2015 | Cid-Nunez et al. |
| 8,952,034 B2 | 2/2015 | Corkey et al. |
| 9,066,954 B2 | 6/2015 | Albrecht et al. |
| 9,371,329 B2 | 6/2016 | Corkey et al. |
| 10,280,184 B2 | 5/2019 | Friedman et al. |
| 11,014,931 B2 | 5/2021 | Griffin et al. |
| 11,261,188 B2 | 3/2022 | Reddy et al. |
| 11,278,535 B2 | 3/2022 | Reddy et al. |
| 11,279,700 B2 | 3/2022 | Griffin et al. |

(Continued)

FOREIGN PATENT DOCUMENTS

| | | |
|---|---|---|
| CA | 1080712 A | 7/1980 |
| CN | 102725290 A | 10/2012 |

(Continued)

OTHER PUBLICATIONS

US 8,754,103 B2, 06/2014, Corkey et al. (withdrawn)

(Continued)

*Primary Examiner* — Douglas M Willis
(74) *Attorney, Agent, or Firm* — McCarter & English, LLP; Jonathan M. Sparks; Yelena Margolin

(57) ABSTRACT

The present invention is directed to, in part, a method of making (3-[cyclopropylethoxy(difluoro)methyl]-6-[5-fluoro-6-(2,2,2-trifluoroethoxy)-3-pyridyl]-[1,2,4]triazolo[4,3-α]pyrazine (Compound 1);

Compound 1

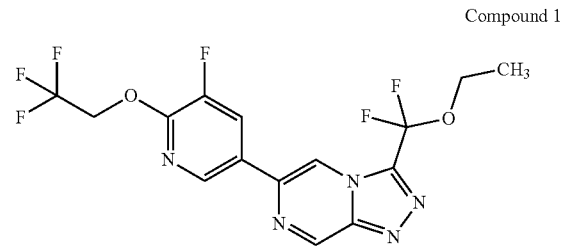

comprising reacting key synthetic intermediates and providing methods of making the same.

6 Claims, 4 Drawing Sheets

(56) References Cited

U.S. PATENT DOCUMENTS

| | | |
|---|---|---|
| 2002/0049208 A1 | 4/2002 | Bakthavatchalam et al. |
| 2008/0200536 A1 | 8/2008 | Moon et al. |
| 2009/0124609 A1 | 5/2009 | Albrecht et al. |
| 2009/0203707 A1 | 8/2009 | Rajamani et al. |
| 2010/0088778 A1 | 4/2010 | Mulley et al. |
| 2011/0021521 A1 | 1/2011 | Corkey et al. |
| 2012/0010192 A1 | 1/2012 | Kobayashi et al. |
| 2012/0065191 A1 | 3/2012 | Kiss et al. |
| 2012/0245164 A1 | 9/2012 | Auger et al. |
| 2012/0245165 A1 | 9/2012 | Auger et al. |
| 2013/0315895 A1 | 11/2013 | Farrell et al. |
| 2014/0066443 A1 | 3/2014 | Beshore et al. |
| 2014/0303158 A1 | 10/2014 | Corkey et al. |
| 2015/0038503 A1 | 2/2015 | Bourotte et al. |
| 2015/0284389 A1 | 10/2015 | Pero et al. |
| 2015/0344457 A1 | 12/2015 | Duncan et al. |
| 2016/0159801 A1 | 6/2016 | Quinn et al. |
| 2016/0235718 A1 | 8/2016 | Baraban |
| 2016/0297799 A1 | 10/2016 | Brookings et al. |
| 2016/0317536 A1 | 11/2016 | Reich et al. |
| 2019/0308938 A1 | 10/2019 | McCormack et al. |
| 2019/0389868 A1 | 12/2019 | Reddy et al. |
| 2020/0179358 A1 | 6/2020 | Reddy et al. |
| 2020/0247793 A1 | 8/2020 | Reddy et al. |
| 2020/0377499 A1 | 12/2020 | Griffin et al. |
| 2020/0377506 A1 | 12/2020 | Reddy et al. |
| 2020/0377507 A1 | 12/2020 | Griffin et al. |
| 2021/0087197 A1 | 3/2021 | Griffin et al. |
| 2021/0163488 A1 | 6/2021 | Griffin et al. |
| 2021/0171530 A1 | 6/2021 | Reddy et al. |
| 2021/0188839 A1 | 6/2021 | Reddy et al. |
| 2021/0188852 A1 | 6/2021 | Reddy et al. |
| 2021/0355118 A1 | 11/2021 | Reddy et al. |
| 2021/0403476 A1 | 12/2021 | Reddy et al. |
| 2022/0024930 A1 | 1/2022 | Griffin et al. |
| 2022/0220118 A1 | 7/2022 | Griffin et al. |
| 2023/0322790 A1 | 10/2023 | Reddy et al. |
| 2024/0132501 A1 | 4/2024 | Griffin et al. |

FOREIGN PATENT DOCUMENTS

| | | |
|---|---|---|
| EA | 201290121 A1 | 10/2012 |
| EA | 201991306 A1 | 3/2020 |
| EP | 2818471 A1 | 12/2014 |
| JP | S5340798 A | 4/1978 |
| JP | 11-503437 A | 3/1999 |
| JP | 2017001991 A1 | 1/2017 |
| JP | 7495962 B2 | 6/2024 |
| TW | 201116528 A | 5/2011 |
| WO | 2006061428 A2 | 6/2006 |
| WO | 2007075567 A1 | 7/2007 |
| WO | 2008008539 A2 | 1/2008 |
| WO | 2010053757 A1 | 5/2010 |
| WO | 2010056865 A1 | 5/2010 |
| WO | 2010074807 A1 | 7/2010 |
| WO | 2011014462 A1 | 2/2011 |
| WO | 2011056985 A2 | 5/2011 |
| WO | 2012003392 A1 | 1/2012 |
| WO | 2012065546 A1 | 5/2012 |
| WO | 2012154760 A1 | 11/2012 |
| WO | 2013006463 A1 | 1/2013 |
| WO | 2013043925 A1 | 3/2013 |
| WO | 2014179492 A1 | 11/2014 |
| WO | 2015095370 A1 | 6/2015 |
| WO | 2015158283 A1 | 10/2015 |
| WO | 2015194670 A1 | 12/2015 |
| WO | 2015197567 A1 | 12/2015 |
| WO | 2018067786 A1 | 4/2018 |
| WO | 2018098491 A1 | 5/2018 |
| WO | 2018098499 A1 | 5/2018 |
| WO | 2018098500 A1 | 5/2018 |
| WO | 2018148745 A1 | 8/2018 |
| WO | 2018187480 A1 | 10/2018 |
| WO | 2019035951 A1 | 2/2019 |
| WO | 2019232209 A1 | 12/2019 |
| WO | 2020069322 A1 | 4/2020 |
| WO | 2021108513 A1 | 6/2021 |
| WO | 2021108625 A1 | 6/2021 |

OTHER PUBLICATIONS

Young, Lee (Authorized Officer), International Search Report and Written Opinion issued Apr. 6, 2021 in corresponding International Application No. PCT/US2020/062317, 14 pages.

Flynn et al. "Correlation and Prediction of Mass Transport across Membranes I: Influence of Alkyl Chain Length on Flux-Determining Properties of Barrier and Diffusant", Journal of Pharmaceutical Sciences. 1972. vol. 61(6), pp. 838-852, especially: p. 843, col. 2, para 2.

Kahlig et al., The novel persistent sodium current inhibitor PRAX-562 has potent anticonvulsant activity with improved protective index relative to standard of care sodium channel blockers. Epilepsia. Mar. 2022;63(3):697-708.

Kolobov et al., Development of a method for the synthesis of compounds of the series 5-([1,2,4]triazolo[4,3-b]pyridazin-6-yl)benzene-1,3-diamine. Khimicheskaya Tekhnologiya. Jan. 2010;11(9):522-524.

Wang et al., Multiple Nav1.5 isoforms are functionally expressed in the brain and present distinct expression patterns compared with cardiac Nav1.5. Mol Med Rep. Jul. 2017;16(1):719-729.

Chinese Office Action for Application No. 201980047216.4, dated Sep. 24, 2024, 9 pages.

International Search Report and Written Opinion for Application No. PCT/US2023/019652, dated Sep. 21, 2023, 10 pages.

International Search Report and Written Opinion for Application No. PCT/US2023/019659, dated Sep. 28, 2023, 10 pages.

U.S. Appl. No. 16/464,468, filed May 28, 2019, U.S. Pat. No. 1,629,146.

U.S. Appl. No. 18/119,963, filed Mar. 10, 2023, 2023-0322790.

U.S. Appl. No. 17/058,187, filed Nov. 24, 2020, U.S. Pat. No. 11,866,439.

U.S. Appl. No. 17/280,485, filed Mar. 26, 2021, 2021-0403476.

U.S. Appl. No. 17/102,586, filed Nov. 24, 2020, U.S. Pat. No. 11,014,931.

U.S. Appl. No. 17/214,343, filed Mar. 26, 2021, U.S. Pat. No. 11,731,976.

U.S. Appl. No. 17/025,018, filed Mar. 23, 2022, U.S. Pat. No. 11,731,978.

U.S. Appl. No. 18/236,156, filed Aug. 21, 2023, 2024-0132501.

U.S. Appl. No. 18/860,376, filed Oct. 25, 2024.

U.S. Appl. No. 18/927,451, filed Oct. 25, 2024.

U.S. Appl. No. 18/860,406, filed Oct. 25, 2024.

De Lera Ruiz et al., Voltage-Gated Sodium Channels: Structure, Function, Pharmacology, and Clinical Indications. J Med Chem. Sep. 24, 2015;58(18):7093-118.

European Office Action for Application No. 19810530.6, dated Jan. 31, 2022, 9 pages.

International Preliminary Report on Patentability for Application No. PCT/US2017/063533, dated Jun. 6, 2019, 8 pages.

International Preliminary Report on Patentability for Application No. PCT/US2019/034653, dated Dec. 10, 2020, 8 pages.

International Preliminary Report on Patentability for Application No. PCT/US2019/053467, dated Apr. 8, 2021, 7 pages.

International Preliminary Report on Patentability for Application No. PCT/US2020/062179, dated Jun. 9, 2022, 6 pages.

International Preliminary Report on Patentability for Application No. PCT/Us2020/062317, dated Jun. 9, 2022, 12 pages.

Written Opinion of the International Searching Authority and International Search Report for PCT/US2017/063533 mailed Mar. 29, 2019 (10 pages).

Written Opinion of the International Searching Authority and International Search Report for PCT/US2017/063534 mailed Mar. 28, 2019 (11 pages).

Written Opinion of the International Searching Authority and International Search Report for PCT/US2018/00224 mailed Nov. 5, 2018 (8 pages).

(56) References Cited

OTHER PUBLICATIONS

Written Opinion of the International Searching Authority and International Search Report for PCT/US2018/018044 mailed May 24, 2018 (10 pages).
Written Opinion of the International Searching Authority and International Search Report for PCT/US2018/026099 mailed Aug. 10, 2018 (9 pages).
Written Opinion of the International Searching Authority and International Search Report for PCT/US2019/053467 mailed Jan. 14, 2020 (9 pages).
Zablocki et al. "Discovery of Dihydrobenzoxazepinone (GS-6615) Late Sodium Current Inhibitor (Late INai), a Phase II Agent with Demonstrated Preclinical Anti-Ischemic and Antiarrhythmic Properties," Journal of Medicinal Chemistry 2016) vol. 59, pp. 9005-9017.
Zaza et al., (2008). "Pathophysiology and pharmacology of the cardiac 'late sodium current'," Pharmacology & Therapeutics, 119(3):326-339.
Final Office Action received for U.S. Appl. No. 16/638,725 mailed on Apr. 2, 2021, 8 pages.
International Preliminary Report on Patentability for International Patent Application No. PCT/US2018/018044 filed on Feb. 13, 2018, 7 pages.
International Preliminary Report on Patentability for International Patent Application No. PCT/US2018/026099 filed on Apr. 4, 2018, 6 pages.
International Preliminary Report on Patentability for International Patent Application No. PCT/US2017/063507 filed on Nov. 28, 2017, 6 pages.
International Preliminary Report on Patentability for International Patent Application No. PCT/US2017/063534 filed on Nov. 28, 2017, 8 pages.
International Preliminary Report on Patentability for International Patent Application No. PCT/US2018/000224 filed on Aug. 15, 2018, 6 pages.
International Search Report and Written Opinion mailed on Feb. 25, 2021, for PCT Application No. PCT/US2020/062179 filed on Nov. 25, 2020, 7 pages.
International Search Report and Written Opinion received for International Patent Application No. PCT/US2020/062317 mailed on Apr. 6, 2021, 14 pages.
Non-Final Office Action received for U.S. Appl. No. 16/638,725 mailed on Dec. 11, 2020, 16 pages.
Non-Final Office Action received for U.S. Appl. No. 16/887,906 mailed on Jun. 10, 2021, 18 pages.
Non-Final Office Action received for U.S. Appl. No. 16/464,483 mailed on Jun. 30, 2021, 22 pages.
Non-Final Office Action received for U.S. Appl. No. 16/485,581 mailed on Mar. 10, 2021, 8 pages.
Non-Final Office Action received for U.S. Appl. No. 17/102,586 mailed on Jan. 26, 2021, 14 pages.
Written Opinion of the International Searching Authority and International Search Report for PCT/US2019/034653 mailed Aug. 9, 2019 (9 pages).
File Registry On STN, RN 1347643-11-1, Entered STN: Dec. 2, 2011.
Non-Final Office Action received for U.S. Appl. No. 16/500,795 mailed on Apr. 13, 2022, 18 pages.
Non-Final Office Action received for U.S. Appl. No. 16/885,605 mailed on Jan. 28, 2022, 10 pages.
Restriction Requirement received for U.S. Appl. No. 16/500,795 mailed on Dec. 16, 2021, 12 pages.
European Communication to Rule 62 EPC issued in European Patent Application No. 19810530.6 dated Jan. 31, 2022 (9 pages).
European Communication to Rules 70(2) and 70a(2) EPC issued in European Patent Application No. 19810530.6 dated Feb. 17, 2022 (1 page).
Thakur (Controller), Indian First Examination Report issued in Indian Patent Application No. 202017056206 dated Jun. 14, 2022, with English language translation (7 pages).
Chinese Office Action issued in Chinese Patent Application No. 201780084790.8 dated Mar. 9, 2022, with English language translation (23 pages).
Japanese Notice of Reasons for Refusal issued in Japanese Patent Application No. 2019-548536 dated Oct. 21, 2021, with English language translation (8 pages).
Eurasian Office Action issued in Eurasian Patent Application No. 201991306 dated Aug. 24, 2021, with English language translation (6 pages).
Eurasian Office Action issued in Eurasian Patent Application No. 201991306 dated Feb. 25, 2021, with English language translation (8 pages).
Eurasian Office Action issued in Eurasian Patent Application No. 202092908 dated Feb. 21, 2022, with English language translation (7 pages).
Wei, Chen (Authorized Officer), Singapore Search Report and Written Opinion issued in Singapore Patent Application No. 11202011879R dated May 6, 2022, (10 pages).
Koltun, D. O. et al., "Discovery of triazolopyridinone GS 462808, a late sodium current inhibitor (Late INai) of the cardiac NaV 1.5 channel with improved efficacy and potency relative to ranolazine". Bioorganic & Medicinal Chemistry Letters, Mar. 30, 2016, vol. 26, No. 13, pp. 3207-3211.
Albright et al. "Synthesis and anxiolytic activity of 6-(substituted-phenyl)-1,2,4-triazolo[4,3-b]pyridazines," J. Med. Chem. (1981) vol. 24, pp. 592-600.
Anderson et al. "Unexpected efficacy of a novel sodium channel modulator in Dravet Syndrome," Scientific Reports. 2017.
Anderson et al., "Antiepileptic activity of preferential inhibitors of persistent sodium current," Epilepsia (2014), 55(8), 1274-1283.
Baker et al. "The novel sodium channel modulator GS-458967 (GS967) is an effective treatment in a mouse model of SCN8A encephalopathy," Epilepsia, 2018, 1166-1176.
Barbieri et al. "Lale sodium current blocker GS967 inhibits persistent currents induced by familial hemiplegic migraine type 3 mutations of the SCN1 A gene," The Journal of Headache and Pain (2019) vol. 20, No. 107, pp. 1-13.
Belardinelli et al. "A Novel, Potent, and Selective Inhibitor of Cardiac Late Sodium Current Suppresses Experimental Arrhythmias," J. Pharmacol. Exp. Ther. (2013) vol. 344, pp. 23-32.
Berge et al., (1977). Pharmaceutical salts, J. Pharmaceutical Sciences, 66(1):1-19.
Burbano et al., (2018). "Characterization of a Novel Knock-in Mouse Model of KCNT1 Epileptic Encephalopathy (P2.273)," Neurology, 90(15 Supplement), 2 pages. Abstract Only.
Cannon, J. G., (1995). "Chapter Nineteen: Analog Design," Burger's Medicinal Chemistry and Drug Discovery, Fifth Edition, vol. I: Principles and Practice, Wiley-Interscience, pp. 783-802.
Chaplan et al., (1994). "Quantitative assessment of tactile allodynia in the rat paw," J Neurosci Meth., 53:55-63.
Dorwald, F. Z., (2005). "Side Reactions in Organic Synthesis," Wiley: VCH, Weinheim, 37 pages.
Fukaya et al., (2013). "Identification of a Novel Benzoxazolone Derivative as a Selective, Orally Active 18 kDa Translocator Protein (TSPO) Ligand," J. of Med. Chem., 56(20): 8191-8195.
Guan et al. "Synthesis and anticonvulsant activity of a new 6-alkoxy-[1,2,4]-triazolo[4,3-b]pyridazine," Eur. J. Med. Chem. (2010) vol. 45, pp. 1746-1752.
Hackam et al., (2006). "Translation of research evidence from animals to humans," JAMA, 296(14):1731-1732.
Jordan et al., (2003). "Tamoxifen: a most unlikely pioneering medicine," Nat Rev Drug Discov., 2(3):205-213.
Kearney et al., (2001 ). "A gain-of-function mutation in the sodium channel gene Scn2a results in seizures and behavioral abnormalities," Neuroscience, 702(2):307-317. Abstract Only.
Kim et al., (1992). "An experimental model for peripheral neuropathy produced by segmental spinal nerve ligation in the rat," Pain, 50:355-363.
Li et al., (2018). "Antisense oligonucleotide therapy for SCN2A gain-of-function epilepsies," American Epilepsy Society, 28 pages.
Patel et al., (2019). "Neuropathy following spinal nerve injury shares features with the irritable nociceptor phenotype: A back-translational study of oxcarbazepine," Eur J Pain, 23:183-197.

(56) References Cited

OTHER PUBLICATIONS

Petrou et al., (2018). "Abstract: Antisense oligonucleotide therapy for SCN2A gain-of-function epilepsies," American Epilepsy Society, available online at <https://www.aesnet.org/abstractslisting/antisense-oligonucleotide-therapy-for-scn2a-gain-of-function-epilepsies>, 2 pages.
PUBCHEM-CID 58763997 Create Date: Aug. 19, 2012 (14 pages).
PUBCHEM-CID 597467 Create Date: Mar. 27, 2005 (15 pages).
PUBCHEM-CID 82381512 Create Date: Oct. 20, 2014 (10 pages).
PUBCHEM-CID 89077556 Create Date: Feb. 13, 2015 (11 pages).
STN Chemical Structure Search Results dated Apr. 14, 2019 (36 pages).
STN Chemical Structure Search Results dated Apr. 2018 (55 pages).
STN Chemical Structure Search Results dated Apr. 23, 2019 (45 pages).
STN Chemical Structure Search Results dated Feb. 2018 (29 pages).
STN Chemical Structure Search Results dated Jan. 15, 2020 (22 pages).
STN Chemical Structure Search Results dated Jan. 2018 (23 pages).
STN Chemical Structure Search Results dated Mar. 20, 2018 (264 pages).
STN Chemical Structure Search Results dated Mar. 20, 2018 (83 pages).
BTN Chemical Structure Search Results dated Mar. 6, 2017 (480 pages).
STN Chemical Structure Search Results dated Mar. 6, 2017 (511 pages).
STN Chemical Structure Search Results dated May 18, 2016 (102 pages).
STN Chemical Structure Search Results dated Nov. 1, 2017 (107 pages).
STN Chemical Structure Search Results dated Nov. 21, 2017 (85 pages).
STN Chemical Structure Search Results dated Nov. 3, 2017 (57 pages).
STN Chemical Structure Search Results dated Nov. 6, 2017 (123 pages).
STN Chemical Structure Search Results dated Nov. 6, 2017 (7 pages).
Venkatesh et al., (2000). "Role of the development scientist in compound lead selection and optimization," J Pharm Sci., 89(2):145-54.
Wagnon et al., (2015). "Convulsive seizures and SUDEP in a mouse model of SCN8A epileptic encephalopathy," Human Molecular Genetics, 24(2):506-515.
Wilen et al., (1977). "Strategies in optical resolutions," Tetrahedron, 33(21):2725-2736.
Woodland et al., (2015). "Discovery of Inhibitors of Trypanosoma brucei by Phenotypic Screening of a Focused Protein Kinase Library," ChemMedChem, 10(11): 1809-1820.
Wengert et al. "Prax330 reduces persistent and resurgent sodium channel currents and neuronal hyperexcitability of subiculum neurons in a mouse model of SCN8A epileptic encephalopathy," Neuropharmacology (2019) vol. 158, No. 107699, pp. 1-11.
Written Opinion of the International Searching Authority and International Search Report for PCT/US2017/063507 mailed Mar. 29, 2019 (9 pages).

PROCESS FOR MAKING (3-[CYCLOPROPYLETHOXY (difluoro)methyl]-6-6[5-fluoro-6-(2,2,2-trifluoroethoxy-3-pyridyl]-[1,2,4]triazolo[4,3-a]pyrazine

CROSS-REFERENCE TO RELATED APPLICATIONS

This application is a U.S. National Stage Application of PCT/US2020/062317, filed Nov. 25, 2020, which claims the benefit of U.S. Provisional Patent Application No. 62/941,322, filed Nov. 27, 2019; U.S. Provisional Patent Application No. 62/941,319, filed Nov. 27, 2019; U.S. Provisional Patent Application No. 63/001,906, filed Mar. 30, 2020; U.S. Provisional Patent Application No. 63/001,801, filed Mar. 30, 2020; U.S. Provisional Patent Application No. 63/028,229, filed May 21, 2020; U.S. Provisional Patent Application No. 63/082,864, filed Sep. 24, 2020; and U.S. Provisional Patent Application No. 63/082,857, filed Sep. 24, 2020, the entire contents of each of which are incorporated by reference herein.

BACKGROUND

Sodium ion (Na+) channels primarily open in a transient manner and are quickly inactivated, thereby generating a fast Na+ current to initiate the action potential. The late or persistent sodium current (INaL) is a sustained component of the fast Na+ current of cardiac myocytes and neurons. Many common neurological and cardiac conditions are associated with abnormal INaL enhancement, which contributes to the pathogenesis of both electrical and contractile dysfunction in mammals (see, e.g., *Pharmacol Ther* (2008) 119:326-339). Accordingly, pharmaceutical compositions or dosage forms comprising compounds that selectively modulate sodium channel activity, e.g., abnormal INaL, are useful in treating such disease states.

SUMMARY

Described herein are compositions or dosage forms useful for preventing and/or treating a disease, disorder, or condition, e.g., a disease, disorder, or condition relating to aberrant function of a sodium ion channel, e.g., abnormal late sodium current (INaL). The present disclosure also comprises methods for modulating the sodium channel activity using a compound, composition, or dosage form described herein. Also provided herein is a method of preparing ion channel modulators.

In one aspect, the present disclosure provides a dosage form comprising: from about 0.1 mg to about 500 mg (e.g., from about 0.5 mg to about 200 mg, from about 1 mg to about 150 mg, from about 10 mg to about 120 mg) of Compound 1; and a pharmaceutically acceptable excipient.

In another aspect, the present disclosure provides a dosage form comprising: a plurality of particles of Compound 1; and a pharmaceutically acceptable excipient, wherein the amount of the plurality of particles of Compound 1 in the dosage form is from about 0.1 mg to about 500 mg (e.g., from about 0.5 mg to about 200 mg, from about 1 mg to about 150 mg, from about 10 mg to about 120 mg).

In one aspect, the present disclosure provides a composition in a dosage form comprising: from about 0.1 mg to about 500 mg (e.g., from about 0.5 mg to about 200 mg, from about 1 mg to about 150 mg, from about 10 mg to about 120 mg) of Compound 1; and a pharmaceutically acceptable excipient.

In another aspect, the present disclosure provides a composition in a dosage form comprising: a plurality of particles of Compound 1; and a pharmaceutically acceptable excipient, wherein the amount of the plurality of particles of Compound 1 in the composition is from about 0.1 mg to about 500 mg (e.g., from about 0.5 mg to about 200 mg, from about 1 mg to about 150 mg, from about 10 mg to about 120 mg). In another aspect, provided herein is a method of treating a condition relating to aberrant function of a sodium ion channel in a subject in need thereof, comprising administering to the subject a dosage form disclosed herein. Also provided herein is a method of treating a condition relating to aberrant function of a sodium ion channel in a subject in need thereof, comprising administering to the subject from about 2.5 mg to about 90 mg of Compound 1. In some embodiments, the condition is a neurological or psychiatric disorder In some embodiments, the condition is epilepsy or an epilepsy syndrome. In some embodiments, the condition is a genetic epilepsy or a genetic epilepsy syndrome. In some embodiments, the condition is a pediatric epilepsy or a pediatric epilepsy syndrome. In some embodiments, the condition is epileptic encephalopathy. In some embodiments, the condition is developmental. In some embodiments, the epileptic encephalopathy is selected from the group consisting of Dravet syndrome, infantile spasms, or Lennox-Gastaut syndrome. In other embodiments, the condition is selected from the group consisting of epileptic encephalopathy, epileptic encephalopathy with SCN1A, SCN2A, SCN8A mutations, early infantile epileptic encephalopathy, Dravet syndrome, Dravet syndrome with SCN1A mutation, generalized epilepsy with febrile seizures, intractable childhood epilepsy with generalized tonic-clonic seizures, infantile spasms, benign familial neonatal-infantile seizures, SCN2A epileptic encephalopathy, focal epilepsy with SCN3A mutation, cryptogenic pediatric partial epilepsy with SCN3A mutation, SCN8A epileptic encephalopathy, sudden unexpected death in epilepsy, Rasmussen encephalitis, malignant migrating partial seizures of infancy, autosomal dominant nocturnal frontal lobe epilepsy, sudden expected death in epilepsy (SUDEP), KCNQ2 epileptic encephalopathy, and KCNT1 epileptic encephalopathy. In some embodiments, the condition is a cancer.

Also provided herein is a method of treating a neurological disorder or a psychiatric disorder in a subject in need thereof, wherein the method comprises administering to a subject in need thereof a dosage form disclosed herein.

The disclosure provides, in part, a method of treating a pain in a subject in need thereof, wherein the method comprises administering to the subject a dosage form disclosed herein.

Contemplated methods include a method of treating a cancer in a subject in need thereof, wherein the method comprises administering to the subject a dosage form disclosed herein.

In another aspect, provided herein is a method of treating or preventing a trigeminal autonomic cephalalgia (TAC) in a subject in need thereof, comprising administering to the subject a therapeutically effective amount of a dosage form disclosed herein.

Also provided herein is a method of treating or preventing a trigeminal autonomic cephalalgia (TAC) in a subject in need thereof, comprising administering to the subject a therapeutically effective amount of Compound 1, e.g., from about 2.5 mg to about 90 mg of Compound 1.

In another aspect, provided herein is a method of treating or preventing a migraine in a subject in need thereof, comprising administering to the subject a therapeutically effective amount of a dosage form disclosed herein.

Provided herein, in part, is a method of treating or preventing a migraine in a subject in need thereof, comprising administering to the subject a therapeutically effective amount of Compound 1, e.g., from about 2.5 mg to about 90 mg of Compound 1.

In another aspect, a method of treating or preventing cortical spreading depression (CSD) in a subject in need thereof, comprising administering to the subject a therapeutically effective amount of a dosage form disclosed herein is provided.

A method of treating or preventing cortical spreading depression (CSD) in a subject in need thereof, comprising administering to the subject a therapeutically effective amount of Compound 1, e.g., from about 2.5 mg to about 90 mg is also provided.

Also provided herein is a method of treating or preventing a cranial neuropathy or multiple cranial neuropathies in a subject in need thereof, comprising administering to the subject a therapeutically effective amount of a dosage form described herein.

In another aspect, a method of treating or preventing a cranial neuropathy or multiple cranial neuropathies in a subject in need thereof, comprising administering to the subject a therapeutically effective amount of Compound 1, e.g., from 2.5 mg to about 90 mg of Compound 1.

In another aspect, the present disclosure provides a method of making Compound 1:

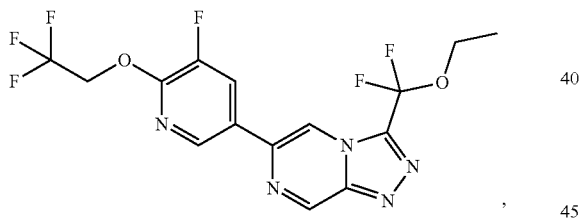

or a pharmaceutically acceptable salt thereof, the method comprising the steps of:

(i) contacting a solution of 2,2,2-trifluoroethanol with 5-bromo-2,3-difluoro-pyridine thereby providing a compound of formula (II):

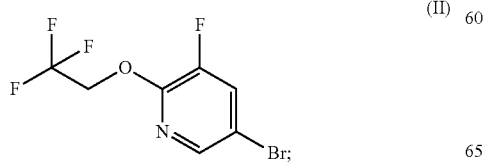

(ii) contacting the compound of formula (II) with a palladium catalyst and bis(pinacolato)diboron thereby providing a compound of formula (III):

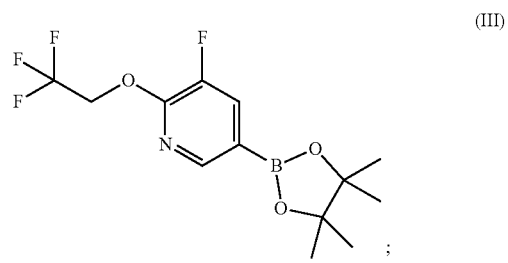 [SMILES: CC1(C)OB(c2cnc(OCC(F)(F)F)c(F)c2)OC1(C)C]

(iii) contacting the compound of formula (III) with a palladium catalyst and 2-bromo-5-chloro-pyrazine thereby providing a compound of formula (IV):

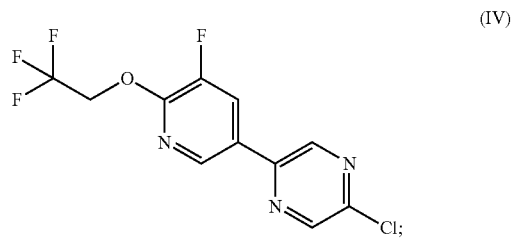 [SMILES: Fc1cc(-c2cnc(Cl)cn2)cnc1OCC(F)(F)F]

(iv) contacting the compound of formula (IV) with hydrazine thereby providing a compound of formula (V):

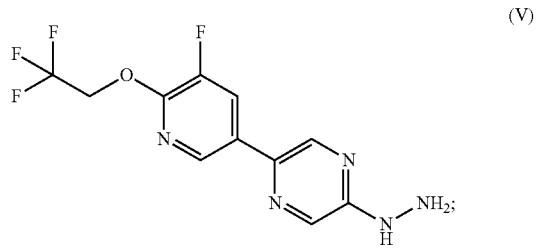 [SMILES: NNc1cnc(-c2cnc(OCC(F)(F)F)c(F)c2)cn1]

(v) contacting the compound of formula (V) with 2-bromo-2,2-difluoro-acetyl chloride thereby providing a compound of formula (VI):

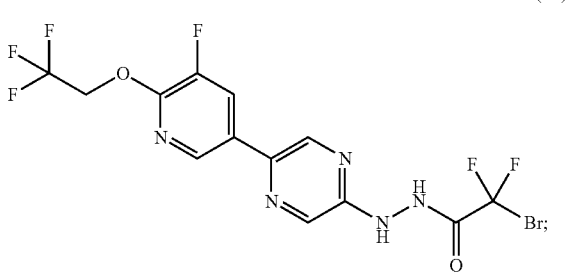

(vi) contacting the compound of formula (VI) with an acid thereby providing a compound of formula (VII):

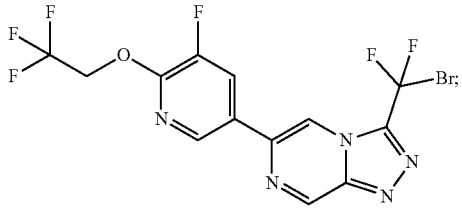

(vii) contacting the compound of formula (VII) with a silver catalyst and ethanol thereby providing Compound 1 or a pharmaceutically acceptable salt thereof.

In another aspect, the present disclosure provides a method of making Compound 1:

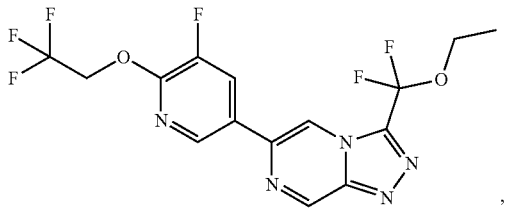 [SMILES: CCOC(F)(F)c1nnc2cnc(-c3cnc(OCC(F)(F)F)c(F)c3)cn12]

or a pharmaceutically acceptable salt thereof, wherein Compound 1 or a pharmaceutically acceptable salt thereof is provided by contacting the compound of formula (VII):

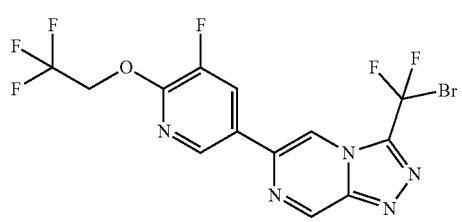

with a silver catalyst and ethanol.

Other objects and advantages will become apparent to those skilled in the art from a consideration of the ensuing Brief Description of the Figures, Detailed Description, Examples, and Claims.

DETAILED DESCRIPTION

Figure 1:
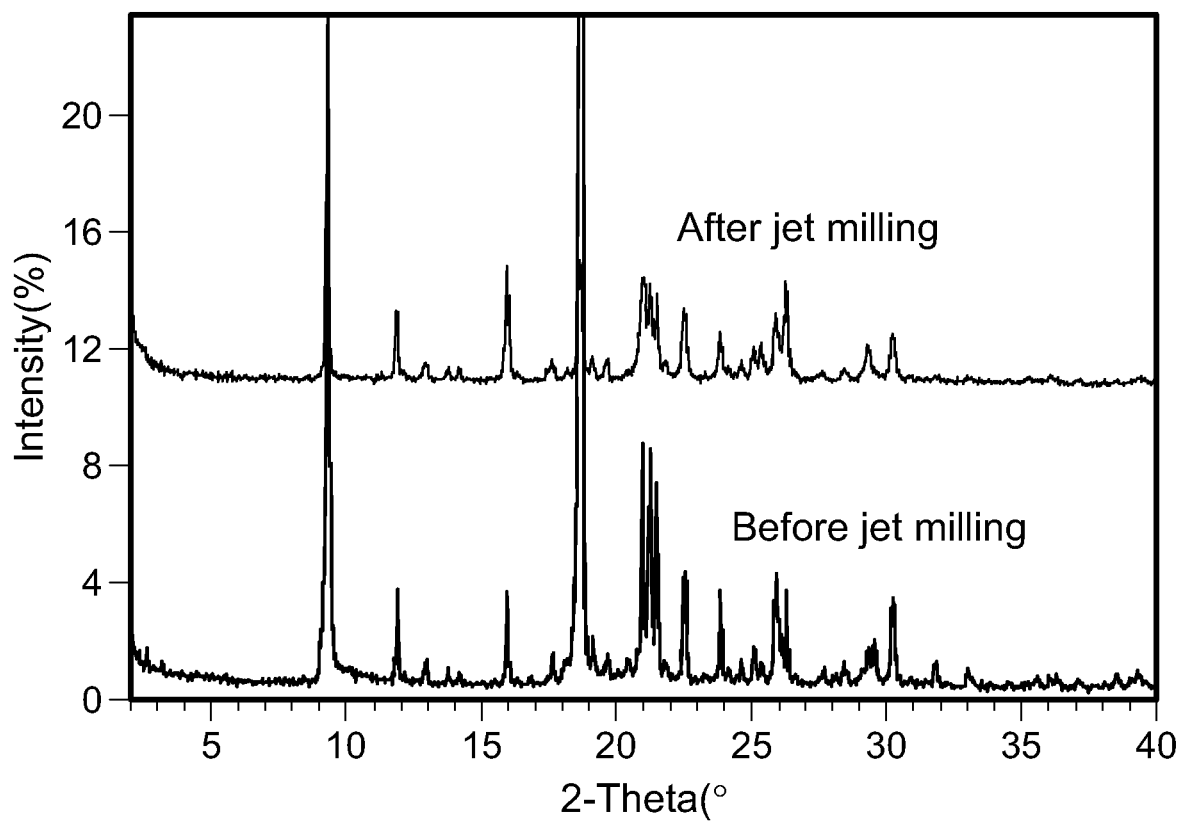
FIG. 1 shows the XRPD pattern of Compound 1 raw material and Compound 1 post jet-milling.

As generally described herein, the present disclosure provides, in part, compounds, compositions and dosage or dosage forms useful for preventing and/or treating a disease, disorder, or condition described herein, e.g., a disease, disorder, or condition relating to aberrant function of a sodium ion channel, such as abnormal late sodium current (INaL). Exemplary diseases, disorders, or conditions include a neurological disorder (e.g., epilepsy or an epilepsy syndrome, a neurodevelopmental disorder or a neuromuscular disorder), a psychiatric disorder, pain, a gastrointestinal disorder, trigeminal autonomic cephalalgia (TAC), migraine, cranial neuropathy or multiple cranial neuropathy, and cortical spreading depression (CSD). Also provided herein are methods of preparing ion channel modulators.

Definitions

As used herein, "pharmaceutically acceptable carrier" refers to a non-toxic carrier, adjuvant, or vehicle that does not destroy the pharmacological activity of the compound with which it is formulated. Pharmaceutically acceptable carriers, adjuvants or vehicles that may be used in the compositions described herein include, but are not limited to, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol and wool fat.

As used herein, "pharmaceutically acceptable salt" refers to those salts which are, within the scope of sound medical judgment, suitable for use in contact with the tissues of humans and lower animals without undue toxicity, irritation, allergic response and the like, and are commensurate with a reasonable benefit/risk ratio. Pharmaceutically acceptable salts are well known in the art. For example, Berge et al., describes pharmaceutically acceptable salts in detail in J. Pharmaceutical Sciences (1977) 66:1-19. Pharmaceutically acceptable salts of the compounds of this invention include those derived from suitable inorganic and organic acids and bases. Examples of pharmaceutically acceptable, nontoxic acid addition salts are salts of an amino group formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid or malonic acid or by using other methods used in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Pharmaceutically acceptable salts derived from appropriate bases include alkali metal, alkaline earth metal, ammonium and $N^+(C_{1-4}alkyl)_4$ salts. Representative alkali or alkaline earth metal salts include sodium, lithium, potassium, calcium, magnesium, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, lower alkyl sulfonate, and aryl sulfonate.

As used herein, a "subject" to which administration is contemplated includes, but is not limited to, humans (i.e., a male or female of any age group, e.g., a pediatric subject (e.g, infant, child, adolescent) or adult subject (e.g., young adult, middle-aged adult or senior adult)) and/or a non-human animal, e.g., a mammal such as primates (e.g., cynomolgus monkeys, rhesus monkeys), cattle, pigs, horses, sheep, goats, rodents, cats, and/or dogs. In certain embodiments, the subject is a human. In certain embodiments, the subject is a non-human animal. The terms "human," "patient," and "subject" are used interchangeably herein.

Disease, disorder, and condition are used interchangeably herein.

As used herein, and unless otherwise specified, the terms "treat," "treating," and "treatment" contemplate an action that occurs while a subject is suffering from the specified disease, disorder or condition, which reduces the severity of the disease, disorder or condition, or retards or slows the progression of the disease, disorder or condition (also "therapeutic treatment").

As used herein, the "effective amount" of a compound refers to an amount sufficient to elicit the desired biological response. As will be appreciated by those of ordinary skill in this art, the effective amount of a compound of the invention may vary depending on such factors as the desired biological endpoint, the pharmacokinetics of the compound, the disease being treated, the mode of administration, and the age, health, and condition of the subject. An effective amount encompasses therapeutic and prophylactic treatment.

As used herein, and unless otherwise specified, a "therapeutically effective amount" of a compound is an amount sufficient to provide a therapeutic benefit in the treatment of a disease, disorder or condition, or to delay or minimize one or more symptoms associated with the disease, disorder or condition. A therapeutically effective amount of a compound means an amount of therapeutic agent, alone or in combination with other therapies, which provides a therapeutic benefit in the treatment of the disease, disorder or condition. The term "therapeutically effective amount" can encompass an amount that improves overall therapy, reduces or avoids symptoms or causes of disease or condition, or enhances the therapeutic efficacy of another therapeutic agent.

As used herein, the term "amorphous" refers to a solid in a non-crystalline state. Amorphous solids generally possess crystal-like short range molecular arrangement, but no long range order of molecular packing as found in crystalline solids. The solid state form of a solid may be determined by polarized light microscopy, X-Ray powder diffraction ("XRPD"), differential scanning calorimetry ("DSC"), or other standard techniques known to those of skill in the art.

As used herein, "crystalline" refers to a solid having a highly regular chemical structure, i.e., having long range structural order in the crystal lattice. The molecules are arranged in a regular, periodic manner in the 3-dimensional space of the lattice. In particular, a crystalline form may be produced as one or more single crystalline forms.

The term "peaks" when referring to the peaks in an XRPD pattern of a crystalline form of Compound 1 refers to a collection of certain peaks whose values of 2θ across a range of 0°-40° are, as a whole, uniquely assigned to one of the crystalline forms of Compound 1.

As used herein, the phrase "amorphous solid dispersion" refers to a solid comprising a drug substance (e.g., Compound 1) and a dispersion polymer.

The phrase "dispersion polymer" means a polymer that allows for the drug substance (e.g., Compound 1) to be dispersed throughout such that a solid dispersion may form. The dispersion polymer may contain a mixture of two or more polymers. Examples of dispersion polymers include, but are not limited to, vinyl polymers and copolymers, vinylpyrrolidine vinylacetate copolymer ("PVP-VA"), polyvinyl alcohols, polyvinyl alcohol polyvinyl acetate copolymers, polyvinyl pyrrolidine ("PVP"), acrylate and methacrylate copolymers, methylacrylic acid methyl methacrylate copolymer (such as Eudragit®), polyethylene polyvinyl alcohol copolymers, polyoxyethylene-polyoxypropylene block copolymers (also referred to as poloxamers), graft copolymer comprised of polyethylene glycol, polyvinyl caprolactam and polyvinyl acetate (such as Soluplus®), cellulosic polymers, such as hydroxypropyl methyl cellulose acetate ("HPMCA"), hydroxypropyl methyl cellulose ("HPMC"), hydroxypropyl cellulose ("HPC"), methyl cellulose, hydroxyethyl methyl cellulose, hydroxyethyl cellulose, hydroxyethyl cellulose acetate, and hydroxyethyl ethyl cellulose, hydroxypropyl methyl cellulose acetate succinate ("HPMCAS"), hydroxypropyl methyl cellulose phthalate ("HPMCP"), carboxymethylethyl cellulose ("CMEC"), cellulose acetate phthalate ("CAP"), cellulose acetate succinate ("CAS"), hydroxypropyl methyl cellulose acetate phthalate ("HPMCAP"), cellulose acetate trimellitate ("CAT"), hydroxypropyl methyl cellulose acetate trimellitate ("HPMCAT"), and carboxymethylcellulose acetate butyrate ("CMCAB"), and the like.

As used herein, the terms "stable" and "stability" refer to mean that the evolution of the drug substance (e.g., Compound 1) with time and/or under specific environmental conditions (e.g., temperature, humidity, etc.) has no significant effects on its quality, safety and/or efficacy for a given time period. It can be measured through the formation of degradation products (impurities), variation of pH, appearance, microbial growth, and/or color as exemplified in the experimental section. Typically, compositions according to the invention are considered as stable if at least 95% of the initial concentration of each of the drug substance is found after 4 weeks at 25° C., and/or if no substantial change in the appearance of the solution is observed during such a period of time and under such temperature conditions. Stability may be assessed under a range of relative humidity (RH) conditions, typically between 60 and 75% RH.

As used herein, the term "particle size" is defined as the diameter of a particle as determined by Sympatec particle size analyzer.

Compounds

Described herein are pharmaceutical compositions or dosage forms comprising compounds that are useful for preventing and/or treating a disease, disorder, or condition, e.g., a disease, disorder, or condition relating to aberrant function of a sodium ion channel, e.g., abnormal late sodium current (INaL).

In one aspect, the present disclosure is directed to a dosage form comprising Compound 1 represented by:

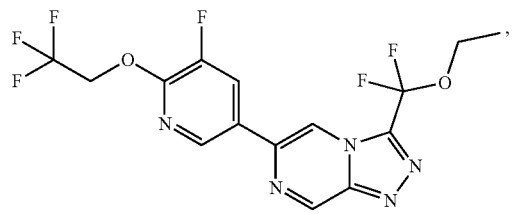 [SMILES: CCOC(F)(F)c1nnc2cnc(-c3cnc(OCC(F)(F)F)c(F)c3)cn12]

and a pharmaceutically acceptable excipient. In some embodiments, Compound 1 is crystalline. In some embodiments, the crystalline form exhibits an X-ray powder diffraction pattern comprising peaks at the following diffraction angles (2θ): 12.6±0.2, 15.8±0.2, and 18.6±0.2. In some embodiments, the crystalline form exhibits an X-ray powder diffraction pattern comprising peaks at the following diffraction angles (2θ): 10.7±0.2, 12.3±0.2, 12.6±0.2, 15.8±0.2, 18.6±0.2, and 22.6±0.2. In some embodiments, the crystalline form exhibits an X-ray powder diffraction pattern comprising peaks at the following diffraction angles (2θ): 10.7±0.2, 12.3±0.2, 12.6±0.2, 14.9±0.2, 15.8±0.2, 16.6±0.2, 16.8±0.2, 18.6±0.2, 21.0±0.2 and 22.6±0.2. In some embodiments, the crystalline form exhibits an X-ray powder diffraction pattern substantially the same as depicted in FIG. 1.

In some embodiments, Compound 1 is amorphous.

Dosage Forms and Compositions

In one aspect, the present disclosure features dosage forms or compositions useful for preventing and/or treating a disease, disorder, or condition described herein, e.g., a disease, disorder, or condition relating to aberrant function of a sodium ion channel, such as abnormal late sodium current (INaL).

This invention provides pharmaceutical compositions that contain, as the active ingredient, a compound described herein (e.g., Compound 1), or a pharmaceutically acceptable salt thereof, and one or more pharmaceutically acceptable excipients, carriers, including inert solid diluents and fillers, diluents, including sterile aqueous solution and various organic solvents, permeation enhancers, solubilizers and adjuvants. The pharmaceutical compositions may be administered alone or in combination with other therapeutic agents. Such compositions are prepared in a manner well known in the pharmaceutical art (see, e.g., Remington's Pharmaceutical Sciences, Mace Publishing Co., Philadelphia, Pa. 17th Ed. (1985); and Modern Pharmaceutics, Marcel Dekker, Inc. 3rd Ed. (G. S. Banker & C. T. Rhodes, Eds.)

The pharmaceutical compositions may be administered in either single or multiple doses by any of the accepted modes of administration of agents having similar utilities, for example as described in those patents and patent applications incorporated by reference, including rectal, buccal, intranasal and transdermal routes, by intra-arterial injection, intravenously, intraperitoneally, parenterally, intramuscularly, subcutaneously, orally, topically, as an inhalant, or via an impregnated or coated device such as a stent, for example, or an artery-inserted cylindrical polymer.

One mode for administration is parenteral, particularly by injection. The forms in which the novel compositions of the present invention may be incorporated for administration by injection include aqueous or oil suspensions, or emulsions, with sesame oil, corn oil, cottonseed oil, or peanut oil, as well as elixirs, mannitol, dextrose, or a sterile aqueous solution, and similar pharmaceutical vehicles. Aqueous solutions in saline are also conventionally used for injection, but less preferred in the context of the present invention. Ethanol, glycerol, propylene glycol, liquid polyethylene glycol, and the like (and suitable mixtures thereof), cyclodextrin derivatives, and vegetable oils may also be employed. The proper fluidity can be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like.

Sterile injectable solutions are prepared by incorporating a compound according to the present invention in the required amount in the appropriate solvent with various other ingredients as enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

Oral administration is another route for administration of compounds in accordance with the invention. Administration may be via capsule or tablets, or the like. In making the pharmaceutical compositions that include at least one compound described herein, the active ingredient is usually diluted by an excipient and/or enclosed within such a carrier that can be in the form of a capsule, sachet, paper or other container. When the excipient serves as a diluent, it can be in the form of a solid, semi-solid, or liquid material (as above), which acts as a vehicle, carrier or medium for the active ingredient. Thus, the compositions can be in the form of tablets, pills, powders, lozenges, sachets, cachets, elixirs, suspensions, emulsions, solutions, syrups, aerosols (as a solid or in a liquid medium), ointments containing, for example, up to 10% by weight of the active compound, soft and hard gelatin capsules, sterile injectable solutions, and sterile packaged powders.

Some examples of suitable excipients include lactose, dextrose, sucrose, sorbitol, mannitol, starches, gum acacia, calcium phosphate, alginates, tragacanth, gelatin, calcium silicate, microcrystalline cellulose, polyvinylpyrrolidone, cellulose, sterile water, syrup, and methyl cellulose. The formulations can additionally include: lubricating agents such as talc, magnesium stearate, and mineral oil; wetting agents; emulsifying and suspending agents; preserving agents such as methyl and propylhydroxy-benzoates; sweetening agents; and flavoring agents.

The compositions of the invention can be formulated so as to provide quick, sustained or delayed release of the active ingredient after administration to the patient by employing procedures known in the art. Controlled release drug delivery systems for oral administration include osmotic pump systems and dissolutional systems containing polymer-coated reservoirs or drug-polymer matrix formulations. Examples of controlled release systems are given in U.S. Pat. Nos. 3,845,770; 4,326,525; 4,902,514; and 5,616,345. Another formulation for use in the methods of the present invention employs transdermal delivery devices ("patches"). Such transdermal patches may be used to provide continuous or discontinuous infusion of the compounds of the present invention in controlled amounts. The construction and use of transdermal patches for the delivery of pharmaceutical agents is well known in the art. See, e.g., U.S. Pat. Nos. 5,023,252, 4,992,445 and 5,001,139. Such patches may be constructed for continuous, pulsatile, or on demand delivery of pharmaceutical agents.

The compositions are preferably formulated in a unit dosage form. The term "unit dosage forms" refers to physically discrete units suitable as unitary dosages for human subjects and other mammals, each unit containing a predetermined quantity of active material calculated to produce the desired therapeutic effect, in association with a suitable pharmaceutical excipient (e.g., a tablet, capsule, ampoule). The compounds are generally administered in a pharmaceutically effective amount. Preferably, for oral administration, each dosage unit contains from 1 mg to 2 g of a compound described herein, and for parenteral administration, preferably from 0.1 to 700 mg of a compound a compound described herein. It will be understood, however, that the amount of the compound actually administered usually will be determined by a physician, in the light of the relevant circumstances, including the condition to be treated, the chosen route of administration, the actual compound administered and its relative activity, the age, weight, and response of the individual patient, the severity of the patient's symptoms, and the like.

For preparing solid compositions such as tablets, the principal active ingredient is mixed with a pharmaceutical excipient to form a solid preformulation composition containing a homogeneous mixture of a compound of the present invention. When referring to these preformulation compositions as homogeneous, it is meant that the active ingredient is dispersed evenly throughout the composition so that the composition may be readily subdivided into equally effective unit dosage forms such as tablets, pills and capsules.

The tablets or pills of the present invention may be coated or otherwise compounded to provide a dosage form affording the advantage of prolonged action, or to protect from the acid conditions of the stomach. For example, the tablet or pill can comprise an inner dosage and an outer dosage component, the latter being in the form of an envelope over the former. The two components can be separated by an enteric layer that serves to resist disintegration in the stomach and permit the inner component to pass intact into the duodenum or to be delayed in release. A variety of materials can be used for such enteric layers or coatings, such materials including a number of polymeric acids and mixtures of polymeric acids with such materials as shellac, cetyl alcohol, and cellulose acetate.

Compositions for inhalation or insufflation include solutions and suspensions in pharmaceutically acceptable, aqueous or organic solvents, or mixtures thereof, and powders. The liquid or solid compositions may contain suitable pharmaceutically acceptable excipients as described supra. Preferably, the compositions are administered by the oral or nasal respiratory route for local or systemic effect. Compositions in preferably pharmaceutically acceptable solvents may be nebulized by use of inert gases. Nebulized solutions may be inhaled directly from the nebulizing device or the nebulizing device may be attached to a facemask tent, or intermittent positive pressure breathing machine. Solution, suspension, or powder compositions may be administered, preferably orally or nasally, from devices that deliver the formulation in an appropriate manner.

In one aspect, provided herein is a dosage form or a composition in a dosage form comprising: from about 0.1 mg to about 500 mg (e.g., from about 0.5 mg to about 200 mg, from about 1 mg to about 150 mg, from about 10 mg to about 120 mg) of Compound 1; and a pharmaceutically acceptable excipient.

In some embodiments, the dosage form or a composition in a dosage form comprises from about 2.5 mg to about 150 mg (e.g., from about 10 mg to about 150 mg, from about 20 mg to about 150 mg, from about 40 mg to about 150 mg, from about 60 mg to about 150 mg, from about 80 mg to about 150 mg, from about 100 mg to about 150 mg, from about 10 mg to about 120 mg, from about 20 mg to about 120 mg, from about 40 mg to about 120 mg, from about 60 mg to about 120 mg, from about 80 mg to about 120 mg, from about 100 mg to about 120 mg, from about 10 mg to about 100 mg, from about 20 mg to about 100 mg, from about 40 mg to about 100 mg, from about 60 mg to about 100 mg, from about 80 mg to about 100 mg, from about 10 mg to about 80 mg, from about 20 mg to about 80 mg, from about 40 mg to about 80 mg, from about 60 mg to about 80 mg, from about 10 mg to about 60 mg, from about 20 mg to about 60 mg, from about 40 mg to about 60 mg, from about 70 mg to about 120 mg, from about 70 mg to about 100 mg, from about 50 mg to about 120 mg, from about 50 mg to 90 mg, from about 30 mg to about 120 mg, from about 30 mg to about 60 mg, from about 30 mg to about 80 mg, from about 30 mg to about 100 mg) of Compound 1.

In some embodiments, the dosage form or a composition in a dosage form comprises from about 1 mg to about 100 mg (e.g., 1 from about 1 mg to about 80 mg, from about 1 mg to about 50 mg, from about 1 mg to about 20 mg, from about 1 mg to about 10 mg, from about 1 mg to about mg, from about 5 mg to about 100 mg, from about 5 mg to about 80 mg, from about 5 mg to about 50 mg, from about 5 mg to about 20 mg) of Compound 1.

In some embodiments, the dosage form or a composition in a dosage form comprises about 200 mg, 190 mg, 180 mg, 170 mg, 160 mg, 150 mg, 140 mg, 130 mg, 120 mg, 110 mg, 100 mg, about 99 mg, about 98 mg, about 97 mg, about 96 mg, about 95 mg, about 94 mg, about 93 mg, about 92 mg, about 91 mg, about 90 mg, about 85 mg, about 80 mg, about 75 mg, about 70 mg, about 69 mg, about 68 mg, about 67 mg, about 66 mg, about 65 mg, about 64 mg, about 63 mg, about 62 mg, about 61 mg, about 60 mg, about 59 mg, about 58 mg, about 57 mg, about 56 mg, about 55 mg, about 54 mg, about 53 mg, about 52 mg, about 51 mg, about 50 mg, about 45 mg, about 40 mg, about 35 mg, about 30 mg, about 25 mg, about 20 mg, about 15 mg, about 10 mg, about 7 mg about 5 mg about 2.5 mg, about 2 mg about 1.5 mg, or about 1 mg of Compound 1.

In another aspect, the present disclosure provides a dosage form or a composition in a dosage form comprising: a plurality of particles of Compound 1; and a pharmaceutically acceptable excipient, wherein the amount of the plurality of particles of Compound 1 in the dosage form is from about 0.1 mg to about 500 mg (e.g., from about 0.5 mg to about 200 mg, from about 1 mg to about 150 mg, from about 10 mg to about 120 mg).

In some embodiments, the plurality of particles of Compound 1 in the dosage form or composition is from about 2.5 mg to about 150 mg (e.g., from about 10 mg to about 150 mg, from about 20 mg to about 150 mg, from about 70 mg to about 120 mg, from about 30 mg to about 60 mg, about 100 mg, about 50 mg).

In certain embodiments, 10% of the plurality of particles of Compound 1 have a particle size of less than about 1 μm. In other embodiments, 50% of the plurality of particles of Compound 1 have a particle size of less than about 4 μm. In some embodiments, 50% of the plurality of particles of Compound 1 have a particle size of less than about 2 μm. In certain embodiments, 90% of the plurality of particles of Compound 1 have a particle size of less than about 30 μm (e.g., less than about 15 μM). In other embodiments, 90% of the plurality of particles of Compound 1 have a particle size of less than about 5 μm. In some embodiments, 90% of the plurality of particles of Compound 1 have a particle size of from about 4 μm to 15 μM.

In some embodiments, 10% of the plurality of particles of Compound 1 have a particle size of less than about 1 μm, 50% of the plurality of particles of Compound 1 have a particle size of less than about 4 μm and 90% of the plurality of particles of Compound 1 have a particle size of less than about 30 μm.

In some embodiments, the dosage form or the composition is configured for oral administration.

In some embodiments, the dosage form is a solid form.

In some embodiments, the dosage form is in the form of a capsule.

In some embodiments, the pharmaceutical excipient in the capsule is a filler (e.g., cellulose derivatives (e.g., microcrystalline cellulose), starches (e.g., hydrolyzed starches, and partially pregelatinized starches), anhydrous lactose, lactose monohydrate, sugar alcohols (e.g., sorbitol, xylitol, and mannitol).

In some embodiments, the ratio of Compound 1 to the filler is about 1:10. In some embodiments, the ratio of Compound 1 to the filler is about 1:10. In some embodiments, the ratio of Compound 1 to the filler is about 1:5. In some embodiments, the ratio of Compound 1 to the filler is about 1:4. In some embodiments, the ratio of Compound 1 to the filler is about 1:3. In some embodiments, the ratio of Compound 1 to the filler is about 1:2.

In some embodiments, the capsule further comprises a lubricant (e.g., magnesium stearate, calcium stearate, stearic acid, talc, silica, and fats).

In some embodiments, the dosage form is in the form of a blend.

In some embodiments, the pharmaceutical excipient in the blend is a filler (e.g., microcrystalline cellulose or starch). In some embodiments, the ratio of Compound 1 to the filler is about 1:1. In some embodiments, the ratio of Compound 1 to the filler is about 1:10. In some embodiments, the ratio of Compound 1 to the filler is about 1:5. In some embodiments, the ratio of Compound 1 to the filler is about 1:4. In some embodiments, the ratio of Compound 1 to the filler is about 1:3. In some embodiments, the ratio of Compound 1 to the filler is about 1:2.

In some embodiments, the dosage form is a liquid form.

In some embodiments, the dosage form is in the form of a solution.

In some embodiments, the pharmaceutical excipient in the solution is selected from the group consisting of a filler (e.g., polymer (e.g., PEG 400)), an emulsifier (e.g., a castor oil derivative (e.g., Kolliphor RH40), a surfactant (e.g., a glyceride (e.g., Labrafil M2125 CS), a vitamin derivative (e.g., Vitamin ETPGS)), a solvent (e.g., propylene glycol, ethanol, diethylene glycol monoethyl ether (or Transcutol HP)).

In some embodiments, the concentration of Compound 1 in the solution is from about 0.1 mg/mL to about 10 mg/mL (e.g., from about 0.5 mg/mL to about 10 mg/mL, from about 1 mg/mL to about 10 mg/mL, from about 2 mg/mL to about 10 mg/mL, from about 3 mg/mL to about 10 mg/mL, from about 4 mg/mL to about 10 mg/mL, from about 5 mg/mL to about 10 mg/mL, from about 6 mg/mL to about 10 mg/mL, from about 0.1 mg/mL to about 8 mg/mL, from about 0.5 mg/mL to about 8 mg/mL, from about 1 mg/mL to about 8 mg/mL, from about 2 mg/mL to about 8 mg/mL, from about 3 mg/mL to about 8 mg/mL, from about 4 mg/mL to about 8 mg/mL, from about 5 mg/mL to about 8 mg/mL, from about 6 mg/mL to about 8 mg/mL, from about 0.5 mg/mL to about 6 mg/mL, from about 1 mg/mL to about 6 mg/mL, from about 2 mg/mL to about 6 mg/mL, from about 3 mg/mL to about 6 mg/mL, from about 4 mg/mL to about 6 mg/mL, from about 0.5 mg/mL to about 4 mg/mL, from about 1 mg/mL to about 4 mg/mL, or from about 2 mg/mL to about 4 mg/mL).

In some embodiments, the concentration of Compound 1 in the solution is about 0.1 mg/mL, about 0.5 mg/mL, about 1 mg/mL, about 2 mg/mL, about 3 mg/mL, about 4 mg/mL, about 5 mg/mL, about 6 mg/mL, about 7 mg/mL, about 8 mg/mL, about 9 mg/mL, or about 10 mg/mL.

In some embodiments, the dosage form or the composition comprises:

from about 20% to about 60% (e.g., from about 25% to about 55%, from about 30% to about 50%, from about 35% to about 45%, from about 37% to about 42%, or about 40%) by weight a filler (e.g., a polymer (e.g., PEG 200, PEG 300, PEG 400, PEG 600, PEG 1000, PEG 2000, PEG 3000, PEG 4000, PEG 6000, or PEG 8000));

from about 3% to about 25% (e.g., from about 3% to about 20%, from about 5% to about 13%, from about 8% to about 13%, from about 5% to about 15%, or about 10%) by weight an emulsifier (e.g., a castor oil derivative (e.g., Kolliphor RH40, macrogol 25 cetostearyl ether (e.g., Cremophor® A25), macrogol 6 cetostearyl ether (e.g., Cremophor® A6), macrogol glycerol ricinoleate 35 (e.g., Cremophor® EL), macrogol-glycerol hydroxystearate 40 (e.g., Cremophor® RH 40)); and from about 30% to about 70% (e.g., from about 35% to about 65%, from about 40% to about 60%, from about 45% to about 55%, or about 50%) by weight water; wherein the concentration of Compound 1 is about 0.5 mg/mL or about 0.25 mg/mL.

In certain embodiments, the dosage form or the composition comprises: from about 35% to about 45% by weight a filler (e.g., a polymer (e.g., PEG 400)); from about 5% to about 15% by weight an emulsifier (e.g., a castor oil derivative (e.g., Kolliphor RH40); and from about 40% to about 60% by weight water; wherein the concentration of Compound 1 is about 0.5 mg/mL or about 0.25 mg/mL.

In some embodiments, the dosage form or the composition comprises:

from about 40% to about 75% (e.g., from about 45% to about 70%, from about 50% to about 65%, from about 55% to about 60%, or about 58%) by weight an emulsifier (e.g., a castor oil derivative (e.g., Kolliphor RH40), macrogol 25 cetostearyl ether (e.g., Cremophor® A25), macrogol 6 cetostearyl ether (e.g., Cremophor® A6), macrogol glycerol ricinoleate 35 (e.g., Cremophor® EL), macrogol-glycerol hydroxystearate 40 (e.g., Cremophor® RH 40));

from about 10% to about 35% (e.g., from about 10% to about 30%, from about 10% to about 25%, from about 15% to about 25%, or from about 15% to about 20%) by weight a surfactant (e.g., a glyceride (e.g., Labrafil M2125 CS), caprylocaproyl macrogolglycerides (e.g., Labrasol), natural triglyceride-based oil (e.g., olive oil, sesame oil, coconut oil, palm kernel oil));

from about 3% to about 20% (e.g., from about 3% to about 15%, from about 5% to about 15%, or from about 5% to about 10%) by weight propylene glycol; and 10% to about 35% (e.g., from about 10% to about 30%, from about 10% to about 25%, from about 15% to about 25%, or from about 15% to about 20%) by weight ethanol;

wherein the concentration of Compound 1 is from about 5 mg/mL to about 10 mg/mL (e.g., about 5 mg/mL, about 7.5 mg/mL, or about 10 mg/mL) or from about 2.5 mg to about 5 mg/mL.

In certain embodiments, the dosage form or the composition comprises: from about 55% to about 60% by weight an emulsifier (e.g., a castor oil derivative (e.g., Kolliphor RH40); from about 15% to about 20% by weight a surfactant (e.g., a glyceride (e.g., Labrafil M2125 CS); from about 5% to about 10% by weight propylene glycol; and from about 15% to about 20% by weight ethanol; wherein the concentration of Compound 1 is from about 5 mg/mL to about 10 mg/mL or from about 2.5 mg to about 5 mg/mL.

In some embodiments, the dosage form comprises:
- from about 50% to about 85% (e.g., from about 55% to about 80%, from about 60% to about 75%, or from about 65% to about 70%) by weight an emulsifier (e.g., a castor oil derivative (e.g., Kolliphor RH40) macrogol 25 cetostearyl ether (e.g., Cremophor® A25), macrogol 6 cetostearyl ether (e.g., Cremophor® A6), macrogol glycerol ricinoleate 35 (e.g., Cremophor® EL), macrogol-glycerol hydroxystearate 40 (e.g., Cremophor® RH 40));
- from about 10% to about 30% (e.g., from about 10% to about 25%, from about 15% to about 25%, or from about 18% to about 23%) by weight a surfactant (e.g., a glyceride (e.g., Labrafil M2125 CS), caprylocaproyl macrogolglycerides (e.g., Labrasol), natural triglyceride-based oil (e.g., olive oil, sesame oil, coconut oil, palm kernel oil)); and
- from about 3% to about 20% (e.g., from about 3% to about 15%, from about 5% to about 15%, from about 5% to about 12%, or from about 7% to about 12%) by weight propylene glycol;
- wherein the concentration of Compound 1 is from about 1 mg/mL to about 10 mg/mL (e.g., from about 2 mg/mL to about 8 mg/mL, about 2 mg/mL, about 5 mg/mL, about 7 mg/mL, or about 10 mg/mL) or from 0.5 mg/mL to about 5 mg/mL.

In certain embodiments, the dosage form or the composition comprises: from about 65% to about 70% by weight an emulsifier (e.g., a castor oil derivative (e.g., Kolliphor RH40); from about 18% to about 23% by weight a surfactant (e.g., a glyceride (e.g., Labrafil M2125 CS); and from about 7% to about 12% by weight propylene glycol; wherein the concentration of Compound 1 is from about 1 mg/mL to about 10 mg/mL or from 0.5 mg/mL to about 5 mg/mL.

In some embodiments, the dosage form or the composition comprises:
- from about 20% to about 60% (e.g., from about 25% to about 55%, from about 30% to about 50%, 35% to about 45%, about 35%, about 40%, or about 45%) by weight diethylene glycol monoethyl ether (e.g., Transcutol HP);
- from about 1% to about 20% (e.g., from about 3% to about 18%, from about 5% to about 18%, from about 5% to about 15%, from about 8% to about 12%, or about 10%) by weight a surfactant (e.g., a vitamin derivative (e.g., Vitamin ETPGS)); and
- from about 20% to about 80% (e.g., from about 25% to about 75%, from about 30% to about 70%, from about 35% to about 55%, from about 40% to about 60%, or from about 45% to about 55%) by weight water;
- wherein the concentration of Compound 1 is from about 1 mg/mL to about 5 mg/mL (e.g., about 1 mg/mL, about 2 mg/mL, about 3 mg/mL, about 4 mg, or about 5 mg/mL) or from 0.5 mg/mL to about 2.5 mg/mL.

In certain embodiments, the dosage form or the composition comprises: from about 35% to about 45% by weight diethylene glycol monoethyl ether (Transcutol HP); from about 5% to about 15% by weight a surfactant (e.g., a glyceride (e.g., a vitamin derivative (e.g., Vitamin ETPGS)); and from about 40% to about 60% by weight water; wherein the concentration of Compound 1 is from about 1 mg/mL to about 5 mg/mL or from 0.5 mg/mL to about 2.5 mg/mL.

In some embodiments, the dosage form or the composition comprises: from about 30% to about 40% by weight an emulsifier (e.g., a castor oil derivative (e.g., Kolliphor RH40); from about 40% to about 50% by weight a surfactant (e.g., a glyceride (e.g., Capmul MCM C8); from about 5% to 15% by weight a plasticizer (e.g., triethyl citrate); and from about 5% to about 15% by weight a solvent (e.g., ethanol).

In other embodiments, the dosage form or the composition comprises: from about 35% to about 45% by weight a propylene glycol monocaprylate (e.g., Capryol 90); from about 15% to about 25% by weight a glyceride (e.g., caprylocaproyl macrogolglycerides (e.g., Labrasol)) and from about 35% to 45% by weight diethylene glycol monoethyl ether (e.g., Transcutol HP).

In some embodiments, the dosage form is in the form of a suspension.

In some embodiments, the concentration of Compound 1 in the suspension is about 0.1 mg/mL, about 0.5 mg/mL, about 1 mg/mL, about 1.5 mg/mL, about 2 mg/mL, about 2.5 mg/mL, about 3 mg/mL, about 3.5 mg/mL, about 4 mg/mL, about 4.5 mg/mL, about 5 mg/mL, about 6 mg/mL, about 7 mg/mL, about 8 mg/mL, about 9 mg/mL, about 10 mg/mL, about 11 mg/mL, about 12 mg/mL, about 13 mg/mL, about 14 mg/mL, about 15 mg/mL, about 20 mg/mL, about 25 mg/mL.

In some embodiments, the disclosed suspension can be further diluted with a solvent (e.g., water), wherein the concentration of the diluted solution is from about 50% to about 90% of the solution before the dilution.

In some embodiments, the concentration of Compound 1 in the suspension is from about 0.1 mg/mL to about 10 mg/mL (e.g., from about 0.5 mg/mL to about 10 mg/mL, from about 1 mg/mL to about 10 mg/mL, from about 2 mg/mL to about 10 mg/mL, from about 3 mg/mL to about 10 mg/mL, from about 4 mg/mL to about 10 mg/mL, from about 5 mg/mL to about 10 mg/mL, from about 6 mg/mL to about 10 mg/mL, from about 0.1 mg/mL to about 8 mg/mL, from about 0.5 mg/mL to about 8 mg/mL, from about 1 mg/mL to about 8 mg/mL, from about 2 mg/mL to about 8 mg/mL, from about 3 mg/mL to about 8 mg/mL, from about 4 mg/mL to about 8 mg/mL, from about 5 mg/mL to about 8 mg/mL, from about 6 mg/mL to about 8 mg/mL, from about 0.5 mg/mL to about 6 mg/mL, from about 1 mg/mL to about 6 mg/mL, from about 2 mg/mL to about 6 mg/mL, from about 3 mg/mL to about 6 mg/mL, from about 4 mg/mL to about 6 mg/mL, from about 0.5 mg/mL to about 4 mg/mL, from about 1 mg/mL to about 4 mg/mL, or from about 2 mg/mL to about 4 mg/mL).

In some embodiments, the pharmaceutical excipient in the suspension comprises:
- from about 0.1% to about 5% (e.g., from about 0.1% to about 3%, from about 0.1% to about 2%, from about 0.1% to about 1%, from about 0.5% to about 3%, from about 0.5% to about 2%, from about 0.5% to about 1%, about 0.1%, about 0.3%, about 0.5%, about 1%, about 2%, or about 3%) by weight a filler (e.g., ethylcellulose, hydroxyethylcellulose, hydroxypropylcellulose, caboxymethylcellulose, sodium hydroxypropylmethylcellulose, methylcellulose (e.g., 400 cP MC), methylethylcellulose, sodium carboxymethylcellulose, Aerosil (silicon dioxide), cetostearyl alcohol, cetyl alcohol, stearyl alcohol, Gelucires 33/01, 39/01 and 43/01, glyceryl behenate (Compritol 888 A TO), glyceryl palmitostearate (Precirol AT05), Softisans 100, 142, 378 and 649, stearyl alcohol carbomer, xanthan gum, maltodextrin, acacia, tragacanth, povidone, or polyvinyl alcohol); and from about 0.1% to about 3% (e.g., from about 0.1% to about 2%, from about 0.1% to about 1%, from about 0.1% to about 0.5%, from about 0.2% to about 2%, from about 0.2% to about 1%, from about 0.2% to about 0.5%, from about 0.1% to about 0.3%, about 0.1%, about 0.2%, about 0.3%, about 0.4%, about 0.5%, or about 1%) by weight an emulsifier (e.g., polyoxyethylene sorbate (e.g., Tween®), sorbitan long chain carboxylic acid esters (e.g, Span®), ethylene or propylene oxide block copolymers (Pluronic®), polyglycolyzed glycerides Labrasol®, Labrafil® and Labrafac®), sorbitan esters of oleate, stearate, laurate or other long chain carboxylic acids, polyethylene-polypropylene glycol block copolymers (e.g., Poloxamer 188), other sorbitan or sucrose long chain carboxylic acid esters, mono and diglycerides, PEG derivatives of caprylic/capric triglycerides).

In certain embodiments, the pharmaceutical excipient comprises: about 0.5% by weight a filler (e.g., methylcellulose, e.g., 400 cP MC); and about 0.2% by weight an emulsifier (e.g., Tween, e.g, Tween 80, e.g., Poloxamer 188).

In some embodiments, the pharmaceutical excipient further comprises about 1% by weight a preservative solution (e.g., paraben solution).

In some embodiments, the dosage form is in the form of amorphous solid dispersion.

In some embodiments, the pharmaceutical excipient in the amorphous solid dispersion is a polymer (e.g., Soluplus, Eudragit, HPMCASMF, PVP-VA, methylacrylic acid methyl methacrylate copolymer, HPMCP, CAP, HPMCAS, HPMCP H-55).

In some embodiments, the dosage form or the composition is stable (e.g., chemically stable) at 25° C. and 60% RH for 7 days, 14 days, 21 days, 28 days, 1 month, 3 months, 5 months, 6 months, 12 months, 24 months, or 36 months).

In some embodiments, the dosage form or the composition is stable (e.g., chemically stable) at 25° C. and 60% RH for at least 7 days (e.g., at least 14 days, at 21 days, at least 28 days, at least 1 month, at least 2 months, at least 3 months, at least 5 months, at least 6 months, at least 12 months, at least 24 months, or at least 36 months).

Methods of Making Dosage Forms

In another aspect, the present disclosure provides methods of making dosage forms as disclosed herein. Such methods are, for example, described in the Example section. In some embodiments, the contemplated dosage forms may be in the form of capsule, blend, solution, suspension, or ASD.

Methods of Use

Formulations described herein are generally useful for the modulating the activity of sodium channels and are useful in treating conditions relating to aberrant function of a sodium channel ion channel, e.g., abnormal late sodium (INaL) current. In some embodiments, a formulation comprising Compound 1 as provided by the present disclosure is effective in the treatment of epilepsy or an epilepsy syndrome, a neurodevelopmental disorder, pain, or a neuromuscular disorder. A provided formulation comprising Compound 1, or a pharmaceutically acceptable salt thereof, may also modulate all sodium ion channels, or may be specific to only one or a plurality of sodium ion channels, e.g., $Na_V 1.1$, 1.2, 1.3, 1.4, 1.5, 1.6, 1.7, 1.8, and/or 1.9.

In one aspect, the present invention provides a method of treating a condition relating to aberrant function of a sodium ion channel in a subject in need thereof, comprising administering to the subject a therapeutically effective amount of Compound 1, e.g., from about 2.5 mg to about 90 mg of Compound 1.

Epilepsy and Epilepsy Syndromes

The formulations described herein (e.g., a dosage form, a composition in a dosage form comprising Compound 1) are useful in the treatment of epilepsy and epilepsy syndromes. Epilepsy is a CNS disorder in which nerve cell activity in the brain becomes disrupted, causing seizures or periods of unusual behavior, sensations and sometimes loss of consciousness. Seizure symptoms will vary widely, from a simple blank stare for a few seconds to repeated twitching of their arms or legs during a seizure.

Epilepsy may involve a generalized seizure or a partial or focal seizure. All areas of the brain are involved in a generalized seizure. A person experiencing a generalized seizure may cry out or make some sound, stiffen for several seconds to a minute a then have rhythmic movements of the arms and legs. The eyes are generally open, the person may appear not to be breathing and may actually turn blue. The return to consciousness is gradual and the person maybe confused from minutes to hours. There are six main types of generalized seizures: tonic-clonic, tonic, clonic, myoclonic, absence, and atonic seizures. In a partial or focal seizure, only part of the brain is involved, so only part of the body is affected. Depending on the part of the brain having abnormal electrical activity, symptoms may vary.

Epilepsy, as described herein, includes a generalized, partial, complex partial, tonic clonic, clonic, tonic, refractory seizures, status epilepticus, absence seizures, febrile seizures, or temporal lobe epilepsy.

The formulations described herein (e.g., a dosage form, a composition in a dosage form comprising Compound 1) may also be useful in the treatment of epilepsy syndromes. Severe syndromes with diffuse brain dysfunction caused, at least partly, by some aspect of epilepsy, are also referred to as epileptic encephalopathies. These are associated with frequent seizures that are resistant to treatment and severe cognitive dysfunction, for instance West syndrome.

In some embodiments, the epilepsy syndrome comprises an epileptic encephalopathy, such as developmental and epileptic encephalopathy (DEE), Dravet syndrome, Angelman syndrome, CDKL5 disorder, frontal lobe epilepsy, infantile spasms, West's syndrome, Juvenile Myoclonic Epilepsy, Landau-Kleffner syndrome, Lennox-Gastaut syndrome, Ohtahara syndrome, PCDH19 epilepsy, or Glut1 deficiency.

In some embodiments, the epilepsy or epilepsy syndrome is a genetic epilepsy or a genetic epilepsy syndrome. In some embodiments, epilepsy or an epilepsy syndrome comprises epileptic encephalopathy, developmental and epileptic encephalopathy, epileptic encephalopathy with SCN1A, SCN2A, SCN8A mutations, early infantile epileptic encephalopathy, Dravet syndrome, Dravet syndrome with SCN1A mutation, generalized epilepsy with febrile seizures, intractable childhood epilepsy with generalized tonic-clonic seizures, infantile spasms, benign familial neonatal-infantile seizures, SCN2A epileptic encephalopathy, focal epilepsy with SCN3A mutation, cryptogenic pediatric partial epilepsy with SCN3A mutation, SCN8A epileptic encephalopathy, sudden unexpected death in epilepsy, Rasmussen encephalitis, malignant migrating partial seizures of infancy, autosomal dominant nocturnal frontal lobe epilepsy, sudden expected death in epilepsy (SUDEP), KCNQ2 epileptic encephalopathy, or KCNT1 epileptic encephalopathy.

In some embodiments, the methods described herein further comprise identifying a subject having epilepsy or an epilepsy syndrome (e.g., epileptic encephalopathy, developmental and epileptic encephalopathy, epileptic encephalopathy with SCN1A, SCN2A, SCN8A mutations, early infantile epileptic encephalopathy, Dravet syndrome, Dravet syndrome with SCN1A mutation, generalized Epilepsy with febrile seizures, intractable childhood epilepsy with generalized tonic-clonic seizures, infantile spasms, benign familial neonatal-infantile seizures, SCN2A epileptic encephalopathy, focal epilepsy with SCN3A mutation, cryptogenic pediatric partial epilepsy with SCN3A mutation, SCN8A epileptic encephalopathy, sudden unexpected death in epilepsy, Rasmussen encephalitis, malignant migrating partial seizures of infancy, autosomal dominant nocturnal frontal lobe epilepsy, sudden unexpected death in epilepsy (SUDEP), KCNQ2 epileptic encephalopathy, or KCNT1 epileptic encephalopathy) prior to administration of a formulation described herein.

In one aspect, the present invention features a method of treating epilepsy or an epilepsy syndrome (e.g., epileptic encephalopathy, developmental and epileptic encephalopathy, epileptic encephalopathy with SCN1A, SCN2A, SCN8A mutations, early infantile epileptic encephalopathy, Dravet syndrome, Dravet syndrome with SCN1A mutation, generalized Epilepsy with febrile seizures, intractable childhood epilepsy with generalized tonic-clonic seizures, infantile spasms, benign familial neonatal-infantile seizures, SCN2A epileptic encephalopathy, focal epilepsy with SCN3A mutation, cryptogenic pediatric partial epilepsy with SCN3A mutation, SCN8A epileptic encephalopathy, sudden unexpected death in epilepsy, Rasmussen encephalitis, malignant migrating partial seizures of infancy, autosomal dominant nocturnal frontal lobe epilepsy, sudden expected death in epilepsy (SUDEP), KCNQ2 epileptic encephalopathy, or KCNT1 epileptic encephalopathy) comprising administering to a subject in need thereof a formulation described herein.

A formulation of the present invention (e.g., a dosage form, a composition in a dosage form comprising Compound 1) may also be used to treat an epilepsy or an epilepsy syndrome (e.g., epileptic encephalopathy), wherein the subject has a mutation in one or more of ALDH7A1, ALG13, ARHGEF9, ARX, ASAH1, CDKL5, CHD2, CHRNA2, CHRNA4, CHRNB2, CLN8, CNTNAP2, CPA6, CSTB, DEPDC5, DNM1, EEF1A2, EPM2A, EPM2B, GABRA1, GABRB3, GABRG2, GNAO1, GOSR2, GRIN1, GRIN2A, GRIN2B, HCN1, IER3IP1, KCNA2, KCNB1, KCNC1, KCNMA1, KCNQ2, KCNQ3, KCNT1, KCTD7, LGI1, MEF2C, NHLRC1, PCDH19, PLCB1, PNKP, PNPO, PRICKLE1, PRICKLE2, PRRT2, RELN, SCARB2, SCN1A, SCN1B, SCN2A, SCN8A, SCN9A, SIAT9, SIK1, SLC13A5, SLC25A22, SLC2A1, SLC35A2, SLC6A1, SNIP1, SPTAN1, SRPX2, ST3GAL3, STRADA, STX1B, STXBP1, SYN1, SYNGAP1, SZT2, TBC1D24, and WWOX.

In some embodiments, the methods described herein further comprise identifying a subject having a mutation in one or more of ALDH7A1, ALG13, ARHGEF9, ARX, ASAH1, CDKL5, CHD2, CHRNA2, CHRNA4, CHRNB2, CLN8, CNTNAP2, CPA6, CSTB, DEPDC5, DNM1, EEF1A2, EPM2A, EPM2B, GABRA1, GABRB3, GABRG2, GNAO1, GOSR2, GRIN1, GRIN2A, GRIN2B, HCN1, IER3IP1, KCNA2, KCNB1, KCNC1, KCNMA1, KCNQ2, KCNQ3, KCNT1, KCTD7, LGI1, MEF2C, NHLRC1, PCDH19, PLCB1, PNKP, PNPO, PRICKLE1, PRICKLE2, PRRT2, RELN, SCARB2, SCN1A, SCN1B, SCN2A, SCN8A, SCN9A, SIAT9, SIK1, SLC13A5, SLC25A22, SLC2A1, SLC35A2, SLC6A1, SNIP1, SPTAN1, SRPX2, ST3GAL3, STRADA, STX1B, STXBP1, SYN1, SYNGAP1, SZT2, TBC1D24, and WWOX prior to administration of a formulation described herein.

A formulation of the present invention may also be used to treat an epilepsy or an epilepsy syndrome (e.g., epileptic encephalopathy), wherein the subject has a mutation in one or more of HNRNPU, CACNA1A, CASK, FOXG1, GNB1, GPHN, IQSEC2, MBD5, MECP2, PIGA, PURA, SLC6A8, SLC9A6, TSC1, TSC2, UBE3A, WDR45, ZEB2, SLC1A2, GRIN2D, DYRK1A, PURA, WDR45, HNRNPU, SMC 1A, FOXG1, ARID1B, ASXL3, KCNH1, GABRB2, NEXMIF, MECP2, SNAP25, COL4A3BP, GABRA1, GABRA2, GABRA3, GABRA4, GABRA5, GABRA6, GABRB1, GABRB2, GABRD, GABRE, GABRG1, GABRG3, GABRP, GABRQ, GABRR1, GABRR2, GABRR3, ABAT, ADCY1, ADCY2, ADCY3, ADCY4, ADCY5, ADCY6, ADCY7, ADCY8, ADCY9, ANK2, ANK3, DISC1, DLC1, DLC2, DNAI1, FGF13, GABARAP, GABARAPL1, GABARAPL2, GABBR1, GAD1, GAD2, GLS, GLS2, GLUL, GNAI1, GNAI2, GNAI3, GNB1, GNB2, GNB3, GNB4, GNB5, GNG10, GNG11, GNG12, GNG13, GNG2, GNG3, GNG4, GNG5, GNG7, GNG8, GNGT1, GNGT2, GPHN, HAP1, KCNB2, KCNC2, KCNC3, KCNJ6, KIF5A, KIF5B, KIF5C, MAGI, MKLN1, MYO5A, NLGN2, NRXN1, NSF, PFN1, PLCL1, PRKACA, PRKACB, PRKACG, PRKCA, PRKCB, PRKCG, RAFT1, RDX, SCN2B, SCN3A, SEMA4D, SLC12A2, SLC12A5, SLC32A1, SLC38A1, SLC38A2, SLC38A3, SLC38A5, SLC6A11, SLC6A13, SRC, TRAK1, TRAK2, CHRNA1, CHRNA10, CHRNA3, CHRNA5, CHRNA6, CHRNA7, CHRNA9, CHRNB1, CHRNB3, CHRNB4, CHRND, CHRNE, CHRNG, GRIA1, GRIA2, GRIA3, GRIA4, GRIK1, GRIK2, GRIK3, GRIK4, GRIK5, GRIN2C, GRIN2D, GRIN3A, GRIN3B, GRID1, GRID2, SCN10A, SCN11A, SCN2B, SCN3B, SCN4A, SCN4B, SCN5A, SCN7A, CACNA1A, CACNA1B, CACNA1C, CACNA1D, CACNA1E, CACNA1F, CACNA1G, CACNA1H, CACNA1I, CACNA1S, CACNA2D1, CACNA2D2, CACNA2D3, CACNA2D4, CACNB1, CACNB2, CACNB3, CACNB4, KCNA1, KCNA10, KCNA3, KCNA4, KCNA5, KCNA6, KCNA7, KCNAB1, KCNAB2, KCNAB3, KCNB2, KCNC2, KCNC3, KCNC4, KCND1, KCND2, KCND3, KCNE1, KCNEIL, KCNE2, KCNE3, KCNE4, KCNF1, KCNG1, KCNG2, KCNG3, KCNG4, KCNH1, KCNH2, KCNH3, KCNH4, KCNH5, KCNH6, KCNH7, KCNH8, KCNQ1, KCNQ5, KCNQ4, KCNRG, KCNS1, KCNS2, KCNS3, KCNV1, KCNV2, HCN2, HCN3, and HCN4.

In some embodiments, the methods described herein further comprise identifying a subject having a mutation in one or more of HNRNPU, CACNA1A, CASK, FOXG1, GNB1, GPHN, IQSEC2, MBD5, MECP2, PIGA, PURA, SLC6A8, SLC9A6, TSC1, TSC2, UBE3A, WDR45, ZEB2, SLC1A2, GRIN2D, DYRK1A, PURA, WDR45, HNRNPU, SMC 1A, FOXG1, ARID1B, ASXL3, KCNH1, GABRB2, NEXMIF, MECP2, SNAP25, COL4A3BP, GABRA1, GABRA2, GABRA3, GABRA4, GABRA5, GABRA6, GABRB1, GABRB2, GABRD, GABRE, GABRG1, GABRG3, GABRP, GABRQ, GABRR1, GABRR2, GABRR3, ABAT, ADCY1, ADCY2, ADCY3, ADCY4, ADCY5, ADCY6, ADCY7, ADCY8, ADCY9, ANK2, ANK3, DISC1, DLC1, DLC2, DNAI1, FGF13, GABARAP, GABARAPL1, GABARAPL2, GABBR1, GAD1, GAD2, GLS, GLS2, GLUL, GNAI1, GNAI2, GNAI3, GNB1, GNB2, GNB3, GNB4, GNB5, GNG10, GNG11, GNG12, GNG13, GNG2, GNG3, GNG4, GNG5, GNG7, GNG8, GNGT1, GNGT2, GPHN, HAP1, KCNB2, KCNC2, KCNC3, KCNJ6, KIF5A, KIF5B, KIF5C, MAGI, MKLN1, MYO5A, NLGN2, NRXN1, NSF, PFN1, PLCL1, PRKACA, PRKACB, PRKACG, PRKCA, PRKCB, PRKCG, RAFT1, RDX, SCN2B, SCN3A, SEMA4D, SLC12A2, SLC12A5, SLC32A1, SLC38A1, SLC38A2, SLC38A3, SLC38A5, SLC6A11, SLC6A13, SRC, TRAK1, TRAK2, CHRNA1, CHRNA10, CHRNA3, CHRNA5, CHRNA6, CHRNA7, CHRNA9, CHRNB1, CHRNB3, CHRNB4, CHRND, CHRNE, CHRNG, GRIA1, GRIA2, GRIA3, GRIA4, GRIK1, GRIK2, GRIK3, GRIK4, GRIK5, GRIN2C, GRIN2D, GRIN3A, GRIN3B, GRID1, GRID2, SCN10A, SCN11A, SCN2B, SCN3B, SCN4A, SCN4B, SCN5A, SCN7A, CACNA1A, CACNA1B, CACNA1C, CACNA1D, CACNA1E, CACNA1F, CACNA1G, CACNA1H, CACNA1I, CACNA1S, CACNA2D1, CACNA2D2, CACNA2D3, CACNA2D4, CACNB1, CACNB2, CACNB3, CACNB4, KCNA1, KCNA10, KCNA3, KCNA4, KCNA5, KCNA6, KCNA7, KCNAB1, KCNAB2, KCNAB3, KCNB2, KCNC2, KCNC3, KCNC4, KCND1, KCND2, KCND3, KCNE1, KCNEIL, KCNE2, KCNE3, KCNE4, KCNF1, KCNG1, KCNG2, KCNG3, KCNG4, KCNH1, KCNH2, KCNH3, KCNH4, KCNH5, KCNH6, KCNH7, KCNH8, KCNQ1, KCNQ5, KCNQ4, KCNRG, KCNS1, KCNS2, KCNS3, KCNV1, KCNV2, HCN2, HCN3, and HCN4 prior to administration of a formulation described herein.

Neurodevelopmental Disorders

The formulations described herein (e.g., a dosage form, a composition in a dosage form comprising Compound 1) may be useful in the treatment of a neurodevelopmental disorder. In some embodiments, the neurodevelopmental disorder comprises autism, autism with epilepsy, tuberous sclerosis, Fragile X syndrome, Rett syndrome, Angelman syndrome, Dup15q syndrome, 22q13.3 Deletion syndrome, Prader-Willi syndrome, velocardiofacial syndrome, Smith-Lemli-Opitz syndrome, or a neurodevelopmental disorder with epilepsy. In some embodiments, the methods described herein further comprise identifying a subject having a neurodevelopmental disorder (e.g., autism, autism with epilepsy, tuberous sclerosis, Fragile X syndrome, Rett syndrome, Angelman syndrome, Dup15q syndrome, 22q13.3 Deletion syndrome, Prader-Willi syndrome, velocardiofacial syndrome, Smith-Lemli-Opitz syndrome, or a neurodevelopmental disorder with epilepsy) prior to administration of a formulation described herein.

In one aspect, the present invention features a method of treating a neurodevelopmental disorder (e.g., autism, autism with epilepsy, tuberous sclerosis, Fragile X syndrome, Rett syndrome, Angelman syndrome, Dup15q syndrome, 22q13.3 Deletion syndrome, Prader-Willi syndrome, velocardiofacial syndrome, Smith-Lemli-Opitz syndrome, or a neurodevelopmental disorder with epilepsy) comprising administering to a subject in need thereof a formulation described herein (e.g., a dosage form, a composition in a dosage form comprising Compound 1).

Pain

The formulations described herein (e.g., a dosage form, a composition in a dosage form comprising Compound 1) may be useful in the treatment of pain. In some embodiments, the pain comprises neuropathic pain, trigeminal neuralgia, migraine, hemiplegic migraine, familial hemiplegic migraine, familial hemiplegic migraine type 3, cluster headache, trigeminal neuralgia, or a related headache disorder. In some embodiments, the methods described herein further comprise identifying a subject having pain (e.g., neuropathic pain, trigeminal neuralgia, migraine, hemiplegic migraine, familial hemiplegic migraine, familial hemiplegic migraine type 3, cluster headache, trigeminal neuralgia, or a related headache disorder) prior to administration of a formulation described herein (e.g., a dosage form, a composition in a dosage form comprising Compound 1).

In one aspect, the present invention features a method of treating pain (e.g., neuropathic pain, trigeminal neuralgia, migraine, hemiplegic migraine, familial hemiplegic migraine, familial hemiplegic migraine type 3, cluster headache, trigeminal neuralgia, or a related headache disorder) comprising administering to a subject in need thereof a formulation described herein (e.g., a dosage form, a composition in a dosage form comprising Compound 1).

Neuromuscular Disorders

The formulations described herein (e.g., a dosage form, a composition in a dosage form comprising Compound 1) may be useful in the treatment of a neuromuscular disorder. In some embodiments, the neuromuscular disorder comprises amyotrophic lateral sclerosis, multiple sclerosism, myotonia, paramyotonia congenita, potassium-aggravated myotonia, periodic paralysis, hyperkalemic periodic paralysis, hypokalemic periodic paralysis, or laryngospasm with SCN4A mutation. In some embodiments, the methods described herein further comprise identifying a subject having a neuromuscular disorder (e.g., amyotrophic lateral sclerosis, multiple sclerosism, myotonia, paramyotonia congenita, potassium-aggravated myotonia, periodic paralysis, hyperkalemic periodic paralysis, hypokalemic periodic paralysis, or laryngospasm with SCN4A mutation) prior to administration of a formulation described herein.

In one aspect, the present invention features a method of treating a neuromuscular disorder (e.g., amyotrophic lateral sclerosis, multiple sclerosism, myotonia, paramyotonia congenita, potassium-aggravated myotonia, periodic paralysis, hyperkalemic periodic paralysis, hypokalemic periodic paralysis, or laryngospasm with SCN4A mutation) comprising administering to a subject in need thereof a formulation described herein (e.g., a dosage form, a composition in a dosage form comprising Compound 1).

Other Disorders

In some embodiments, a formulation of the present invention (e.g., a dosage form, a composition in a dosage form comprising Compound 1) may have appropriate pharmacokinetic properties such that they may be active with regard to the central and/or peripheral nervous system. In some embodiments, the formulations provided herein (e.g., a dosage form, a composition in a dosage form comprising Compound 1) are used to treat a cardiovascular disease such as atrial and ventricular arrhythmias, including atrial fibrillation, Prinzmetal's (variant) angina, stable angina, unstable angina, ischemia and reperfusion injury in cardiac, kidney, liver and the brain, exercise induced angina, pulmonary hypertension, congestive heart disease including diastolic and systolic heart failure, recurrent ischemia, cerebral ischemia, stroke, renal ischemia, ischemia associated with organ transplant, acute coronary syndrome, peripheral arterial disease, intermittent claudication, and myocardial infarction.

In some embodiments, the formulations provided herein (e.g., a dosage form, a composition in a dosage form comprising Compound 1) may be used in the treatment of diseases affecting the neuromuscular system resulting in itching, seizures, or paralysis, or in the treatment of diabetes or reduced insulin sensitivity, and disease states related to diabetes, such as diabetic peripheral neuropathy. In some embodiments, a disclosed method comprises administering the pharmaceutical composition.

In some embodiments, provided herein is a method of treating a neurological disorder or a psychiatric disorder, wherein the method comprises administering to a subject in need thereof a formulation disclosed herein (e.g., a dosage form, a composition in a dosage form comprising Compound 1).

Oncology

In another aspect, the present disclosure provides a method of treating a cancer, wherein the method comprises administering to a subject in need thereof a dosage form or a composition in a dosage form disclosed in the present disclosure.

Trigeminal Autonomic Cephalalgia

The compounds, dosage forms, and compositions described herein (e.g., Compound 1, a dosage form or a composition comprising Compound 1) are useful in the treatment of trigeminal autonomic cephalalgias (TACs). TACs are a group of primary headaches characterized by unilaterality of pain, a relatively short duration of symptoms, and associated ipsilateral cranial autonomic signs. TACs may include cluster headache (CH), paroxysmal hemicrania (PH), hemicrania continua (HC), short-lasting unilateral neuralgiform headache attacks with conjunctival injection and tearing (SUNCT), short-lasting unilateral neuralgiform headache attacks with cranial autonomic symptoms (SUNA), and long-lasting autonomic symptoms with hemicrania (LASH). Despite their common elements, the trigeminal autonomic cephalalgias differ, e.g., in attack duration and frequency and in the response to therapy.

In some embodiments, the present invention provides a method of treating PH, HC, SUNCT, SUNA, and/or LASH using a dosage form described herein. In some embodiments, the present invention provides a method of treating SUNCT using a compound, dosage form, or a composition described herein (e.g., Compound 1, a dosage form or a composition comprising Compound 1). In some embodiments, the present invention provides a method of treating SUNA using a provided compound, a dosage form, or a composition described herein (e.g., Compound 1, a dosage form or a composition comprising Compound 1). In another aspect, provided herein is a method of treating or preventing a trigeminal autonomic cephalalgia (TAC) in a subject in need thereof, comprising administering to the subject a therapeutically effective amount of a compound, a dosage form, or a composition disclosed herein (e.g., Compound 1, a dosage form or a composition comprising Compound 1).

In another aspect, the present invention provides a method of treating or preventing a trigeminal autonomic cephalalgia (TAC) in a subject in need thereof, comprising administering to the subject a therapeutically effective amount of Compound 1, e.g., from 2.5 mg to 90 mg of Compound 1.

In some embodiments, TAC is selected from the group consisting of paroxysmal hemicrania, hemicrania continua, short-lasting unilateral neuralgiform headache attacks with conjunctival injection and tearing (SUNCT), short-lasting unilateral neuralgiform headache attacks with cranial autonomic symptoms (SUNA), and long-lasting autonomic symptoms with hemicrania.

In other embodiments, the TAC is a short-lasting unilateral neuralgiform headache attack.

In certain embodiments, the TAC is SUNCT. In some embodiments, the TAC is SUNA.

In other embodiments, the subject has an inadequate response to at least one medication used for the treatment of a TAC.

Migraines

The compounds, dosage forms, and compositions described herein (e.g., Compound 1, a dosage form or a composition comprising Compound 1) are useful in the treatment of migraines. Migraine is a primary headache disorder characterized by recurrent headaches that are moderate to severe. As described herein, a migraine may be migraine without aura, migraine with aura, hemiplegic migraine, familial hemiplegic migraine (FHM), familial hemiplegic migraine type 1 (FHM1), familial hemiplegic migraine type 2 (FHM2), familial hemiplegic migraine type 3 (FHM3), familial hemiplegic migraine type 4 (FHM4), and sporadic hemiplegic migraine (SHM).

In some embodiments, the present invention provides a method of treating migraine without aura, migraine with aura, hemiplegic migraine, FHM, FHM1, FHM2, FHM3, FHM4, and/or SHM using a provided compound. In some embodiments, the present invention provides a method of treating migraine without aura, migraine with aura, FHM1, FHM2, FHM4, and/or SHM using a provided compound, dosage form, or composition (e.g., Compound 1, a dosage form or a composition comprising Compound 1). In some embodiments, the present invention provides a method of treating migraine without aura using a provided compound. In some embodiments, the present invention provides a method of treating migraine with aura using a provided compound, dosage form, or composition (e.g., Compound 1, a dosage form or a composition comprising Compound 1). In some embodiments, the present invention provides a method of treating FHM1, FHM2, and/or FHM4 using a provided compound. In some embodiments, the present invention provides a method of treating SHM using a provided compound, dosage form, or composition (e.g., Compound 1, a dosage form or a composition comprising Compound 1).

In another aspect, provided herein is a method of treating or preventing a migraine in a subject in need thereof, comprising administering to the subject a therapeutically effective amount of a compound, a dosage form, a composition disclosed herein (e.g., Compound 1, a dosage form or a composition comprising Compound 1).

In another aspect, the present invention provides a method of treating or preventing a migraine in a subject in need thereof, comprising administering to the subject a therapeutically effective amount of Compound 1, e.g., from about 2.5 mg to about 90 mg of Compound 1.

In some embodiments, the migraine is selected from the group consisting of migraine without aura, migraine with aura, familial hemiplegic migraine type 1 (FHM1), familial hemiplegic migraine type 2 (FHM2), familial hemiplegic migraine type 4 (FHM4), and sporadic hemiplegic migraine (SHM), In other embodiments, the migraine is migraine without aura. In certain embodiments, the migraine is migraine with aura. In some embodiments, the migraine is FHM1. In some embodiments, the migraine is FHM2. In other embodiments, the migraine is FHM4. In certain embodiments, the migraine is SHM. In some embodiments, the subject has an inadequate response to at least one medication used for the treatment of a migraine.

Cortical Spreading Depression

The compounds, dosage forms, and compositions described herein (e.g., Compound 1, a dosage form or a composition comprising Compound 1). are useful in the treatment of cortical spreading depression (CSD). CSD is a wave of sustained depolarization (neuronal inactivation) moving through intact brain tissue and involved in, for example, brain ischemia, migraine aura, and seizures.

In another aspect, a method of treating or preventing cortical spreading depression (CSD) in a subject in need thereof, comprising administering to the subject a therapeutically effective amount of a compound, a dosage form, or a composition disclosed herein (e.g., Compound 1, a dosage form or a composition comprising Compound 1) is provided.

In another aspect, provided herein is a method of treating or preventing cortical spreading depression (CSD) in a subject in need thereof, comprising administering to the subject a therapeutically effective amount of Compound 1, e.g., from about 2.5 mg to about 90 mg of Compound 1.

Cranial Neuropathy

The compounds, dosage forms, and compositions described herein (e.g., Compound 1, a dosage form or a composition comprising Compound 1) are useful in the treatment of cranial neuropathy. Neuropathy is a disorder of nerve damage and affects the ability to feel and move. When nerves in the brain or brainstem are affected, it is called cranial neuropathy. The cranial nerves are those that arise directly from the brain or brainstem and often affect areas like the face and eyes. Cranial neuropathies include Bell's palsy, microvascular cranial nerve palsy, third nerve palsy, fourth nerve palsy, and sixth nerve palsy. When several different cranial nerves are affected, it is called multiple cranial neuropathies (MCN).

Also provided herein is a method of treating or preventing a cranial neuropathy or multiple cranial neuropathies in a subject in need thereof, comprising administering to the subject a therapeutically effective amount of a compound, a dosage form, or a composition described herein (e.g., Compound 1, a dosage form or a composition comprising Compound 1).

In another aspect, a method of treating or preventing a cranial neuropathy or multiple cranial neuropathy in a subject in need thereof, comprising administering to the subject a therapeutically effective amount of Compound 1, e.g., from about 2.5 mg to about 90 mg of Compound 1, is provided herein.

In some embodiments, the cranial neuropathy is selected from the group consisting of bell palsy, microvascular cranial nerve palsy, third nerve palsy, fourth nerve palsy, and sixth nerve palsy. In other embodiments, the dosage form is administered orally. In certain embodiments, the dosage form is a capsule. In some embodiments, the patient is 18 to 65 years of age.

Combination Therapy

A formulation described herein (e.g., a dosage form or a composition comprising Compound 1), e.g., for use in modulating a sodium ion channel, e.g., the late sodium (INaL) current) may be administered in combination with another agent or therapy. A subject to be administered a formulation disclosed herein may have a disease, disorder, or condition, or a symptom thereof, that would benefit from treatment with another agent or therapy. These diseases or conditions can relate to epilepsy or an epilepsy syndrome, a neurodevelopmental disorder, pain, or a neuromuscular disorder.

Antiepilepsy Agents

Anti-epilepsy agents include brivaracetam, carbamazepine, clobazam, clonazepam, diazepam, divalproex, eslicarbazepine, ethosuximide, ezogabine, felbamate, gabapentin, lacosamide, lamotrigine, levetiracetam, lorazepam, oxcarbezepine, permpanel, phenobarbital, phenytoin, pregabalin, primidone, rufinamide, tigabine, topiramate, valproic acid, vigabatrin, zonisamide, and cannabidiol.

Cardiovascular Agent Combination Therapy

Cardiovascular related diseases or conditions that can benefit from a combination treatment of the sodium channel blockers of the invention with other therapeutic agents include, without limitation, angina including stable angina, unstable angina (UA), exercised-induced angina, variant angina, arrhythmias, intermittent claudication, myocardial infarction including non-STE myocardial infarction (NSTEMI), pulmonary hypertension including pulmonary arterial hypertension, heart failure including congestive (or chronic) heart failure and diastolic heart failure and heart failure with preserved ejection fraction (diastolic dysfunction), acute heart failure, or recurrent ischemia.

Therapeutic agents suitable for treating cardiovascular related diseases or conditions include anti-anginals, heart failure agents, antithrombotic agents, antiarrhythmic agents, antihypertensive agents, and lipid lowering agents.

The co-administration of the sodium channel blockers of the invention with therapeutic agents suitable for treating cardiovascular related conditions allows enhancement in the standard of care therapy the patient is currently receiving.

Anti-Anginals

Anti-anginals include beta-blockers, calcium channel blockers, and nitrates. Beta blockers reduce the heart's need for oxygen by reducing its workload resulting in a decreased heart rate and less vigorous heart contraction. Examples of beta-blockers include acebutolol (Sectral), atenolol (Tenormin), betaxolol (Kerlone), bisoprolol/hydrochlorothiazide (Ziac), bisoprolol (Zebeta), carteolol (Cartrol), esmolol (Brevibloc), labetalol (Normodyne, Trandate), metoprolol (Lopressor, Toprol XL), nadolol (Corgard), propranolol (Inderal), sotalol (Betapace), and timolol (Blocadren).

Nitrates dilate the arteries and veins thereby increasing coronary blood flow and decreasing blood pressure. Examples of nitrates include nitroglycerin, nitrate patches, isosorbide dinitrate, and isosorbide-5-mononitrate.

Calcium channel blockers prevent the normal flow of calcium into the cells of the heart and blood vessels causing the blood vessels to relax thereby increasing the supply of blood and oxygen to the heart. Examples of calcium channel blockers include amlodipine (Norvasc, Lotrel), bepridil (Vascor), diltiazem (Cardizem, Tiazac), felodipine (Plendil), nifedipine (Adalat, Procardia), nimodipine (Nimotop), nisoldipine (Sular), verapamil (Calan, Isoptin, Verelan), and nicardipine.

Heart Failure Agents

Agents used to treat heart failure include diuretics, ACE inhibitors, vasodilators, and cardiac glycosides. Diuretics eliminate excess fluids in the tissues and circulation thereby relieving many of the symptoms of heart failure. Examples of diuretics include hydrochlorothiazide, metolazone (Zaroxolyn), furosemide (Lasix), bumetanide (Bumex), spironolactone (Aldactone), and eplerenone (Inspra).

Angiotensin converting enzyme (ACE) inhibitors reduce the workload on the heart by expanding the blood vessels and decreasing resistance to blood flow. Examples of ACE inhibitors include benazepril (Lotensin), captopril (Capoten), enalapril (Vasotec), fosinopril (Monopril), lisinopril (Prinivil, Zestril), moexipril (Univasc), perindopril (Aceon), quinapril (Accupril), ramipril (Altace), and trandolapril (Mavik).

Vasodilators reduce pressure on the blood vessels by making them relax and expand. Examples of vasodilators include hydralazine, diazoxide, prazosin, clonidine, and methyldopa. ACE inhibitors, nitrates, potassium channel activators, and calcium channel blockers also act as vasodilators.

Cardiac glycosides are compounds that increase the force of the heart's contractions. These compounds strengthen the pumping capacity of the heart and improve irregular heartbeat activity. Examples of cardiac glycosides include digitalis, digoxin, and digitoxin.

Antithrombotic Agents

Antithrombotics inhibit the clotting ability of the blood. There are three main types of antithrombotics-platelet inhibitors, anticoagulants, and thrombolytic agents.

Platelet inhibitors inhibit the clotting activity of platelets, thereby reducing clotting in the arteries. Examples of platelet inhibitors include acetylsalicylic acid (aspirin), ticlopidine, clopidogrel (plavix), dipyridamole, cilostazol, persantine sulfinpyrazone, dipyridamole, indomethacin, and glycoprotein IIb/IIIa inhibitors, such as abciximab, tirofiban, and eptifibatide (Integrelin). Beta blockers and calcium channel blockers also have a platelet-inhibiting effect. Anticoagulants prevent blood clots from growing larger and prevent the formation of new clots. Examples of anticoagulants include bivalirudin (Angiomax), warfarin (Coumadin), unfractionated heparin, low molecular weight heparin, danaparoid, lepirudin, and argatroban.

Thrombolytic agents act to break down an existing blood clot. Examples of thrombolytic agents include streptokinase, urokinase, and tenecteplase (TNK), and tissue plasminogen activator (t-PA).

Antiarrhythmic Agents

Antiarrhythmic agents are used to treat disorders of the heart rate and rhythm. Examples of antiarrhythmic agents include amiodarone, dronedarone, quinidine, procainamide, lidocaine, and propafenone. Cardiac glycosides and beta blockers are also used as antiarrhythmic agents.

Combinations with amiodarone and dronedarone are of particular interest given the recently discovered synergistic effects of the sodium channel blocker ranolazine and amioarone and dronedarone.

Antihypertensive Agents

Antihypertensive agents are used to treat hypertension, a condition in which the blood pressure is consistently higher than normal. Hypertension is associated with many aspects of cardiovascular disease, including congestive heart failure, atherosclerosis, and clot for illation. Examples of antihypertensive agents include alpha-1-adrenergic antagonists, such as prazosin (Minipress), doxazosin mesylate (Cardura), prazosin hydrochloride (Minipress), prazosin, polythiazide (Minizide), and terazosin hydrochloride (Hytrin); beta-adrenergic antagonists, such as propranolol (Inderal), nadolol (Corgard), timolol (Blocadren), metoprolol (Lopressor), and pindolol (Visken); central alpha-adrenoceptor agonists, such as clonidine hydrochloride (Catapres), clonidine hydrochloride and chlorthalidone (Clorpres, Combipres), guanabenz Acetate (Wytensin), guanfacine hydrochloride (Tenex), methyldopa (Aldomet), methyldopa and chlorothiazide (Aldoclor), methyldopa and hydrochlorothiazide (Aldoril); combined alpha/beta-adrenergic antagonists, such as labetalol (Normodyne, Trandate), Carvedilol (Coreg); adrenergic neuron blocking agents, such as guanethidine (ismelin), reserpine (Serpasil); central nervous system-acting antihypertensives, such as clonidine (Catapres), methyldopa (Aldomet), guanabenz (Wytensin); anti-angiotensin II agents; ACE inhibitors, such as perindopril (Aceon) captopril (Capoten), enalapril (Vasotec), lisinopril (Prinivil, Zestril); angiotensin-II receptor antagonists, such as Candesartan (Atacand), Eprosartan (Teveten), Irbesartan (Avapro), Losartan (Cozaar), Telmisartan (Micardis), Valsartan (Diovan); calcium channel blockers, such as verapamil (Calan, Isoptin), diltiazem (Cardizem), nifedipine (Adalat, Procardia); diuretics; direct vasodilators, such as nitroprusside (Nipride), diazoxide (Hyperstat IV), hydralazine (Apresoline), minoxidil (Loniten), verapamil; and potassium channel activators, such as aprikalim, bimakalim, cromakalim, emakalim, nicorandil, and pinacidil.

Lipid Lowering Agents

Lipid lowering agents are used to lower the amounts of cholesterol or fatty sugars present in the blood. Examples of lipid lowering agents include bezafibrate (Bezalip), ciprofibrate (Modalim), and statins, such as atorvastatin (Lipitor), fluvastatin (Lescol), lovastatin (Mevacor, Altocor), mevastatin, pitavastatin (Livalo, Pitava) pravastatin (Lipostat), rosuvastatin (Crestor), and simvastatin (Zocor).

In this invention, the patient presenting with an acute coronary disease event often suffers from secondary medical conditions such as one or more of a metabolic disorder, a pulmonary disorder, a peripheral vascular disorder, or a gastrointestinal disorder. Such patients can benefit from treatment of a combination therapy comprising administering to the patient ranolazine in combination with at least one therapeutic agent.

Pulmonary Disorders Combination Therapy

Pulmonary disorder refers to any disease or condition related to the lungs. Examples of pulmonary disorders include, without limitation, asthma, chronic obstructive pulmonary disease (COPD), bronchitis, and emphysema.

Examples of therapeutics agents used to treat pulmonary disorders include bronchodilators including beta2 agonists and anticholinergics, corticosteroids, and electrolyte supplements. Specific examples of therapeutic agents used to treat pulmonary disorders include epinephrine, terbutaline (Brethaire, Bricanyl), albuterol (Proventil), salmeterol (Serevent, Serevent Diskus), theophylline, ipratropium bromide (Atrovent), tiotropium (Spiriva), methylprednisolone (Solu-Medrol, Medrol), magnesium, and potassium.

Metabolic Disorders Combination Therapy

Examples of metabolic disorders include, without limitation, diabetes, including type I and type II diabetes, metabolic syndrome, dyslipidemia, obesity, glucose intolerance, hypertension, elevated serum cholesterol, and elevated triglycerides.

Examples of therapeutic agents used to treat metabolic disorders include antihypertensive agents and lipid lowering agents, as described in the section "Cardiovascular Agent Combination Therapy" above. Additional therapeutic agents used to treat metabolic disorders include insulin, sulfonylureas, biguanides, alpha-glucosidase inhibitors, and incretin mimetics.

Peripheral Vascular Disorders Combination Therapy

Peripheral vascular disorders are disorders related to the blood vessels (arteries and veins) located outside the heart and brain, including, for example peripheral arterial disease (PAD), a condition that develops when the arteries that supply blood to the internal organs, arms, and legs become completely or partially blocked as a result of atherosclerosis.

Gastrointestinal Disorders Combination Therapy

Gastrointestinal disorders refer to diseases and conditions associated with the gastrointestinal tract. Examples of gastrointestinal disorders include gastroesophageal reflux disease (GERD), inflammatory bowel disease (IBD), gastroenteritis, gastritis and peptic ulcer disease, and pancreatitis.

Examples of therapeutic agents used to treat gastrointestinal disorders include proton pump inhibitors, such as pantoprazole (Protonix), lansoprazole (Prevacid), esomeprazole (Nexium), omeprazole (Prilosec), rabeprazole; H2 blockers, such as cimetidine (Tagamet), ranitidine (Zantac), famotidine (Pepcid), nizatidine (Axid); prostaglandins, such as misoprostoL (Cytotec); sucralfate; and antacids.

Antibiotics, Analgesics, Antidepressants and Anti-anxiety Agents Combination Therapy Patients presenting with an acute coronary disease event may exhibit conditions that benefit from administration of therapeutic agent or agents that are antibiotics, analgesics, antidepressant and anti-anxiety agents in combination with ranolazine.

Antibiotics

Antibiotics are therapeutic agents that kill, or stop the growth of, microorganisms, including both bacteria and fungi. Example of antibiotic agents include .beta.-Lactam antibiotics, including penicillins (amoxicillin), cephalosporins, such as cefazolin, cefuroxime, cefadroxil (Duricef), cephalexin (Keflex), cephradine (Velosef), cefaclor (Ceclor), cefuroxime axtel (Ceftin), cefprozil (Cefzil), loracarbef (Lorabid), cefixime (Suprax), cefpodoxime proxetil (Vantin), ceftibuten (Cedax), cefdinir (Omnicef), ceftriaxone (Rocephin), carbapenems, and monobactams; tetracyclines, such as tetracycline; macrolide antibiotics, such as erythromycin; aminoglycosides, such as gentamicin, tobramycin, amikacin; quinolones such as ciprofloxacin; cyclic peptides, such as vancomycin, streptogramins, polymyxins; lincosamides, such as clindamycin; oxazolidinoes, such as linezolid; and sulfa antibiotics, such as sulfisoxazole.

Analgesics

Analgesics are therapeutic agents that are used to relieve pain. Examples of analgesics include opiates and morphinomimetics, such as fentanyl and morphine; paracetamol; NSAIDs, and COX-2 inhibitors. Given the ability of the sodium channel blockers of the invention to treat neuropathic pain via inhibition of the Na$_V$ 1.7 and 1.8 sodium channels, combination with analgesics are particularly envisioned. See U.S. Patent Application Publication 20090203707.

Antidepressant and Anti-Anxiety Agents

Antidepressant and anti-anxiety agents include those agents used to treat anxiety disorders, depression, and those used as sedatives and tranquillizers. Examples of antidepressant and anti-anxiety agents include benzodiazepines, such as diazepam, lorazepam, and midazolam; benzodiazepines; barbiturates; glutethimide; chloral hydrate; meprobamate; sertraline (Zoloft, Lustral, Apo-Sertral, Asentra, Gladem, Serlift, Stimuloton); escitalopram (Lexapro, Cipralex); fluoxetine (Prozac, Sarafem, Fluctin, Fontex, Prodep, Fludep, Lovan); venlafaxine (Effexor XR, Efexor); citalopram (Celexa, Cipramil, Talohexane); paroxetine (Paxil, Seroxat, Aropax); trazodone (Desyrel); amitriptyline (Elavil); and bupropion (Wellbutrin, Zyban). Antidepressant and anti-anxiety agents may include neuroactive steroid and ketamine and related NMDA receptor antagonists.

Accordingly, one aspect of the invention provides for a composition comprising the sodium channel blockers of the invention and at least one therapeutic agent. In an alternative embodiment, the composition comprises the sodium channel blockers of the invention and at least two therapeutic agents. In further alternative embodiments, the composition comprises the sodium channel blockers of the invention and at least three therapeutic agents, the sodium channel blockers of the invention and at least four therapeutic agents, or the sodium channel blockers of the invention and at least five therapeutic agents.

The methods of combination therapy include co-administration of a single formulation containing the sodium channel blockers of the invention and therapeutic agent or agents, essentially contemporaneous administration of more than one formulation comprising the sodium channel blocker of the invention and therapeutic agent or agents, and consecutive administration of a sodium channel blocker of the invention and therapeutic agent or agents, in any order, wherein preferably there is a time period where the sodium channel blocker of the invention and therapeutic agent or agents simultaneously exert their therapeutic effect.

Methods of Preparation

Provided herein are methods of preparing compounds useful for preventing and/or treating a disease, disorder, or condition described herein, e.g., a disease, disorder, or condition relating to aberrant function of a sodium ion channel, such as abnormal late sodium current (INaL).

In one aspect, the present disclosure provides a method of making Compound 1:

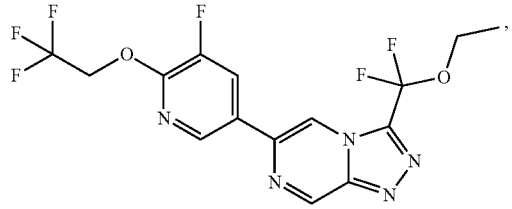 [SMILES: CCOC(F)(F)c1nnc2cnc(-c3cnc(OCC(F)(F)F)c(F)c3)cn12]

or a pharmaceutically acceptable salt thereof, the method comprising the steps of:

(i) contacting a solution of 2,2,2-trifluoroethanol with 5-bromo-2,3-difluoro-pyridine thereby providing a compound of formula (II):

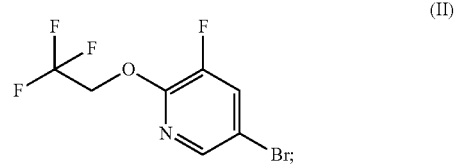 [SMILES: Fc1cc(Br)cnc1OCC(F)(F)F]

(ii) contacting the compound of formula (II) with a palladium catalyst and bis(pinacolato)diboron thereby providing a compound of formula (III):

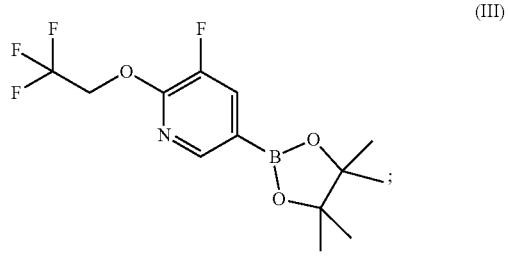 [SMILES: CC1(C)OB(c2cnc(OCC(F)(F)F)c(F)c2)OC1(C)C]

(iii) contacting the compound of formula (III) with a palladium catalyst and 2-bromo-5-chloro-pyrazine thereby providing a compound of formula (IV):

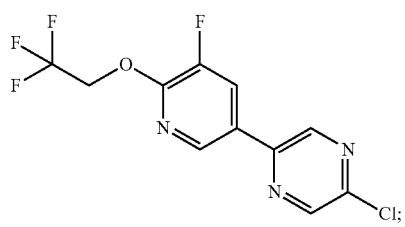

(iv) contacting the compound of formula (IV) with hydrazine thereby providing a compound of formula (V):

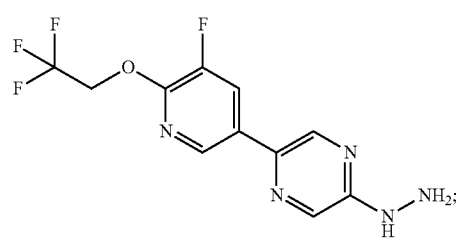

(v) contacting the compound of formula (V) with 2-bromo-2,2-difluoro-acetyl chloride thereby providing a compound of formula (VI):

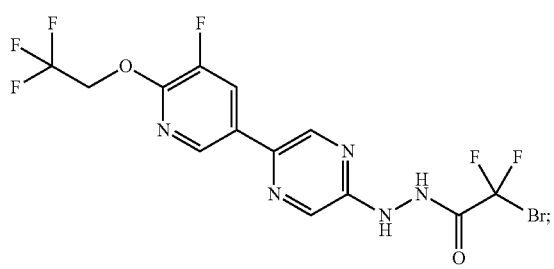

(vi) contacting the compound of formula (VI) with an acid thereby providing a compound of formula (VII):

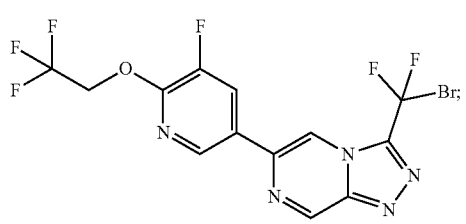

and
(vii) contacting the compound of formula (VII) with a silver catalyst and ethanol thereby providing Compound 1 or a pharmaceutically acceptable salt thereof.

In some embodiments, the palladium catalyst in step (ii) or (iii) is [1,1'-bis(diphenylphosphino)ferrocene]palladium (II) dichloride. In certain embodiments, the silver catalyst in step (vii) is silver tetrafluoroborate. In other embodiments, the acid in step (vi) is p-toluenesulfonic acid.

In another aspect, the present disclosure provides a method of making Compound 1:

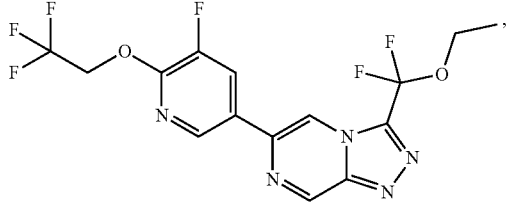 [SMILES: CCOC(F)(F)c1nnc2cnc(-c3cnc(OCC(F)(F)F)c(F)c3)cn12]

or a pharmaceutically acceptable salt thereof, wherein Compound 1 or a pharmaceutically acceptable salt thereof is provided by contacting the compound of formula (VII):

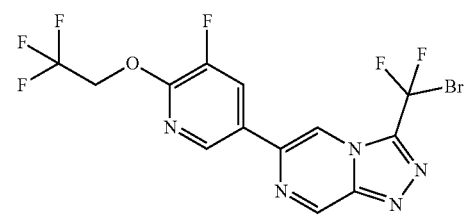

with a silver catalyst and ethanol.

In some embodiments, the compound of formula (VII) is provided by contacting the compound of formula (VI):

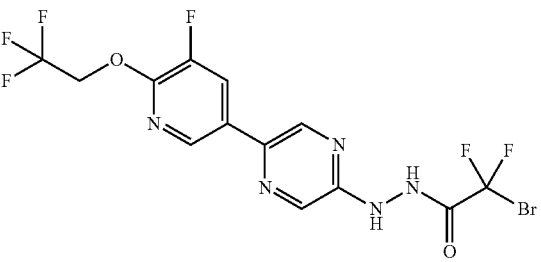

with an acid.

In other embodiments, the compound of formula (VI) is provided by contacting the compound of formula (V):

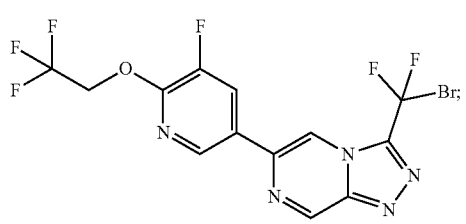

with 2-bromo-2,2-difluoro-acetyl chloride.

In certain embodiments, the compound of formula (V) is provided by contacting the compound of formula (IV):

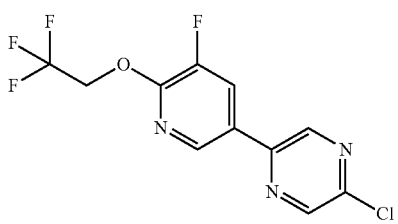

with hydrazine.

In some embodiments, the compound of formula (IV) is provided by contacting the compound of formula (III):

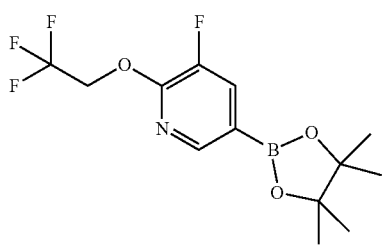

with a palladium catalyst and 2-bromo-5-chloro-pyrazine.

In other embodiments, the compound of formula (III) is provided by contacting the compound of formula (II):

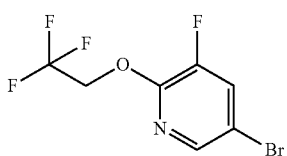

with a palladium catalyst and bis(pinacolato)diboron.

In certain embodiments, the compound of formula (II) is provided by contacting a solution of 2,2,2-trifluoroethanol with 5-bromo-2,3-difluoro-pyridine. In other embodiments, the silver catalyst is silver tetrafluoroborate. In some embodiments, the acid is p-toluenesulfonic acid. In other embodiments, the palladium catalyst is [1,1'-bis(diphenylphosphino)ferrocene]palladium(II) dichloride.

EXEMPLIFICATION

The representative examples that follow are intended to help illustrate the invention, and are not intended to, nor should they be construed to, limit the scope of the invention.
PSD particle size distribution
XRPD X-ray powder diffraction
NMR nuclear magnetic resonance
LC-MS liquid chromatography-mass spectrometry
PEG polyethylene glycol
HPLC high-performance liquid chromatography
MC methylcellulose
RH relative humidity
ASD amorphous solid dispersion
PLM polarized light microscopy
mDSC modulated differential scanning calorimetry
FaSSIF fasted state simulated intestinal fluid
UPLC ultra performance liquid chromatography
API active pharmaceutical ingredient
PVP polyvinylpyrrolidone
HPMC hydroxypropyl methylcellulose
SDS sodium dodecyl sulfate
USP United States pharmacopeia
TFA trifluoroacetic acid
ACN acetonitrile
PK pharmacokinetic
MCC microcrystalline cellulose
MgSt magnesium stearate
rpm revolutions per minute
RSD relative standard deviation
HG hard gelatin capsule
SLS sodium laureth sulfate
AUC area under the curve
$C_{max}$ maximum observed concentration
HPMCAS hydroxypropylmethylcellulose acetate succinate
PG propylene glycol
AE adverse event
ECG electrocardiogram
C-SSRS Columbia-Suicide Severity Rating Scale
$T_{max}$ time to maximum observed concentration
$t_{1/2}$ apparent terminal elimination half-life
$AUC_{0-last}$ area under the concentration-time curve from time zero to the last measurable concentration
$AUC_{0-inf}$ area under the drug concentration-time curve from time zero to infinity
CL/F clearance
$V_d$/F volume of distribution
Clr real clearance
fe fraction of dose excreted unchanged in urine
$Ae_{0-72}$ amount excreted unchanged over 72 hours
EEG electroencephalography
PD pharmacodynamic
Rac (AUC) time to steady state accumulation ratio based on AUC
Rac ($C_{max}$) accumulation ratio based on $C_{max}$
SAD single ascending dose
QTcF QT interval with Fridericia correction method
OTC over-the-counter
BLQ below the level of quantification
CV % coefficient of variation Example 1. Preparation and Characterization of Milled Compound 1

Compound 1 was milled by manual milling or jet milling to reduce particle size. For manual milling, Compound 1 was weighed into a ceramic motor and gentle milled for ~5 mins. Particle size distribution (PSD) of Compound 1 indicated D90=77.82 μm and D90=28.27 μm before and after manual milling of Compound 1. PSD via dry method was conducted by Sympatec HELOS particle size analyzer, and dispersing system and pressure were RODOS and 0.5 bar, respectively.

TABLE 1

Changes in particle size after manual milling

| Compound 1 | Before | After Manual Milling |
|---|---|---|
| D10 | 1.8 μm | 0.8 μm |
| D50 | 22.2 μm | 3.6 μm |
| D90 | 77.8 μm | 28.3 μm |

For jet milling, Compound 1 was micronized by jet milling with a yield of ~90%. Particle size of the jet-milled material was reduced to a D90 range of 4.7 to 13.5 μm.

TABLE 2

Changes in particle size after jet milling

| Compound 1, batch 1 | Before | After Jet Milling (51 g scale) |
|---|---|---|
| D10 | 1.8 μm | 0.7 μm |
| D50 | 15.4 μm | 1.8 μm |
| D90 | 80.9 μm | 4.7 μm |
| Compound 1, batch 2 | Before | After Jet Milling (95 g scale) |
| D10 | 13.2 μm | 1.1 μm |
| D50 | 67.3 μm | 3.7 μm |
| D90 | 162.1 μm | 8.3 μm |
| Compound 1, batch 3 | Before | After Jet Milling (104 g scale) |
| D10 | 14.6 μm | 0.87 μm |
| D50 | 56.8 μm | 5.58 μm |
| D90 | 104 μm | 13.5 μm |

X-ray powder diffraction (XRPD) data were collected using a Bruker D8 Advance powder diffractometer. The samples were irradiated with copper K-alpha X-rays ($\lambda$=1.54179 Å) with the generator operating at 40 kV/40 mA. The samples were scanned in continuous mode from 3° to 40° (2 θ) with a sample rotation speed of 15 rpm and a scanning rate of 10°/min. FIG. 1 shows the XRPD pattern of raw material and jet-milled material, which indicates that there is no physical form change of Compound 1 after jet-milling.

Proton NMR ($^1$H-NMR), Florine NMR ($^{19}$F-NMR) and LC-MS analyses were also carried out on Compound 1 before jet milling and after jet milling. Both the NMR results and the LC-MS results all indicate there was no observed chemical or structural change to Compound 1 due to the jet milling.

Example 2. Preparation and Stability of Formulations Comprising Compound 1

Solution Formulations
1) Prototype 1: 40% PEG 400/10% Cremophor RH40/50% Water

2400 μL PEG 400 was added to a 8 mL glass vial together with 3 mg of Compound 1 and mixed together by Vortex and sonicated for 5 min. Then 600 μL Cremophor RH40 was added to the container, mixed together by Vortex and sonicated for 5 min. Then 3000 μL water was added to the container, mixed together by Vortex and sonicated for 5 min. The compound was dissolved completely (0.5 mg/mL).

2) Prototype 2a: 58.1% Cremophor RH40+16.9% Labrafil M2125 CS+8.3% Propylene Glycol+16.7% Ethanol Vehicle preparation: 11.62 mL Cremophor RH40, 3.38 mL Labrafil M2125 CS, 1.66 mL Propylene glycol and 3.34 mL Ethanol were mixed together to get the vehicle of Prototype 2a.

About 15 mg compound were weighted to a 8 mL glass container and then 2 mL Prototype 2a was added to the glass container. The contents were mixed together by vortexing and sonication for 5 min. Compound 1 in Prototype 2a at 7.5 mg/mL was a clear solution.

3) Prototype 2b: 69.74% Cremophor RH40+20.28% Labrafil M2125 CS+9.98% Propylene Glycol.

Preparation: 11.62 mL Cremophor RH40, 3.38 mL Labrafil M2125 CS and 1.66 mL propylene glycol were mixed together to get the vehicle of Prototype 2b.

About 15 mg compound was weighed to an 8 mL glass containers and then 2 mL of Prototype 2b was added to the container and mixed together by vortex and sonicated for 5 min. Compound 2 in Prototype 2b with 7.5 mg/mL was not clear. Then another 140 μL of Prototype 2b vehicle was added to the container and mixed together by vortex and sonicated for 5 min. Prototype 2b at 7 mg/mL was a clear solution.

4) Prototype 3: 40% Transcutol HP/10% Vitamin ETPGS/50% Water

600 μL PEG 400 was added to a 4 mL glass vial together with 3 mg of Compound 1 and mixed together by Vortex and sonicated for 5 min. Then 150 μL Cremophor RH40 was added to the container and mixed together by Vortex and sonicated for 5 min. Then 750 μL water was added to the container and mixed together by vortexing and sonicated for 5 min. The compound was dissolved completely (2 mg/mL).

5) Prototype 4: 36% Cremophor RH40+45% Capmul MCM C8+9% Triethylcitrate+10% Ethanol Cremophor RH40, Capmul MCM Co, Triethylcitrate and Ethanol were added together on a weight basis to a glass container and mixed together to form a solution mixture. Increasing amounts of Compound 1 was then added to the mixture and vortexed and sonicated to form a clear solution. Additional Compound 1 was added with vortexing and sonication until Compound 1 was no longer soluble. The resulting maximum solubility was visually determined to be between 25 and 50 mg/mL.

6) Prototype 5: 40 Capryol 90+20% Labrasol+40% Transcutol HP

Capryol 90, Labrasol and Transcutol HP were added together on a volumetric basis to a glass container and mixed together to form a solution mixture. Increasing amounts of Compound 1 was then added to the mixture and vortexed and sonicated to form a clear solution. Additional Compound 1 was added with vortexing and sonication until Compound 1 was no longer soluble. The resulting maximum solubility was visually determined to be between 60 and 80 mg/mL.

Table 3 summarizes the prototypes used to prepare solution formulations of Compound 1 with their respective stability. Table 4 shows detailed stability results.

TABLE 3

Solution formulations comprising Compound 1

| Solution Formulation | Target Concentration of Compound 1 (mg/mL) | Stability Observation (room temperature storage) |
|---|---|---|
| Prototype 1 (40% PEG 400/10% Kolliphor RH40/50% water) | 0.5 | Stable for 7 days |
| Prototype 2a (58.1% KolliphorRH40 + 16.9% Labrafil M2125 CS + 8.3% Propylene glycol + 16.7% Ethanol) | 7.5 | Stable for 7 days |
| Prototype 2b (69.74% KolliphorRH40 + 20.28% Labrafil M2125 CS + 9.98% Propylene glycol | 7 2.3 (diluted in water 3 fold) | Stable for 7 days Stable for 7 days |

TABLE 3-continued

Solution formulations comprising Compound 1

| Solution Formulation | Target Concentration of Compound 1 (mg/mL) | Stability Observation (room temperature storage) |
|---|---|---|
| Prototype 3 (40% Transcutol HP/10% Vitamin ETPGS/50% water) | 2 | Stable for 7 days |

For stability and purity testing of Compound 1 a high-performance liquid chromatography (HPLC) method was developed. The HPLC method used for chemical stability and purity testing was as follows:

| Column | Agilent Pursuit XRs C18 column (150 mm* 4.6 mm* 3 μm) |
|---|---|
| Wavelength | 245 nm |
| Column Oven Temp. | 45° C. |
| Flow Rate | 1.0 mL/min |
| Injection Volume | 2 μL |
| Mobile Phases | A: 0.1% TFA in Water (v/v) B: MeOH: ACN (80:20; v/v) |

| Gradient Program | Time (min) | A % | B % |
|---|---|---|---|
| | 0.00 | 50 | 50 |
| | 30.0 | 20 | 80 |
| | 35.0 | 20 | 80 |
| | 35.1 | 50 | 50 |
| | 40.0 | 50 | 50 |

| Re-equilibration Time | 5 min |
|---|---|
| Run Time | 40 min |
| Needle Wash Solvent | ACN: Water (50:50; v/v) |
| Diluent | ACN: Water (90:10; v/v) |

TABLE 4

Detailed stability test data for Prototype 1, 2a and 3 (storage was at room temperature, 15-25° C.).

| Target Conc. (mg/mL) | Sample | Prototype 1 | | |
|---|---|---|---|---|
| | Time | Appearance | Conc. (mg/mL) | Purity (%) |
| 0.5 | 1 hr | clear | 0.53 | 98.58 |
| | 4 hrs | clear | 0.52 | 98.58 |
| | 7 days | clear | 0.43 | 97.78 |
| Target Conc. (mg/mL) | Sample | Prototype 2a | | |
| | Time | Appearance | Conc. (mg/mL) | Purity (%) |
| 7.5 | 1 hr | clear | 7.36 | 96.64 |
| | 4 hrs | clear | 7.31 | 96.45 |
| | 7 days | clear | 7.17 | 97.28 |
| Target Conc. (mg/mL) | Sample | Prototype 3 | | |
| | Time | Appearance | Conc. (mg/mL) | Purity (%) |
| 1.0 | 1 hr | clear | 1.11 | 96.87 |
| | 4 hrs | clear | 1.11 | 97.01 |
| | 7 days | clear | 1.06 | 97.59 |

About 24 mg compound of Compound 1 was added to a 8 mL glass bottle and dissolved by prototype 2b, then it was sonicated for 10 min to get a clear solution with concentration at 7 mg/mL. After that, the solution was diluted 3 times with water for stability test. Results are as showed in Table 5 below.

TABLE 5

Detailed stability test data for Prototype 2b

| Sample | Time | Appearance | Target Conc. (mg/mL) | Conc. (mg/mL) | Purity (%) |
|---|---|---|---|---|---|
| Prototype 2b diluted in water 3 times | initial | clear | 2.33 | — | — |
| | 24 h | clear | | 2.19 | 99.56 |
| | 72 h | clear | | 2.23 | 99.83 |
| | 7 days | clear | | 2.45 | 99.65 |

Based on HPLC results and appearance, the Prototype 1, 2a, 2b and 3 formulations comprising Compound 1 was stable at ambient condition for at least 7 days.

Suspension Formulations

To prepare suspension formulations of Compound 1, about 0.5 mg, 5 mg and 10 mg of Compound 1 were weighted into separate vials and 1 mL 0.5% MC 400 cP/0.2% Tween 80 was added to each vial. The materials were mixed together by Vortex and stirred at room temperature overnight (24 hrs). The stability of the suspension formulations was measured by quantifying the purity of Compound 1 using high pressure liquid chromatography (HPLC). The suspensions remained as homogenous suspensions. Table 6 summarizes the stability results.

To prepare a suspension formulation comprising jet-milled Compound 1, 15 mg of jet-milled Compound 1 was weighed into a glass vial and then 10 mL of vehicle (0.5% MC 400 cP/0.2% Tween 80) was added to disperse it to reach Compound 1 concentration of 1.5 mg/mL. The suspension was thoroughly dispersed by homogenization for ~30 seconds. The stability of the suspension was evaluated by HPLC and particle size distribution (PSD), and the results are summarized in Table 7. Based on HPLC and PSD, the suspension formulation comprising jet-milled Compound 1 was stable at ambient condition for 28 days.

TABLE 6

Stability of Compound 1 suspension formulations in 0.5% MC 400 cP/0.2% Tween 80.

| Target Concentration (mg/mL) | Time point | Concentration (mg/mL) | Purity (%) |
|---|---|---|---|
| 10 | 1 hr | 9.69 | 96.86 |
| | 4 hrs | 9.79 | 97.12 |
| | 7 days | 9.72 | 96.71 |
| 5 | 1 hr | Not available | 97.60 |
| | 4 hrs | 4.72 | 97.84 |
| | 7 days | 5.06 | 96.95 |
| 0.5 | 1 hr | 0.58 | 97.46 |
| | 4 hrs | 0.45 | 96.65 |
| | 7 days | 0.49 | 97.85 |
| 1.5* | 1 day | 1.44 | 99.4 |
| | 6 days | 1.43 | 99.5 |

Un-milled Compound 1 unless noted.
*designates jet milled material.

TABLE 7

Stability of suspension formulation in 0.5% MC 400 cP/0.2% Tween 80 comprising jet-milled Compound 1

| Target Conc. (mg/mL) | Time point at RT (day) | Appearance | Conc. (mg/mL) | Purity (%) | PSD (D90, um) |
|---|---|---|---|---|---|
| 1.5 | Initial | Homogeneous suspension | 1.61 | 99.43 | — |

TABLE 7-continued

Stability of suspension formulation in 0.5% MC 400 cP/0.2% Tween 80 comprising jet-milled Compound 1

| Target Conc. (mg/mL) | Time point at RT (day) | Appearance | Conc. (mg/mL) | Purity (%) | PSD (D90, um) |
|---|---|---|---|---|---|
| | 1 | Homogeneous suspension | 1.44 | 99.44 | — |
| | 2 | Homogeneous suspension | 1.38 | 99.52 | — |
| | 3 | Homogeneous suspension | 1.58 | 99.49 | — |
| | 6 | Homogeneous suspension | 1.43 | 99.51 | — |
| | 7 | Homogeneous suspension | 1.61 | 99.55 | — |
| | 14 | Homogeneous suspension | 1.61 | 99.36 | — |
| | 21 | Homogeneous suspension | 1.56 | 99.58 | 6.97 |
| | 28 | Homogeneous suspension | 1.64 | 98.96 | 6.80 |

As shown in Tables 9-11, various suspension formulations were tested for stability under different conditions.

To prepare a suspension weigh required amount of milled Compound 1 into a glass container and add corresponding volume of the vehicle. Thoroughly disperse the compound into a homogenous suspension using an overhead mixer at the final concentration target. Concentrations were prepared at 0.1 mg/mL and at 10 mg/mL. The suspension products were physically evaluated on visual appearance, concentration, purity and PSD.

The vehicles are prepared by dissolving 0.5% by weight of either 400 cP methylcellulose or 4000 cP methylcellulose and 0.2% Poloxamer 188. For the preserved suspensions, additionally 1.0% by volume of paraben preservative solution was dissolved into vehicle using an overhead mixer. The paraben preservative solution was prepared by dissolving 0.10 g methyl paraben, 0.025 g propylparaben in 9.875 g propylene glycol dissolved by mixing with a stir bar at room temperature for 1 hour.

TABLE 8

Visual Stability Evaluation of suspension formulations comprising Compound 1 after 1, 4, and 24 hours at room temperature

| Vehicle | Target Concentration (mg/mL) | Hours at RT | Visual Appearance (see reference key) |
|---|---|---|---|
| 0.5% 400 cP MC, 0.2% Poloxamer 188 and 1.0% of paraben preservative solution | 0.1 | 1 | * |
| | | 4 | * |
| | | 24 | * |
| | 10 | 1 | * |
| | | 4 | * |
| | | 24 | * |
| 0.5% 4000 cP MC, 0.2% Poloxamer 188 and 1.0% of paraben preservative solution | 0.1 | 1 | # |
| | | 4 | # |
| | | 24 | # |
| | 10 | 1 | # |
| | | 4 | # |
| | | 24 | # |
| 0.5% 400 cP MC, 0.2% Poloxamer 188 | 0.1 | 1 | * |
| | | 4 | * |
| | | 24 | * |
| | 10 | 1 | * |
| | | 4 | * |
| | | 24 | * |
| 0.5% 4000 cP MC, 0.2% Poloxamer 188 | 0.1 | 1 | # |
| | | 4 | # |
| | | 24 | # |
| | 10 | 1 | # |
| | | 4 | # |
| | | 24 | # |

\* homogeneous suspension initially, sedimentation occurred over time and returned to homogeneous after gentle agitation
\# viscous homogeneous suspension initially, sedimentation occurred over time and returned to homogeneous after gentle agitation

TABLE 9

Stability of suspension formulations comprising Compound 1 after 96 hours at room temperature

| Vehicle | Target Conc. (mg/mL) | Hours at RT | Visual Appearance |
|---|---|---|---|
| 0.5% 400 cP MC, 0.2% Poloxamer 188 and 1.0% of paraben preservative solution | 0.1 | 96 | * |
| | 10 | 96 | * |
| 0.5% 4000 cP MC, 0.2% Poloxamer 188 and 1.0% of paraben preservative solution | 0.1 | 96 | # |
| | 10 | 96 | # |
| 0.5% 400 cP MC, 0.2% Poloxamer 188 | 0.1 | 96 | * |
| | 10 | 96 | * |
| 0.5% 4000 cP MC, 0.2% Poloxamer 188 | 0.1 | 96 | # |
| | 10 | 96 | # |

\* homogeneous suspension initially, sedimentation occurred over time and returned to homogeneous after gentle agitation for ~1 min
\# viscous homogeneous suspension initially, sedimentation occurred over time and returned to homogeneous after gentle agitation for ~2 mins

TABLE 10

Stability of suspension formulations comprising Compound 1 at 2-8° C.

| Vehicle | Target Conc. (mg/mL) | Time point at 2-8° C. | Appearance | Conc. (mg/mL) | Purity (%) | PSD (D90, μm) |
|---|---|---|---|---|---|---|
| 0.5% 400 cP MC, 0.2% Poloxamer 188 | 0.1 | 0 | * | 0.11 | 100 | 19.9 |
| | | 7 D | * | 0.12 | 100 | 18.2 |
| | | 14 D | * | 0.11 | 100 | 14.2 |
| | | 28 D | * | 0.11 | 100 | 15.4 |
| | | 2 M | * | 0.11 | 95.87 | 9.1 |
| | | 3 M | * | 0.11 | 93.20 | 12.7 |
| | 10 | 0 | * | 10.04 | 99.83 | 5.6 |
| | | 7 D | * | 10.18 | 99.83 | 6.4 |
| | | 14 D | * | 10.66 | 99.83 | 5.4 |

TABLE 10-continued

Stability of suspension formulations comprising Compound 1 at 2-8° C.

| Vehicle | Target Conc. (mg/mL) | Time point at 2-8° C. | Appearance | Conc. (mg/mL) | Purity (%) | PSD (D90, μm) |
|---|---|---|---|---|---|---|
|  |  | 28 D | * | 10.56 | 99.83 | 3.8 |
|  |  | 2 M | * | 10.99 | 99.83 | 4.0 |
|  |  | 3 M | * | 10.13 | 99.83 | 3.6 |

* homogeneous suspension initially, sedimentation occurred over time and returned to homogeneous after gentle agitation for ~1 min

TABLE 11

Stability of suspension formulations comprising Compound 1 at 25° C./60% RH

| Vehicle | Target Conc. (mg/mL) | Time point at 25° C./60% RH | Appearance | Conc. (mg/mL) | Purity (%) | PSD (D90, μm) |
|---|---|---|---|---|---|---|
| 0.5% 400 cP MC, 0.2% Poloxamer 188 | 0.1 | 0 | * | 0.11 | 100.0 | 19.9 |
|  |  | 7 D | * | 0.11 | 100.0 | 19.9 |
|  |  | 14 D | * | 0.11 | 100 | 12.9 |
|  |  | 28 D | * | 0.10 | 100 | 8.7 |
|  |  | 2 M | * | 0.11 | 95.87 | 8.6 |
|  |  | 3 M | * | 0.11 | 93.20 | 11.1 |
|  | 10 | 0 | * | 10.04 | 99.83 | 5.6 |
|  |  | 7 D | * | 10.48 | 99.83 | 6.3 |
|  |  | 14 D | * | 9.85 | 99.83 | 5.2 |
|  |  | 28 D | * | 10.00 | 99.83 | 4.6 |
|  |  | 2 M | * | 10.47 | 99.83 | 4.3 |
|  |  | 3 M | * | 10.16 | 99.83 | 3.5 |

* homogeneous suspension initially, sedimentation occurred over time and returned to homogeneous after gentle agitation for ~1 min Amorphous Solid Dispersion (ASD)

Amorphous solid dispersion including Compound 1 was prepared with a mixture of Compound 1 and polymer. Nine ASD formulations were prepared using for screening 9 different polymers as the solid dispersant (PVPK30, PVPVA64, Soluplus, HPMC E5, HPMC ASMG, HPMC ASMF, HPMC ASHG, Eudragit EPO, Eudragit L100). About 10 mg of Compound 1 and 40 mg of corresponding polymer were weighed into 40-mL glass vials, and dissolved in 1 mL of MeOH/DCM (1:1, v/v) to prepare stock solution. The obtained clear solutions were stored under 70° C. to be fast evaporated to yield solid dispersion. The product after evaporation was dried under vacuum at 30° C. overnight and further characterized by appearance, PLM, XRPD and mDSC.

The nine ASD formulations were tested for kinetic solubility in FaSSIF at the concentration of 2 mg/mL. The experiment was run at 37° C. with the rate of 450 rpm. 0.5 mL of the mixture was taken out at each time point and centrifuged before running UPLC (a shortened runtime version of the described HPLC method was used to determine the Compound 1 levels). The results are listed in Table 12. Solubility enhancement was observed for most polymer especially for Eudragit EPO.

TABLE 12

Summary of kinetic solubility of the ASDs

| No. | SD formulation | Kinetic solubility in FaSSIF (μg/mL) | | | | Final pH |
|---|---|---|---|---|---|---|
|  |  | 15 min | 30 min | 60 min | 120 min |  |
| 0 | Crystalline API (API = Compound 1) | 5.7 | 8.1 | 7.1 | 11.6 | 6.54 |
| 1 | API + PVP K30 | 4.9 | 6.0 | 5.8 | 6.7 | 6.55 |
| 2 | API + PVP VA64 | 4.8 | 5.7 | 5.2 | 5.2 | 6.54 |
| 3 | API + Soluplus | 12.9 | 19.1 | 17.5 | 18.7 | 6.56 |
| 4 | API + HPMC E5 | 8.8 | 8.2 | 7.9 | 7.6 | 6.57 |
| 5 | API + HPMC ASMG | 21.7 | 24.7 | 26.9 | 22.1 | 5.92 |
| 6 | API + HPMC ASMF | 20.3 | 26.2 | 24.4 | 31.4 | 5.96 |
| 7 | API + HPMC ASHG | 28.4 | 24.2 | 21.9 | 20.9 | 6.49 |
| 8 | API + Eudragit EPO | 111.0 | 207.0 | 273.3 | 327.2 | 7.21 |
| 9 | API + Eudragit L100 | 19.2 | 16.2 | 19.6 | 26.6 | 5.59 |

Based on kinetic solubility evaluation of the prototype ASD formulation. Three example prototype ASD formulations were then prepared for further evaluations using Soluplus, Eudragit L100, or HPMC ASMF and are summarized in Table 13. The stability test results of selected ASD formulations are shown in Tables 14 and 15.

TABLE 13

Summary of selected ASD formulations

| Compound 1 | ASD + Soluplus | ASD + Eudragit L100 | ASD + HPMC ASMF |
|---|---|---|---|
| Appearance | White powder | White powder | White powder |
| PLM | No birefringence and spherical shape | | |
| XRPD | Amorphous | Amorphous | Amorphous |
| Tg by mDSC (° C.) | 91.65 | 90.83 | 91.34 |
| HPLC test Drug load (w %) | 18.9 | 19.3 | 18.1 |
| Purity (A %) | 99.01 | 98.71 | 97.61 |
| Kinetic SolKinetic Sol in FASSIF (ug/mL) at 120 min | 19 | 21 | 31 |

Scale Up of Three ASDs with a Spray Dryer

ASD-1 preparation: About 300 mg Compound 1 and about 1200 mg Soluplus were weighed into a 250 mL glass, then 150 mL acetone was added into to make a clear solution before spray drying. After spray drying, the powder was collected and dried under vacuum condition at 30° C. for 12 hrs (yield of 80.2%).

ASD-2 preparation: About 300 mg Compound 1 and about 1200 mg Eudragit L100 were weighed into a 250 mL glass, then 150 mL acetone was added into to make a clear solution before spray drying. After spray drying, the powder was collected and dried under vacuum condition at 30° C. for 12 hrs (yield of 74.5%).

ASD-3 preparation: About 300 mg Compound 1 and about 1200 mg HPMC ASMF were weighed into a 250 mL glass, then 150 mL acetone was added into to make a clear solution before spray drying. After spray drying, the powder was collected and dried under vacuum condition at 30° C. for 12 hrs (yield of 70.08).

The ASD-3 prototype was also evaluated in an in vitro dissolution study. The ASD-3 spray dried powder which was collected was hand-weighed on an analytical balance directly into a size #4 hard-gelatin capsules at two dose strengths: 2.5 and 10 mg of active (13.7 and 54.8 mg of ASD).

TABLE 14

Stability results after 1 week of selected ASD formulations

| SD Formulation | Initial drug load (%) | Initial purity (%) | Storage condition | XRPD | After 1 week HPLC results Drug load (%) | Purity (%) |
|---|---|---|---|---|---|---|
| ASD_Soluplus | 18.9 | 98.68 | 25° C./60% RH, open | Partially crystalline | 20.80 | 96.40 |
| | | | 40° C./75% RH, open | Partially crystalline | 19.82 | 95.81 |
| | 18.86 | 97.81 | 25° C./60% RH, closed | Partially crystalline | 18.69 | 97.49 |
| | | | 60° C., closed | Partially crystalline | 18.65 | 96.86 |
| ASD_Eudragit L100 | 19.1 | 97.58 | 25° C./60% RH, open | Amorphous | 19.86 | 96.79 |
| | | | 40° C./75% RH, open | Amorphous | 20.00 | 96.35 |
| | 19.12 | 97.31 | 25° C./60% RH, closed | Amorphous | 18.62 | 96.86 |
| | | | 60° C., closed | Amorphous | 18.63 | 96.48 |
| ASD_HPMC ASMF | 18.1 | 96.42 | 25° C./60% RH, open | Amorphous | 17.44 | 94.40 |
| | | | 40° C./75% RH, open | Partially crystalline | 17.33 | 94.74 |
| | 17.81 | 95.17 | 25° C./60% RH, closed | Amorphous | 17.32 | 95.44 |
| | | | 60° C., closed | Amorphous | 17.38 | 94.93 |

TABLE 15

Stability results after 2 weeks

| SD Formulation | Initial drug load (%) | Initial purity (%) | Storage condition | XRPD | After 2 weeks HPLC results Drug load (%) | Purity (%) |
|---|---|---|---|---|---|---|
| ASD_Soluplus | 18.9 | 98.68 | 25° C./60% RH, open | Partially crystalline | 21.29 | 97.24 |
| | | | 40° C./75% RH, open | Partially crystalline | 20.43 | 95.23 |
| | 18.86 | 97.81 | 25° C./60% RH, closed | Partially crystalline | 17.92 | 94.01 |
| | | | 60° C., closed | Partially crystalline | 18.69 | 93.41 |
| ASD_Eudragit L100 | 19.1 | 97.58 | 25° C./60% RH, open | Amorphous | 19.57 | 97.21 |
| | | | 40° C./75% RH, open | Amorphous | 19.99 | 95.84 |
| | 19.12 | 97.31 | 25° C./60% RH, closed | Amorphous | 18.89 | 96.53 |
| | | | 60° C., closed | Partially crystalline | 18.54 | 96.09 |
| ASD_HPMC ASMF | 18.1 | 96.42 | 25° C./60% RH, open | Amorphous | 17.69 | 94.32 |
| | | | 40° C./75% RH, open | Partially crystalline | 17.77 | 95.70 |
| | 17.81 | 95.17 | 25° C./60% RH, closed | Amorphous | 17.93 | 94.01 |
| | | | 60° C., closed | Partially crystalline | 17.33 | 94.54 |

The dissolution method used the following conditions:

| Parameters | Setting |
|---|---|
| Instrument | Agilent 708-DS |
| Media | 0.1N HCl with 2% SDS |
| Apparatus | USP Apparatus 2 (paddle) |
| Rotation Speed | 75 rpm (200 rpm for infinity spin) |
| Media Volume | 900 mL |
| Temperature | 37.0 ± 0.5° C. |
| Sampling time point | 15, 30, 45, 60 mins and infinity at 120 mins |

For the dissolution analysis a HPLC method was used for quantifying Compound 1 levels in the dissolution media. The same HPLC method was used for both dissolution and content uniformity testing. The HPLC method used is as follows:

| Column | Agilent Pursuit XRs C18 column (150 mm* 4.6 mm* 3 μm) |
|---|---|
| Wavelength | 245 nm |
| Column Oven Temp. | 45° C. |
| Flow Rate | 1.0 mL/min |
| Injection Volume | 2 μL |
| Mobile Phases | A: 0.1% TFA in Water (v/v) |
| | B: MeOH: ACN (80:20; v/v) |

| Gradient Program | Time (min) | A % | B % |
|---|---|---|---|
| | 0.00 | 70 | 30 |
| | 10.00 | 0 | 100 |

| Re-equilibration Time | 2 min |
|---|---|
| Run Time | 10 min |
| Needle Wash Solvent | ACN: Water (50:50; v/v) |
| Diluent | ACN: Water (90:10; v/v) |

Figure 2:
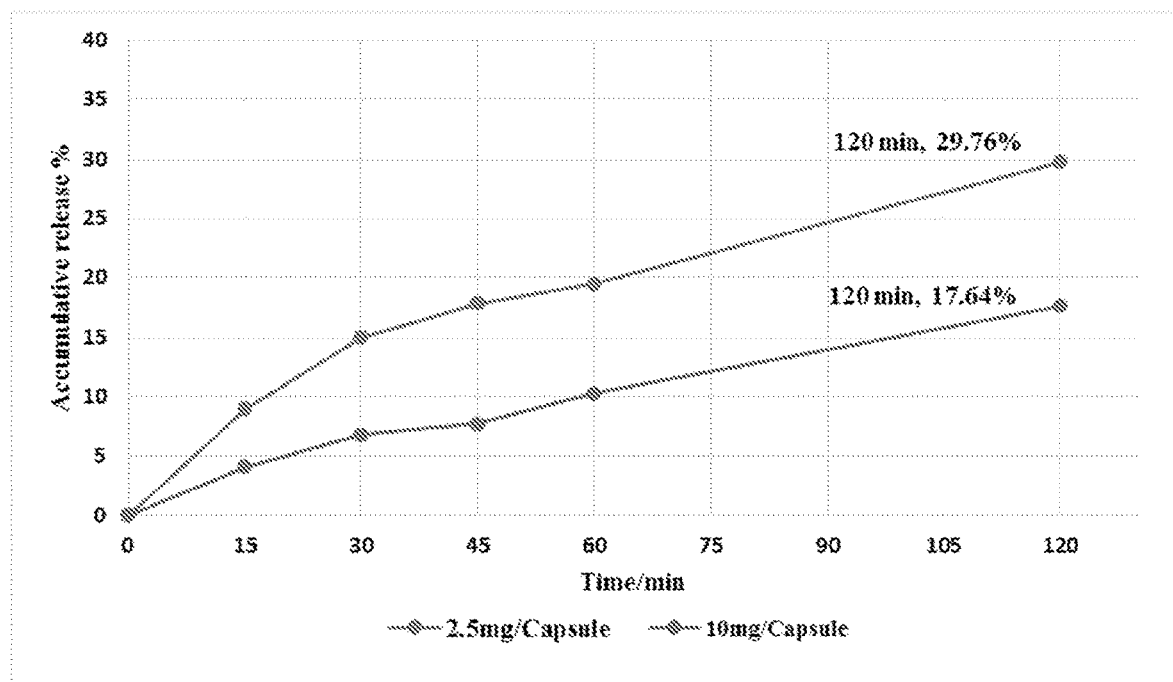
FIG. 2 shows dissolution result of ASD in capsule (2.5 mg and 10 mg active).

The dissolution results are shown in FIG. 2, where the release of two dose strengths were 29.76% and 17.64% for the 2.5 mg and 10 mg dose strengths, respectively.

The ASD-3 prototype was also evaluated in a pharmacokinetic (PK) study in cynomolgus monkeys using a crossover study design. The ASD-3 spray dried powder which was collected was hand-weighed on an analytical balance directly into a size #4 hard-gelatin capsules. Three male monkeys were orally administered 0.5 mg/kg of body weight in a fasted state and plasma samples were analyzed for Compound 1 levels.

Capsule Formulations

Exemplary capsule formulations include 2.5 mg, 10 mg, or 100 mg of Compound 1 per capsule. For the 2.5 mg dose capsule, a formulation includes 1:10 blend of Compound 1 to microcrystalline cellulose (MCC) with 2% magnesium stearate (MgSt) in a gelatin capsule, and another formulation includes 2.5 mg neat Compound 1 in a gelatin capsule (with no additional excipients).

Milled Compound 1 and filler (MCC or starch) were weighed separately and blended for 15 mins to get a homogenous mixture. A required amount of magnesium stearate was added and blended together. Blend was hand filled in appropriately sized hard gelatin capsules. Samples were then subjected to stability at different conditions and analyzed for appearance, assay at different time points.

Blend Formulations

Blend 1 and 2 (1:10 Blending)

1 g of milled Compound 1 and 9 g of MCC or starch were weighed into a container. The two components were blended by Turbula for about 15 mins at a speed of 36 rpm to obtain homogeneous phase. 0.2 g of MgSt was added and mixed for another 3 mins to obtain homogeneous blend 1 (Table 16). Dose uniformity was assessed by measuring 10 capsules assay (Tables 18 and 19).

TABLE 16

Composition of Blend 1 and 2

| Components | Function | Percentage (w/w %) |
|---|---|---|
| Blend 1 | | |
| Compound 1 | Active | 10 |
| MCC | Filler | 90 |
| MgSt | Lubricant | 2 |
| Blend 2 | | |
| Compound 1 | Active | 10 |
| Starch | Filler | 90 |
| MgSt | Lubricant | 2 |

Blend 3 and 4B (1:1 Blending)

5 g of milled Compound 1 and 5 g of MCC or starch were weighed into a container. The two components were blended by Turbula for about 15 mins at a speed of 36 rpm to obtain homogeneous phase. 0.2 g of MgSt was added and mixed for another 3 mins to obtain homogeneous blend 1 (Table 17). Dose uniformity was assessed by measuring 10 capsules assay (Table 20 and 21).

TABLE 17

Composition of Blend 3 and 4

| Components | Function | Percentage (w/w %) |
|---|---|---|
| Blend 3 | | |
| Compound 1 | Active | 50 |
| MCC | Filler | 50 |
| MgSt | Lubricant | 2 |
| Blend 4 | | |
| Compound 1 | Active | 50 |
| Starch | Filler | 50 |
| MgSt | Lubricant | 2 |

Tables 19-21 summarize blend uniformity results for 4 exemplary blends (blends 1-4 as described above) comprising Compound 1.

TABLE 18

1:10 blend uniformity results of blend 1

| Sampling location | Sample weight (mg) | Label claim (%) | Average (%) | RSD (%) |
|---|---|---|---|---|
| Top-1 | 7.79 | 97.95 | 94.18 | 3.97 |
| Top-2 | 7.36 | 92.36 | | |
| Top-3 | 9.16 | 95.09 | | |
| Middle-1 | 7.89 | 86.96 | | |
| Middle-2 | 10.69 | 88.58 | | |
| Middle-3 | 7.58 | 96.55 | | |
| Middle-4 | 6.79 | 94.81 | | |
| Bottom-1 | 7.86 | 96.96 | | |
| Bottom-2 | 7.62 | 95.47 | | |
| Bottom-3 | 6.62 | 97.1 | | |

TABLE 19

1:10 blend uniformity results of blend 2

| Sampling location | Sample weight (mg) | Label claim (%) | Average (%) | RSD (%) |
|---|---|---|---|---|
| Top-1 | 11.83 | 88.66 | 93.21 | 4.34 |
| Top-2 | 11.47 | 96.28 | | |
| Top-3 | 6.91 | 93.45 | | |
| Middle-1 | 8.51 | 94.50 | | |
| Middle-2 | 7.66 | 96.34 | | |
| Middle-3 | 11.95 | 91.53 | | |
| Middle-4 | 8.54 | 87.87 | | |
| Bottom-1 | 10.45 | 99.85 | | |
| Bottom-2 | 8.49 | 88.20 | | |
| Bottom-3 | 11.13 | 95.44 | | |

TABLE 20

1:1 blend uniformity results of blend 3

| Sampling location | Sample weight (mg) | Label claim (%) | Average (%) | RSD (%) |
|---|---|---|---|---|
| Top-1 | 15.15 | 93.46 | 93.88 | 3.13 |
| Top-2 | 15.05 | 94.84 | | |
| Top-3 | 16.92 | 99.64 | | |
| Middle-1 | 12.89 | 89.67 | | |
| Middle-2 | 14.96 | 94.61 | | |
| Middle-3 | 16.38 | 91.61 | | |
| Middle-4 | 17.46 | 92.68 | | |
| Bottom-1 | 18.32 | 95.81 | | |
| Bottom-2 | 16.61 | 90.56 | | |
| Bottom-3 | 16.63 | 95.89 | | |

TABLE 21

1:1 blend uniformity results of blend 4

| Sampling location | Sample weight (mg) | Label claim (%) | Average (%) | RSD (%) |
|---|---|---|---|---|
| Top-1 | 20.62 | 95.48 | 94.26 | 3.83 |
| Top-2 | 18.01 | 95.94 | | |
| Top-3 | 22.95 | 87.41 | | |
| Middle-1 | 14.98 | 88.62 | | |
| Middle-2 | 21.74 | 95.24 | | |
| Middle-3 | 17.47 | 92.89 | | |
| Middle-4 | 14.34 | 94.80 | | |
| Bottom-1 | 17.35 | 96.73 | | |
| Bottom-2 | 15.16 | 98.25 | | |
| Bottom-3 | 22.29 | 97.25 | | |

Tables 21.1, 21.2, 21.3 and 21.4 show the stability results of Blend 1 capsules and Blend 2 capsules at dose strengths of 1 mg per capsule (1:10 blend ratio), 10 mg per capsule (1:10 and 50:50 blend ratios), and 100 mg per capsule (50:50 blend ratio).

TABLE 21.1

Stability of 1 mg active blend in capsule at 25° C./60% RH

| Capsule | Time | Appearance | Assay (%) | Purity (%) |
|---|---|---|---|---|
| \multicolumn{5}{l}{1 mg dose in 1:10 blend 1 (MCC) at 25 C./60% RH} | | | | |
| Size #0 HG | 0 | Blend in opaque white capsule | 100.00 | 99.83 |
| | 7 D | Blend in opaque white capsule | 98.50 | 99.83 |
| | 14 D | Blend in opaque white capsule | 99.00 | 99.83 |
| | 28 D | Blend in opaque white capsule | 102.76 | 99.83 |
| | 2 M | Blend in opaque white capsule | 100.69 | 99.83 |
| | 3 M | Blend in opaque white capsule | 100.58 | 99.83 |
| \multicolumn{5}{l}{1 mg dose in 1:10 blend 2 (Starch) at 25° C./60% RH} | | | | |
| Size #0 HG | 0 | Blend in opaque white capsule | 100.00 | 99.83 |
| | 7 D | Blend in opaque white capsule | 99.78 | 99.83 |
| | 14 D | Blend in opaque white capsule | 97.60 | 99.83 |
| | 28 D | Blend in opaque white capsule | 98.56 | 99.83 |
| | 2 M | Blend in opaque white capsule | 98.50 | 99.83 |
| | 3 M | Blend in opaque white capsule | 97.97 | 99.83 |

TABLE 21.2

Stability of 10 mg active 1:10 blend in capsule at 25° C./60% RH

| Capsule | Time | Appearance | Assay (%) | Purity (%) |
|---|---|---|---|---|
| \multicolumn{5}{l}{10 mg dose in 1:10 blend 1 (MCC) at 25° C./60% RH} | | | | |
| Size #0 HG | 0 | Blend in opaque white capsule | 100.00 | 99.83 |
| | 7 D | Blend in opaque white capsule | 99.70 | 99.83 |
| | 14 D | Blend in opaque white capsule | 96.58 | 99.83 |
| | 28 D | Blend in opaque white capsule | 101.47 | 99.83 |
| | 2 M | Blend in opaque white capsule | 99.14 | 99.83 |
| | 3 M | Blend in opaque white capsule | 102.19 | 99.83 |
| \multicolumn{5}{l}{10 mg dose in 1:10 blend 2 (Starch) at 25° C./60% RH} | | | | |
| Size #0 HG | 0 | Blend in opaque white capsule | 100.00 | 99.83 |
| | 7 D | Blend in opaque white capsule | 99.23 | 99.83 |
| | 14 D | Blend in opaque white capsule | 98.70 | 99.83 |
| | 28 D | Blend in opaque white capsule | 99.45 | 99.83 |
| | 2 M | Blend in opaque white capsule | 100.29 | 99.83 |
| | 3 M | Blend in opaque white capsule | 99.99 | 99.83 |

TABLE 21.3

Stability of 10 mg active 50:50 blend in capsule at 25° C./60% RH

| Capsule | Time | Appearance | Assay (%) | Purity (%) |
|---|---|---|---|---|
| \multicolumn{5}{l}{10 mg dose in 50:50 blend 1 (MCC) at 25° C./60% RH} | | | | |
| Size #0 HG | 0 | Blend in opaque white capsule | 100.00 | 99.83 |
| | 7 D | Blend in opaque white capsule | 98.90 | 99.83 |
| | 14 D | Blend in opaque white capsule | 101.36 | 99.83 |
| | 28 D | Blend in opaque white capsule | 100.42 | 99.83 |
| | 2 M | Blend in opaque white capsule | 101.94 | 99.83 |
| | 3 M | Blend in opaque white capsule | 100.97 | 99.83 |
| \multicolumn{5}{l}{10 mg dose in 50:50 blend 2 (Starch) at 25° C./60% RH} | | | | |
| Size #0 HG | 0 | Blend in opaque white capsule | 100.00 | 99.83 |
| | 7 D | Blend in opaque white capsule | 99.78 | 99.83 |
| | 14 D | Blend in opaque white capsule | 98.42 | 99.83 |
| | 28 D | Blend in opaque white capsule | 98.98 | 99.83 |
| | 2 M | Blend in opaque white capsule | 101.14 | 99.83 |
| | 3 M | Blend in opaque white capsule | 102.01 | 99.83 |

TABLE 21.4

Stability of 100 mg active 50:50 blend in capsule at 25° C./60% RH

| Capsule | Time | Appearance | Assay (%) | Purity (%) |
|---|---|---|---|---|
| 100 mg dose in 50:50 blend 1 (MCC) at 25° C./60% RH ||||| 
| Size #0 HG | 0 | Blend in opaque white capsule | 100.00 | 99.83 |
|  | 7 D | Blend in opaque white capsule | 102.11 | 99.83 |
|  | 14 D | Blend in opaque white capsule | 101.52 | 99.83 |
|  | 28 D | Blend in opaque white capsule | 99.93 | 99.83 |
|  | 2 M | Blend in opaque white capsule | 101.54 | 99.83 |
|  | 3 M | Blend in opaque white capsule | 101.33 | 99.83 |
| 100 mg dose in 50:50 blend 2 (Starch) at 25° C./60% RH |||||
| Size #0 HG | 0 | Blend in opaque white capsule | 100.00 | 99.83 |
|  | 7 D | Blend in opaque white capsule | 100.70 | 99.83 |
|  | 14 D | Blend in opaque white capsule | 102.06 | 99.83 |
|  | 28 D | Blend in opaque white capsule | 98.13 | 99.83 |
|  | 2 M | Blend in opaque white capsule | 100.85 | 99.83 |
|  | 3 M | Blend in opaque white capsule | 103.63 | 99.83 |

The dissolution of Blend 1 at the 1:10 Compound 1 to MCC ratio in size #0 HG capsules was evaluated at both 1 and 10 mg of active (10 and 100 mg of blend with MCC, respectively).

The dissolution method used the following conditions:

| Parameters | Setting |
|---|---|
| Instrument | Agilent 708-DS |
| Media | 0.1N HCl with 2% SDS |
| Apparatus | USP Apparatus 2 (paddle) |
| Rotation Speed | 75 rpm (200 rpm for infinity spin) |
| Media Volume | 900 mL |
| Temperature | 37.0 ± 0.5° C. |
| Sampling time point | 15, 30, 45, 60 mins and infinity at 120 mins |

Figure 3:
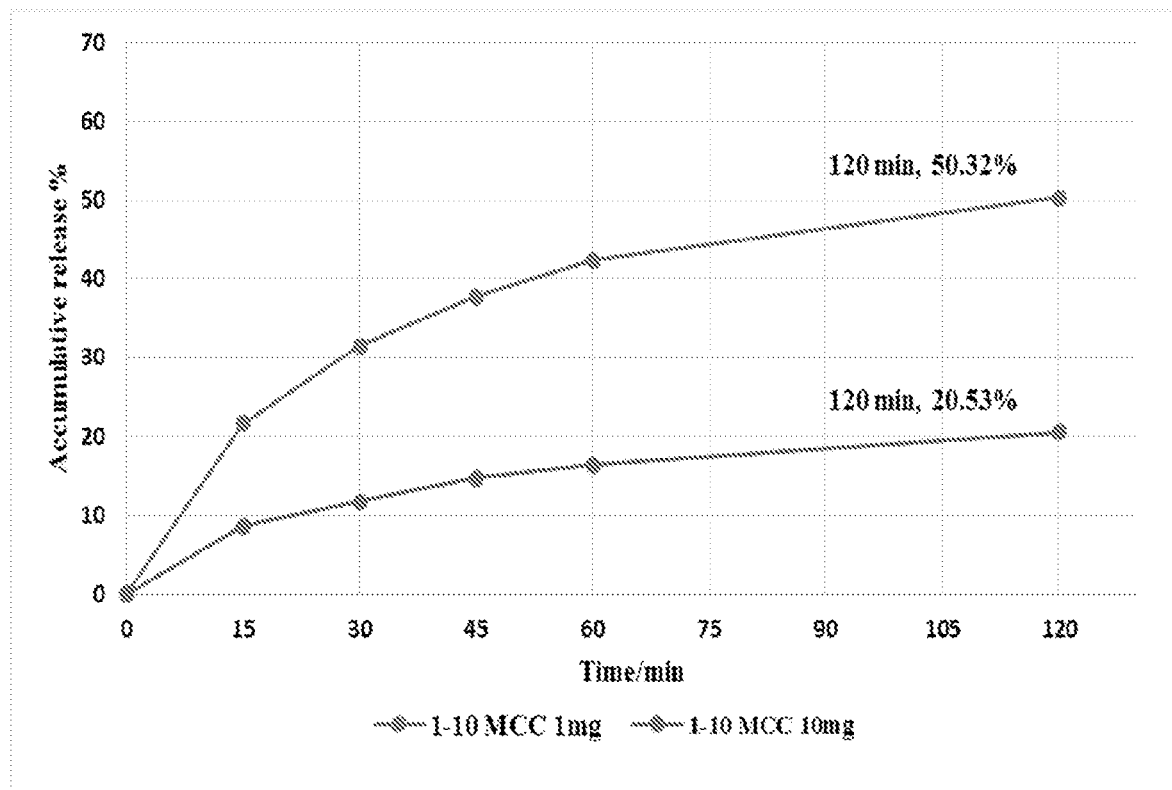
FIG. 3 shows dissolution result of 1:10 blend with MCC in capsule (1 and 10 mg active).

The results are showing in FIG. 3, where 50.3% of the 1 mg dose strength capsule released after 120 minutes, and 20.5% of the 10 mg dose strength capsule released after 120 minutes.

A further prototype blend capsule formulation was prepared to evaluate the effect of adding surfactant to the 1:10 MCC capsule blend (Blend 1). A 1:10 Compound 1:MCC with 2% SLS (25 mg of blend and 0.5 mg SLS) was hand filled into size #4 hard gelatin capsules (dose level was 2.5 mg of active per capsule) for evaluation in a stability study (Table 21.3), cross-over monkey PK study and dissolution test.

TABLE 21.5

Stability of 2.5 mg active 1:10 blend with 2% surfactant

| Capsule | Time (Day) | Appearance | Assay (%) | Purity (%) |
|---|---|---|---|---|
| 2.5 mg dose in blend MCC with 2% SLS at RT for monkey PK study |||||
| Size #4 HG | 0 | Blend in opaque white capsule | 100.00 | 99.83 |
|  | 7 | Blend in opaque white capsule | 101.98 | 99.83 |
| 2.5 mg dose in blend MCC with 2% Poloxamer 188 at RT for monkey PK study |||||
| Size #4 HG | 0 | Blend in opaque white capsule | 100.00 | 99.83 |
|  | 7 | Blend in opaque white capsule | 97.39 | 99.83 |

Three male monkeys were orally administered 0.5 mg/kg of body weight in a fasted state and plasma samples were analyzed for Compound 1 levels. The resulting Compound 1 levels in the plasma showed no significant increase in exposure for the MCC blend capsule with surfactant (area-under the curve from 0 to infinity, AUC[0–inf]=1,004 ng-hr/mL) compared to without surfactant (AUC[0–inf]=994 ng-hr/mL).

The Blend 1 MCC capsules with and without surfactant were also evaluated in an in vitro dissolution study at a dose strength of 2.5 mg Compound 1.

The dissolution method used the following conditions:

| Parameters | Setting |
|---|---|
| Instrument | Agilent 708-DS |
| Media | 0.1N HCl with 2% SDS |
| Apparatus | USP Apparatus 2 (paddle) |
| Rotation Speed | 75 rpm (200 rpm for infinity spin) |
| Media Volume | 900 mL |
| Temperature | 37.0 ± 0.5° C. |
| Sampling time point | 15, 30, 45, 60 mins and infinity at 120 mins |

Figure 4:
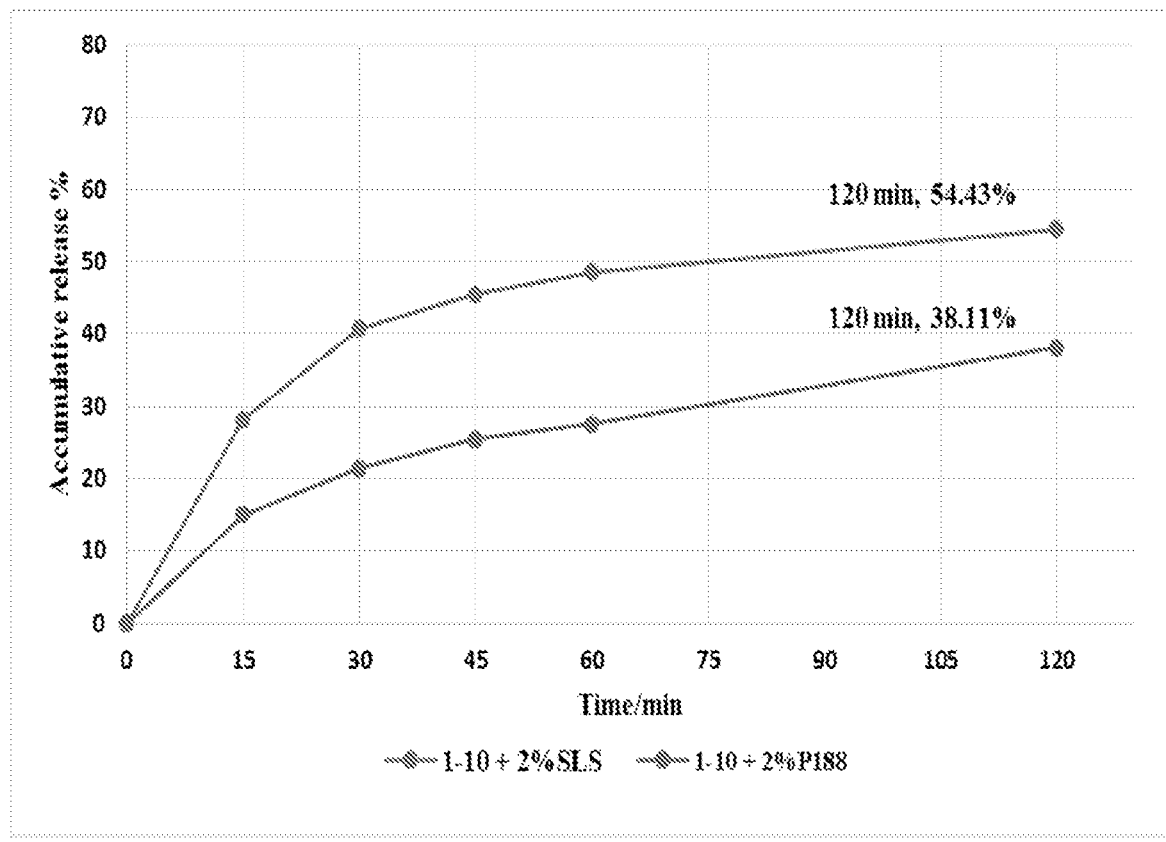
FIG. 4 shows dissolution result of 1:10 blend with MCC in capsule (2.5 mg active with 2% surfactant).

The dissolution results are shown in FIG. 4, where the addition of 2% SDS to the formulation significantly increased the in vitro dissolution release, from 38% release after 120 minutes with Poloxamer 188 to 54% release after 120 minutes with SLS.

Table 22 provides other exemplified formulations for blend capsules (prototypes 1-12).

TABLE 22

Exemplified formulations

| Ingredient | Trade Example (supplier) | Function | 1 1:10 Blend | 2 1:10 Blend | 3 1:10 Blend | 4 1:10 Blend | 5 1:1 Blend | 6 1:1 Blend | 7 1:1 Blend | 8 1:1 Blend | 9 | 10 | 11 | 12 |
|---|---|---|---|---|---|---|---|---|---|---|---|---|---|---|
| Compound 1 | Pharmaceutical Active | Pharmaceutical Active | 1.0 | 1.0 | 10.0 | 10.0 | 10.0 | 10.0 | 100.0 | 100.0 | 1.0 | 1.0 | 10.0 | 100.0 |
| Starch | Starch 1500 (Colorcon) | Filler, Dispersant | 10.0 |  | 100.0 |  | 10.0 |  | 100.0 |  | 5.0 | 2.5 | 2.5 | 25.0 |
| Microcrystalline Cellulose (MCC) | Avicel (FMC) | Filler, Dispersant |  | 10.0 |  | 100.0 |  | 10.0 |  | 100.0 | 5.0 | 2.5 | 2.5 | 25.0 |
| Lactose | Lactose (FMC) | Filler, Dispersant |  |  |  |  |  |  |  |  |  | 2.5 | 2.5 | 25.0 |
| Mannitol | Mannitol (FMC) | Filler, Dispersant |  |  |  |  |  |  |  |  |  | 2.5 | 2.5 | 25.0 |
| Magnesium Stearate | Magnesium Stearate (FMC) | Lubricant, Flow Aid | 0.22 | 0.22 | 2.2 | 2.2 | 0.40 | 2.2 | 2.2 | 2.2 | 0.1 | 0.1 | 0.2 | 1.0 |

TABLE 22-continued

Exemplified formulations

| Ingredient | Trade Example (supplier) | Function | Amount (weight in grams) in Capsule | | | | | | | | | | | |
|---|---|---|---|---|---|---|---|---|---|---|---|---|---|---|
| | | | 1 1:10 Blend | 2 1:10 Blend | 3 1:10 Blend | 4 1:10 Blend | 5 1:1 Blend | 6 1:1 Blend | 7 1:1 Blend | 8 1:1 Blend | 9 | 10 | 11 | 12 |
| Fumed silica | Glidant (Specialty Minerals) | Lubricant, Flow Aid | | | | | | | | | 0.1 | 0.1 | 0.2 | 1.0 |
| | TOTAL | | 11.22 | 11.22 | 112.2 | 112.2 | 20.4 | 22.2 | 202.2 | 202.2 | 11.2 | 11.2 | 20.4 | 202.0 |

Examples of excipients that may be used in preparation of the formulations as disclosed in this application are shown in Table 23.

TABLE 23

Exemplified excipients

| Drug Product | Excipient | Example Trade Name (Supplier) | Function |
|---|---|---|---|
| Capsule or Tablet | Cellulose, Microcrystalline | Cellulose, Microcrystalline, Compendial PH101 (DuPont) | Filler, Dispersant |
| Suspension | Croscarmellose Sodium | Croscarmellose Sodium SD-711 (DuPont) | Dispersant, Disintegrant |
| | Crospovidone | Crospovidone XL-10 (Ashland) | Dispersant, Disintegrant |
| | Mannitol | Mannitol 100SD (Roquette) | Filler, Dispersant |
| | Magnesium Stearate | Magnesium Stearate LIGAMED MF-2-V | Lubricant |
| | Poloxamer 188 | Poloxamer 188 (FMC) | Surfactant, Dispersant |
| | Tween 80 | Tween 80 (Spectrum Chemical) | Surfactant, Dispersant |
| | Sodium Lauryl Sulfate | Sodium Lauryl Sulfate SLS Fine (BASF) | Surfactant, Dispersant |
| | Colloidal Silicon Dioxide | Colloidal Silicon Dioxide Aerosil 200 Pharm (Evonik) | Lubricant |
| | Starch | Starch 1500 Partially Pregelatinized Maize starch 2001-NEC (Colorcon) | Filler, Dispersant |
| | Polysorbate 80 | Tween 80 (Spectrum Chemical) | Surfactant, Wetting Agent |
| | Poloxamer 188 | Pluronic F-68 (FMC) | Surfactant, Wetting Agent |
| | Methyl cellulose (MC) | Methyl cellulose, 400 cP, USP (Alpha Chemical) | Suspension aid, thickener |
| | Methyl cellulose (MC) | Methyl cellulose, 4000 cP, USP (Alpha Chemical) | Suspension aid, thickener |
| | Hydroxypropyl methyl cellulose (HPMC) | Hypermellose HPMC E-464 (Orison Chemicals) | Suspension aid, thickener |
| | Methyl Paraben | Methyl Paraben (Sigma Chemical) | Anti-microbial preservative |
| | Propyl Paraben | Propyl Paraben (Sigma Chemical) | Anti-microbial preservative |
| | Propylene Glycol (PG) | Propylene Glycol (Sigma Chemical) | Solubilizer, Co-Solvent |
| ASD | Hydroxypropylmethylcellulose acetate succinate (HPMCAS) | AquaSolve HPMC-AS (Ashland) | Polymer matrix, amorphous dispersant |
| | Polyvinyl caprolactam-polyvinyl acetate-polyethylene glycol graft co-polymer | Soluplus (BASF) | Polymer matrix, amorphous dispersant |
| | Poly(deoxyadenylic-thymidylic) acid sodium salt | Eudragit L100 | Polymer matrix, amorphous dispersant |
| Solution | Polyethylene glycol 400 (PEG 400) | Kollisolv PEG 400 (BASF) | Solubilizer, Co-Solvent |
| | Polyethylene glycol 300 (PEG 300) | Kollisolv PEG 300 (BASF) | Solubilizer, Co-Solvent |
| | Hydrogenated castor oil | Kolliphor RH40 (BASF) | Solubilizer, Co-Solvent |
| | Linoleoyl Polyoxyl-6 glycerides | Labrafil M2125 CS (Gattefossé) | Solubilizer, Co-Solvent |
| | Diethylene glycol monoethyl ether | Transcutol HP (Gattefossé) | Solubilizer, Co-Solvent |
| | d-α-Tocopheryl polyethylene glycol 1000 succinate | Vitamin E TPGS (Parchem) | Solubilizer, Co-Solvent |

TABLE 23-continued

Exemplified excipients

| Drug Product | Excipient | Example Trade Name (Supplier) | Function |
|---|---|---|---|
| | Ethanol | Ethanol (Cargill) | Solubilizer, Co-Solvent |
| | Propylene Glycol (PG) | Propylene Glycol (Sigma Chemical) | Solubilizer, Co-Solvent |

Example 3. Pharmacokinetic Studies of Formulations Comprising Compound 1

Pharmacokinetic (PK) studies were performed on animals with formulations as described in Example 2. Compound 1 was formulated to achieve desired dose (Table 24) and administered to a group of three fasted animals by single oral gavage. A minimum of 7 time points were used to collect blood samples and then prepared plasma samples for bioanalysis. PK parameters were then obtain after non-compartmental pharmacokinetic analysis by using the Phoenix WinNonlin software (version 6.3, Pharsight, Mountain View, CA). The linear/log trapezoidal rule was applied in obtaining the PK parameters. The nominal dose levels and nominal sampling times were used in the calculation of all pharmacokinetic parameters. Table 24 summarizes the PK data. Results are summarized in the below table. Studies 14-17 were conducted under a crossover design. In the table, Prototype 2a solution is 58.1% Kolliphor RH40+16.9% Labrafil M2125 CS+8.3% Propylene glycol+16.7% Ethanol. MC is methyl cellulose 400 cP, Tween 80 is Polyoxyethylene (80) sorbitan monooleate, HPMC-ASMF, soluplus, and Eudragit are polymers, and Poloxamer is co-polymer.

than 300 mg/mL and up to 600 mg/mL, and D indicates greater than 600 ng/mL and up to 900 ng/mL.

In addition, human PK and efficacious dose are estimated. Based on calculations, human efficacious dose for a neurological disorder (e.g., epilepsy) is about 2.5 to 100 mg (e.g., 60 mg), once a day.

Example 4. A Randomized, Double-Blind, Placebo-Controlled Trial to Evaluate the Safety, Tolerability and Pharmacokinetics of Single and Multiple Ascending Doses and Food Effect of Compound 1 in Healthy Volunteers This is a three-part clinical trial to evaluate the safety, tolerability, PK, and food effect of Compound 1 in healthy volunteers aged 18 to 55 years inclusive. The clinical trial is comprised of the following 3 parts:
- Part A is randomized, double-blinded and placebo-controlled. Part A is designed to investigate the safety and PK of single ascending doses of Compound 1.
- Part B is randomized, double-blinded and placebo-controlled. Part B is designed to investigate the safety and PK of multiple ascending doses of Compound 1 (selected based on the results from Part A).

TABLE 24

Selected PK data of formulations tested in animals

| Study | Dose (mg/kg) | Formulation | Species | Auc0-inf (ng/ml*hr) | (ng/mL) |
|---|---|---|---|---|---|
| 1 | 5 | (0.5% MC 400 cP, 0.2% Tween 80) suspension | Rat | 1094 | A |
| 2 | 5 | (0.5% MC 400 cP, 0.2% Tween 80) suspension | Rat | 3015 | B |
| 3 | 5 | Prototype 2a solution | Rat | 3024* | B |
| 4 | 5 | (HPMC-ASMF) - ASD | Rat | 5534 | C |
| 5 | 5 | (Soluplus) - ASD | Rat | 6728 | D |
| 6 | 5 | (Eudragit L100) - ASD | Rat | 6936 | D |
| 7 | 15 | (0.5% MC 400 cP, 0.2% Tween 80) suspension | Rat | 5172* | C |
| 8 | 15 | (0.5% MC 400 cP, 0.2% Tween 80) suspension - milled | Rat | 13436 | D |
| 9 | 1 | (Prototype 2a) solution | Dog | 406 | A |
| 10 | 1 | (0.5% MC 400 cP, 0.2% Tween 80) suspension | Dog | 174 | A |
| 11 | 1 | (0.5% MC 400 cP, 0.2% Tween 80) suspension - milled | Dog | 303 | A |
| 12 | 0.5 | (0.5% 400 cP MC, 0.2% Poloxamer 188) suspension - milled | C. Monkey | 997 | B |
| 13 | 0.5 | (0.5% MC 400 cP, 0.2% Tween 80) suspension | C. Monkey | 762 | A |
| 14 | 0.5 | Size #4 hard gelatin capsule (1:10 blend with MCC) | C. Monkey | 994 | A |
| 15 | 0.5 | Size #4 hard gelatin capsule (ASD-3 HPMCASMF, Drug load (w %) = 18.22%) | C. Monkey | 1358 | B |
| 16 | 0.5 | Size #4 hard gelatin capsule (1:10 blend with MCC and 2% SLS) | C. Monkey | 1004 | A |
| 17 | 1.0 | Size #4 hard gelatin capsule (1:10 blend with MCC) | C. Monkey | 1749 | B |

*Auc(0-Last)

For Cmax values in Table 24, A indicates greater than 50 ng/mL and up to 150 ng/mL, B indicates greater than 150 ng/mL and up to 300 ng/mL, C denotes indicates greater Part C is a randomized, open-label, crossover design to investigate the PK of a single dose of Compound 1 in the fasted and fed state.

Objectives and Endpoints:

Part A

| Objective | Endpoint |
|---|---|
| | Primary |
| To assess the safety and tolerability of single oral doses of Compound 1 | Incidence and severity of adverse events (AEs)<br>Changes in vital sign measurements<br>Changes in clinical laboratory results<br>Changes in electrocardiogram (ECG) parameters<br>Incidence of Columbia-Suicide Severity Rating Scale (C-SSRS) measured suicidal ideation or behavior |
| | Secondary |
| To evaluate the pharmacokinetics (PK) of single oral doses of Compound 1 | The following PK parameters will be calculated:<br>Maximum observed concentration ($C_{max}$)<br>Time to maximum observed concentration ($t_{max}$)<br>Apparent terminal elimination half-life ($t_{1/2}$)<br>Area under the concentration-time curve from time zero to the last measurable concentration ($AUC_{0-last}$)<br>Area under the drug concentration-time curve from time zero to infinity ($AUC_{0-inf}$)<br>Clearance (CL/F)<br>Volume of distribution ($V_d$/F)<br>Renal clearance (Clr)<br>Fraction of dose excreted unchanged in urine (fe)<br>Amount excreted unchanged over 72 hours ($Ae_{0-72}$) |
| | Exploratory |
| To evaluate the pharmacodynamic (PD) effect of Compound 1 on stimulated electroencephalography (EEG) endpoints using auditory stimulation | Electroencephalography (EEG) measurement of auditory evoked responses (e.g., (auditory steady state response (ASSR)) |

Part B

| Objective | Endpoint |
|---|---|
| | Primary |
| To assess the safety and tolerability of 7-day repeat oral doses of Compound 1 | Incidence and severity of AEs<br>Changes in vital sign measurements<br>Changes in clinical laboratory results<br>Changes in electrocardiogram (ECG) parameters<br>Incidence of C-SSRS measured suicidal ideation or behavior |
| | Secondary |
| To assess the pharmacokinetics (PK) of 7-day repeat oral doses of Compound 1 | The following PK parameters will be calculated on Day 1 and Day 7:<br>$C_{max}$<br>$t_{max}$<br>$AUC_{0-last}$<br>Area under the concentration-time curve from time zero during a dosing interval ($AUC_{tau}$)<br>Time to steady state<br>Accumulation ratio based on AUC (Rac (AUC))<br>Accumulation ratio based on $C_{max}$ (Rac ($C_{max}$)) |

| Objective | Endpoint |
|---|---|
| | Exploratory |
| To evaluate the PD effect of Compound 1 on stimulated EEG endpoints using auditory stimulation. | EEG measurement of auditory evoked responses (e.g., (auditory steady state response (ASSR))<br>circulating metabolites profiling |

Part C

| Objective | Endpoint |
|---|---|
| | Primary |
| To evaluate the effect of food on the pharmacokinetics (PK) of single oral doses of Compound 1 | The following PK parameters, in fasted and fed states, will be calculated:<br>$C_{max}$<br>$t_{max}$<br>$AUC_{0-last}$<br>$AUC_{0-inf}$ |
| | Secondary |
| To assess the safety and tolerability of oral doses of Compound 1 in the fasted and fed states | Incidence and severity of AEs<br>Changes in vital sign measurements<br>Changes in clinical laboratory results<br>Changes in electrocardiogram (ECG) parameters<br>Incidence of C-SSRS measured suicidal ideation or behavior |

Based on emerging safety and PK data from Part A, the SRC may select a starting dose for Part B prior to completion of all dose level cohorts in Part A. Part C may commence after the last SAD cohort. Parts A and B are double blinded, including participant and investigator; sponsor is unblinded to facilitate safety review. Each part consists of 3 periods: Screening, Intervention, and Safety Follow-up.

Screening/Baseline Period

The Screening Period for all three parts will be up to 27 days in duration (Day-28 to Day-2).

Intervention Period

Following confirmation of continued eligibility, participants check-in to the clinic on Day −1 (the day before study drug administration) and assessments are performed. Participants remain in the unit from Baseline (Day −1) to Discharge (Day 6 in Part A, Day 12 in Part B, and Day 13 in Part C).

Part A

Healthy volunteers are enrolled to receive single ascending doses of Compound 1 or placebo on Day 1. Dose escalation in Part A is conducted in a total of 6 planned cohorts (Cohorts A1 to A6). Up to 3 additional cohorts may be studied at planned or intermediate dose levels. Eight participants are enrolled in each cohort and will be randomized to receive either Compound 1 or placebo (ratio 3:1). Compound 1 is administered to Cohort A1 participants at the starting dose of 2.5 mg. Dosing in all cohorts is under fasted conditions.

Dosing in each dose level cohort starts with 2 sentinel participants with one of the 2 participants randomized to receive Compound 1 and the other participant randomized to receive placebo. The safety and tolerability of each sentinel participant are monitored until Day 6 and reviewed prior to dosing the remainder of participants in each cohort.

Cohorts are dosed in an escalating order. After each dose cohort in Part A has completed dosing, blinded cumulative safety data collected up to Day 6 and available blinded PK data are reviewed by the Safety Review Committee (SRC) to determine the safety and tolerability of the study drug.

If the current dose level is determined to be safe and tolerated, the next dose cohort is enrolled and randomized to receive the selected dose of active Compound 1 or placebo. EEG to assess the effect of Compound 1 on auditory evoked responses may be performed in one or more cohorts, as determined based on the safety and PK profile.

Part A Dosing Regimen

| Cohort | Study Drug | Dose and Route of Administration |
| --- | --- | --- |
| A1 | Compound 1 | 2.5 mg, oral, fasted |
| A2 | Compound 1 | Up to 10 mg, oral, fasted |
| A3 | Compound 1 | Up to 30 mg, oral, fasted |
| A4 | Compound 1 | Up to 60 mg, oral, fasted |
| A5 | Compound 1 | Up to 90 mg, oral, fasted |
| A6 | Compound 1 | Up to 120 mg, oral, fasted |

Part B

The starting dose level in Part B is determined by the SRC based on safety, tolerability and PK data obtained in Part A. The SRC may select a starting dose for Part B prior to completion of all dose level cohorts in Part A.

A dose level is evaluated in Part B if determined to be safe and tolerable in Part A. It is anticipated that 3 dose levels are evaluated in Part B in a total of 3 cohorts (Cohorts B1-B3). One additional cohort may be added to repeat a dose level or study an intermediate dose. Eight participants are enrolled in each cohort and randomized to receive either Compound 1 or placebo (ratio 3:1).

Compound 1 dose levels to be evaluated in Part B do not exceed doses studied in part A. Dosing commences on Day 1 and continue until Day 7. The last dose is administered on the morning of Day 7. Dosing in all cohorts in Part B is under fasted conditions. Two sentinel participants are planned for each dose cohort in Part B.

Part B Dosing Regimen

| Cohort | Study Drug | Daily Dose and Route of Administration |
| --- | --- | --- |
| B1 | Compound 1 | Up to 60 mg, oral, fasted |
| B2 | Compound 1 | Up to 90 mg, oral, fasted |
| B3 | Compound 1 | Up to 120 mg, oral, fasted |

After each dose cohort in Part B has completed dosing with study drug, the SRC reviews blinded safety data (including safety assessments performed on Day 9) and available PK data to determine the safety and tolerability of the study drug, following the same procedures in Part A.

EEG to assess the effect of Compound 1 on auditory evoked responses may be performed in one or more cohorts, as determined by Sponsor based on the safety and PK profile.

Part C

Part C may commence once the safety and PK have been adequately evaluated in the last cohort of Part A. Up to 16 participants receive two doses of Compound 1, one dose after a minimum of 10 hours fasting and one after consumption of a high-fat, high calorie meal in a randomized crossover design, with a 7 day washout in between periods. Up to 3 additional days of washout may be added between fasted and fed dosing based on the observed half-life in Part A.

The dose to be used in Part C does not exceed those used in Part A and is approved by the SRC based on the accrued safety and PK data. Sentinel dosing may be used in Part C if considered appropriate by the SRC. Part C is not blinded.

Safety Assessments and Monitoring

Safety and tolerability assessments include vital signs, 12-lead ECGs, physical examinations, clinical laboratory tests, and the C-SSRS as outlined in the SoAs.

Number of Participants:
Part A: Up to 72 are planned to be administered Compound 1 or placebo.
Part B: Up to 32 are planned to be administered Compound 1 or placebo.
Part C: Up to 16 are planned to be administered Compound 1.

Exclusion Criteria

A participant who meets any of the following criteria, among other things, at Screening is excluded from this clinical trial:

Any abnormal ECG finding assessed as clinically significant by the Investigator, including a QT interval with Fridericia correction method (QTcF)>450 msec, confirmed with 1 repeat testing as needed, at Screening or Day 1.

Use of systemic prescription medications or over-the-counter (OTC) medication, including multivitamins, and dietary and herbal supplement within 2 weeks or 5 times the terminal half-lives of the medication prior to first dose of study drug, whichever is longer and for the duration of the study.

Test Product, Reference Therapy, Administration:
Part A: Compound 1 capsules or matching placebo are administered orally.
Part B: Compound 1 capsules or matching placebo are administered orally.
Part C: Compound 1 capsules are administered orally.

Statistical Methods:

PK Analyses:

A validated bioanalytical method is utilized for the determination of plasma and urine concentrations of Compound 1. Plasma and urine concentrations are summarized by dose group/condition and timepoint using descriptive statistics. In addition to descriptive statistics specified in General Conditions above, plasma concentrations are also summarized using number and percentage of concentrations below the level of quantification (BLQ) and coefficient of variation (CV %).

Pharmacokinetic parameters are estimated from concentration-time data using standard non-compartmental methods. Urine PK parameters are estimated from urine concentration and urine volume data. PK parameters are summarized by dose group/condition using descriptive statistics. In addition to descriptive statistics specified in General Conditions above, PK parameters are summarized using CV %, geometric mean, and geometric coefficient of variation. PK parameters are assessed for linearity and dose proportionality using the power model where feasible. To test for a food effect in Part C, the geometric mean ratio (ln transformed) of the test treatment (ie, fed condition) relative to the reference treatment (ie, fasted condition) are estimated with the 90% CIs calculated for $C_{max}$ and $AUC_{0-inf}$. Absence of a food effect are concluded if the 90% CIs for the ratios of both $C_{max}$ and $AUC_{0-inf}$ are completely contained within the interval of 0.80 to 1.25. If there is unexpected difficulty in determining the terminal half-life, $AUC_{0-last}$ may be used in place of $AUC_{0-inf}$.

Example 5. A Randomized, Double-Blind, Placebo-Controlled Trial to Evaluate the Safety, Tolerability and Pharmacokinetics of Single and Multiple Ascending Doses and Food Effect of Compound 1 in Healthy Volunteers This is a three-part clinical trial to evaluate the safety, tolerability, PK, and food effect of Compound 1 in healthy volunteers aged 18 to 55 years inclusive. The clinical trial is comprised of the following 3 parts:

Part A is randomized, double-blinded and placebo-controlled. Part A is designed to investigate the safety, tolerability, and PK of single ascending doses of Compound 1 from 2.5 mg to 90 mg.

Part B is randomized, double-blinded and placebo-controlled. Part B is designed to investigate the safety, tolerability, and PK of multiple ascending doses of Compound 1 (doses selected based on the results from Part A).

Part C is a randomized, open-label, crossover design to investigate the PK, safety and tolerability of a single dose of Compound 1 in the fasted and fed state (dose selected based on the results from Part A).

Objectives and Endpoints:

Part A

| Objective | Endpoint |
|---|---|
| | Primary |
| To assess the safety and tolerability of single oral doses of Compound 1 | Incidence and severity of adverse events (AEs)<br>Changes in vital sign measurements<br>Changes in clinical laboratory results<br>Changes in electrocardiogram (ECG) parameters<br>Incidence of Columbia-Suicide Severity Rating Scale (C-SSRS) measured suicidal ideation or behavior |
| | Secondary |
| To evaluate the pharmacokinetics (PK) of single oral doses of Compound 1 | The following PK parameters will be calculated:<br>Maximum observed concentration ($C_{max}$)<br>Time to maximum observed concentration ($t_{max}$)<br>Apparent terminal elimination half-life ($t_{1/2}$)<br>Area under the concentration-time curve from time zero to the last measurable concentration ($AUC_{last}$)<br>Area under the drug concentration-time curve from time zero to infinity ($AUC_{inf}$)<br>Clearance (CL/F)<br>Volume of distribution ($V_d$/F)<br>Renal clearance (Clr)<br>Fraction of dose excreted unchanged in urine (fe)<br>Amount excreted unchanged over hours ($Ae_{0-72}$) |
| | Exploratory |
| To evaluate the pharmacodynamic (PD) effect of Compound 1 on stimulated electroencephalography (EEG) endpoints using auditory stimulation | Electroencephalography (EEG) measurement of auditory evoked responses (e.g., (auditory steady state response (ASSR)) |

Part B

| Objective | Endpoint |
|---|---|
| | Primary |
| To assess the safety and tolerability of 7-day repeat oral doses of Compound 1 | Incidence and severity of AEs<br>Changes in vital sign measurements<br>Changes in clinical laboratory results<br>Changes in electrocardiogram (ECG) parameters<br>Incidence of C-SSRS measured suicidal ideation or behavior |
| | Secondary |
| To assess the pharmacokinetics (PK) of 7-day repeat oral doses of Compound 1 | The following PK parameters will be calculated:<br>$C_{max}$<br>$t_{max}$<br>$AUC_{last}$<br>Area under the concentration-time curve from time zero during a dosing interval ($AUC_{tau}$)<br>Time to steady state<br>Accumulation ratio based on AUC (Rac (AUC))<br>Accumulation ratio based on $C_{max}$ (Rac ($C_{max}$)) |
| | Exploratory |
| To evaluate the PD effect of Compound 1 on stimulated EEG endpoints using auditory stimulation. | EEG measurement of auditory evoked responses (e.g., (auditory steady state response (ASSR)) |

Part C

| Objective | Endpoint |
|---|---|
| | Primary |
| To evaluate the effect of food on the pharmacokinetics (PK) of single oral doses of Compound 1 | The following PK parameters, in fasted and fed states, will be calculated:<br>$C_{max}$<br>$t_{max}$<br>$AUC_{last}$<br>$AUC_{inf}$ |
| | Secondary |
| To assess the safety and tolerability of oral doses of Compound 1 in the fasted and fed states | Incidence and severity of AEs<br>Changes in vital sign measurements<br>Changes in clinical laboratory results<br>Changes in electrocardiogram (ECG) parameters<br>Incidence of C-SSRS measured suicidal ideation or behavior |

Based on emerging safety and PK data from Part A, the SRC may select a starting dose for Part B prior to completion of all dose level cohorts in Part A. Part C may commence after the last SAD cohort. Parts A and B are double blinded, including participant and investigator; sponsor is unblinded to facilitate safety review. Each part consists of 3 periods: Screening, Intervention, and Safety Follow-up.

Following confirmation of continued eligibility, participants check-in to the clinic on Day −1 (the day before study drug administration) and assessments are performed. Participants remain in the unit from Baseline (Day −1) to Discharge (Day 6 in Part A, Day 12 in Part B, and Day 13 in Part C).

Part A

Healthy volunteers are enrolled to receive single ascending doses of Compound 1 or placebo on Day 1. Dose escalation in Part A is conducted in a total of 6 planned cohorts (Cohorts A1 to A6). Up to 3 additional cohorts may be studied at planned or intermediate dose levels. Eight participants are enrolled in each cohort and will be randomized to receive either Compound 1 or placebo (ratio 3:1). Compound 1 is administered to Cohort A1 participants at the starting dose of 2.5 mg. Dosing in all cohorts is under fasted conditions.

Dosing in each dose level cohort starts with 2 sentinel participants with one of the 2 participants randomized to receive Compound 1 and the other participant randomized to receive placebo. The safety and tolerability of each sentinel participant are monitored until Day 6 and reviewed prior to dosing the remainder of participants in each cohort.

Cohorts are dosed in an escalating order. After each dose cohort in Part A has completed dosing, blinded cumulative safety data collected up to Day 6 and available blinded PK data are reviewed by the Safety Review Committee (SRC) to determine the safety and tolerability of the study drug.

If the current dose level is determined to be safe and tolerated, the next dose cohort is enrolled and randomized to receive the selected dose of active Compound 1 or placebo. EEG to assess the effect of Compound 1 on auditory evoked responses may be performed in one or more cohorts, as determined based on the safety and PK profile.

Part A Dosing Regimen

| Cohort | Study Drug | Dose and Route of Administration |
|---|---|---|
| A1 | Compound 1 | 2.5 mg, oral, fasted |
| A2 | Compound 1 | Up to 7.5 mg, oral, fasted |
| A3 | Compound 1 | Up to 15 mg, oral, fasted |
| A4 | Compound 1 | Up to 30 mg, oral, fasted |
| A5 | Compound 1 | Up to 60 mg, oral, fasted |
| A6 | Compound 1 | Up to 90 mg, oral, fasted |

Part B

The starting dose level in Part B is determined by the SRC based on safety, tolerability and PK data obtained in Part A. The SRC may select a starting dose for Part B prior to completion of all dose level cohorts in Part A.

A dose level is evaluated in Part B if determined to be safe and tolerable in Part A. It is anticipated that 3 dose levels are evaluated in Part B in a total of 3 cohorts (Cohorts B1-B3). One additional cohort may be added to repeat a dose level or study an intermediate dose. Participants are enrolled in each cohort and randomized to receive either Compound 1 or placebo (ratio 3:1).

Compound 1 dose levels to be evaluated in Part B do not exceed doses studied in part A. Dosing commences on Day 1 and continue until Day 7. The last dose is administered on the morning of Day 7. Dosing in all cohorts in Part B is under fasted conditions. Two sentinel participants are planned for each dose cohort in Part B.

Part B Dosing Regimen

| Cohort | Study Drug | Daily Dose and Route of Administration |
|---|---|---|
| B1 | Compound 1 | Up to 30 mg, oral, fasted |
| B2 | Compound 1 | Up to 60 mg, oral, fasted |
| B3 | Compound 1 | Up to 90 mg, oral, fasted |

After each dose cohort in Part B has completed dosing with study drug, the SRC reviews blinded safety data (including safety assessments performed on Day 9) and available PK data to determine the safety and tolerability of the study drug, following the same procedures in Part A.

EEG to assess the effect of Compound 1 on auditory evoked responses may be performed in one or more cohorts, as determined by Sponsor based on the safety and PK profile.

Part C

Part C may commence once the safety and PK have been adequately evaluated in the last cohort of Part A. Participants receive two doses of Compound 1, one dose after a minimum of 10 hours fasting and one after consumption of a high-fat, high calorie meal in a randomized crossover design, with a 7 day washout in between periods. Up to 3 additional days of washout may be added between fasted and fed dosing based on the observed half-life in Part A.

The dose to be used in Part C does not exceed those used in Part A and is approved by the SRC based on the accrued safety and PK data. Sentinel dosing may be used in Part C if considered appropriate by the SRC. Part C is not blinded.

Safety Assessments and Monitoring

Safety and tolerability assessments include vital signs, 12-lead ECGs, physical examinations, clinical laboratory tests, and the C-SSRS.

Exclusion Criteria

A participant who meets any of the following criteria, among other things, at Screening is excluded from this clinical trial:

Any abnormal ECG finding assessed as clinically significant by the Investigator, including a QT interval with Fridericia correction method (QTcF)>450 msec, confirmed with 1 repeat testing as needed, at Screening or Day 1.

Use of systemic prescription medications or over-the-counter (OTC) medication, including multivitamins, and dietary and herbal supplement within 2 weeks or 5 times the terminal half-lives of the medication prior to first dose of study drug, whichever is longer and for the duration of the study.

Test Product, Reference Therapy, Administration:

Part A: Compound 1 capsules or matching placebo are administered orally.

Part B: Compound 1 capsules or matching placebo are administered orally.

Part C: Compound 1 capsules are administered orally.

Statistical Methods:

PK Analyses:

A validated bioanalytical method (e.g., Liquid chromatography-mass spectrometry (LC-MS)) is utilized for the determination of plasma and urine concentrations of Compound 1. Plasma and urine concentrations are summarized by dose group/condition and timepoint using descriptive statistics. In addition to descriptive statistics specified in General Conditions above, plasma concentrations are also summarized using number and percentage of concentrations below the level of quantification (BLQ) and coefficient of variation (CV %).

Pharmacokinetic parameters are estimated from concentration-time data using standard non-compartmental methods. Urine PK parameters are estimated from urine concentration and urine volume data. PK parameters are summarized by dose group/condition using descriptive statistics. In addition to descriptive statistics specified in General Conditions above, PK parameters are summarized using CV %, geometric mean, and geometric coefficient of variation. PK parameters are assessed for linearity and dose proportionality using the power model where feasible. To test for a food effect in Part C, the geometric mean ratio (ln transformed) of the test treatment (i.e., fed condition) relative to the reference treatment (i.e., fasted condition) are estimated with the 90% CIs calculated for $C_{max}$ and $AUC_{inf}$. Absence of a food effect are concluded if the 90% CIs for the ratios of both $C_{max}$ and $AUC_{inf}$ are completely contained within the interval of 0.80 to 1.25. If there is unexpected difficulty in determining the terminal half-life, $AUC_{last}$ may be used in place of $AUC_{inf}$.

Results

Preliminary analysis of the first four of six planned cohorts of the study in Part A indicate that Compound 1 appears to be well tolerated at the doses tested. Safety data reviewed included adverse events, vital signs, ECG, C-SSRS, physical examination, and safety laboratory data. In the first three cohorts tested there have been no reported Serious Adverse Events, severe Adverse Events, or any Adverse Events leading to study withdrawal or discontinuation.

Based on the preliminary data, exposure appears to increase proportionate to dose level and maximal concentrations are achieved in 2-3 hours. Terminal elimination half-life averages 114 hours (~4-5 days) across groups. 90% of steady-state should be achieved in approximately 2 weeks with once daily dosing.

Example 5. A Randomized Double-Blind Comparison of the Efficacy and Safety of Compound 1 to Placebo for the Acute and Prophylactic Treatment of Chronic SUNCT and SUNA This multi-center clinical trial will assess the efficacy, safety, tolerability, and pharmacokinetics of Compound 1 in participants, for example, aged 18 to 65 years with chronic SUNCT or chronic SUNA. This is a double-blind, placebo-controlled study. Participants will be randomized to receive 1 of 3 blinded treatments [Compound 1 high dose mg by mouth daily, Compound 1 low dose mg by mouth daily, or placebo by daily] in a 1:1:1 ratio. Participants will self-administer study drug once daily with weekly clinic visits. Participants will also be asked to respond to questions in an electronic diary (eDiary), for example, 3 times daily (pre-dose or approximately 24 hours after the previous dose, approximately 4 hours post-dose, and approximately 10 hours post-dose).

| Objective | Endpoint |
|---|---|
| Primary | |
| To evaluate the effects of Compound 1 for the treatment of SUNCT and SUNA headaches | Change in average daily frequency of SUNCT and SUNA headache attacks from baseline to Day 21 as recorded by eDiary Change in average peak intensity of SUNCT and SUNA headache severity from baseline to Day 21 as measured by the Stanford Pain Scale |
| Secondary | |
| To evaluate the effects of Compound 1 on the treatment of SUNCT and SUNA headaches | Change in average daily frequency of attacks from baseline to average daily frequency throughout the study treatment period as recorded by eDiary Change in average peak intensity of SUNCT and SUNA headache severity from baseline throughout the study period as measured by the Stanford Pain Scale |
| To evaluate the safety and tolerability of Compound 1 in SUNCT and SUNA participants | Incidence and severity of adverse events Changes in vital sign measurements Changes in clinical laboratory results Changes in ECG parameters Incidence of Columbia-Suicide Severity Rating Scale (C-SSRS) measured suicidal ideation or behavior |
| To characterize the PK profile of Compound 1 in SUNCT and SUNA participants | Plasma concentrations of Compound 1 and its potential metabolites Primary PK parameters: $C_{max}$, $t_{max}$, and $AUC_{0\text{-}tau}$ |
| Exploratory | |
| To evaluate the effects of Compound 1 on other measures associated with SUNCT and SUNA | Change in SUNCT and SUNA headache duration calculated as number of minutes of pain per day recorded by eDiary Change in average daily frequency of autonomic symptoms as assessed by the participant Change in autonomic symptoms as assessed by facial imaging Change in response to triggering factors Proportion of participants able to perform their usual daily activities Changes in SF-36 total and factor scores Patient satisfaction with treatment as measured by visual analog scale (VAS) Change in Level of Disability from baseline to Day 21 Proportion of patients in remission (defined as no headache for the observation interval) Duration of remission |

The clinical trial consists of 3 periods: Screening/Baseline, Intervention, and Safety Follow-up. An optional Washout period is also available for participants on preventative medications.

Screening/Baseline Period

The Screening period will be up to, e.g., 28 days (Day −28 to Day −1). An optional Washout period of up to, e.g., 14 days prior to Screening will be allowed for participants who are discontinuing SUNCT or SUNA preventative medications (eg, carbamazepine, lamotrigine).

During Screening, participants will complete daily eDiary entries during e.g., a 14-day observation period to assess the stability, severity, and frequency of SUNCT and SUNA headaches.

Intervention Period

Following confirmation of eligibility during Screening, participants will complete baseline assessments (Day 1).

On Day 1, participants will return to the clinic to be randomized to 1 of 3 treatment groups and receive the first dose of study drug. Participants will remain in a clinical setting under medical observation for at least e.g., 6 hours. Headache logs will be completed via eDiary daily pre-dose (e.g., approximately 24 hours after the previous dose), and e.g., approximately 4 hours and 10 hours post-dose. After the first dose, participants will continue daily dosing at home through Day 21. Participants will return to the clinic on e.g., Day 7 (±1 day), Day 14 (±1 day), and Day 21 (±1 day) to complete assessments. At select sites, intensive PK sampling will be obtained in the clinic on e.g., Day 1, Day 7 (±1 day), Day 14 (1 day), and Day 21 (±1 day).

Key safety measures will include clinical laboratory evaluations, 12-lead ECG, C-SSRS, and vital signs. Key efficacy assessments will include the Headache log via eDiary (see schedule of assessment for additional details). Blood samples will be obtained for the determination of Compound 1 plasma concentrations using a validated bioanalytical method and may also be used for exploratory method development and/or metabolite characterization.

Safety Follow-Up Period

The Safety Follow-up period will take place from e.g., Day 22 to e.g., Day 36. At the end of the Safety Follow-up period, participants will return to the clinic on e.g., Day 57 (±1 day) for the end of study assessments. During this visit the following assessments will be performed: vital signs, physical examination, clinical laboratory tests, ECG, C-SSRS assessment, and efficacy assessments.

Adverse events and concomitant medication use and procedures will be monitored from the time of informed consent to Day 36 (±1 day). At that time, participants will have completed the clinical trial.

Inclusion/Exclusion Criteria

Participants are a female or male e.g., 18 to 65 years of age (inclusive) at screening and has greater than e.g., 1-year history of chronic SUNCT and SUNA headache with onset prior to 50 years of age and demonstrated of a minimum of e.g., 100 SUNCT and SUNA headaches over 14 days during the clinical trial observation period.

Test Product, Reference Therapy, Administration

High dose mg Compound 1 capsules, low dose mg Compound 1 capsules or placebo will be administered orally and provided in pre-packaged containers to participants.

Dose/Route/Regimen

Dose TBD with PK data. Route will be oral.

Statistical Methods

Safety, tolerability, PK, and efficacy variables will be summarized using descriptive statistics. Descriptive summaries for categorical variables will include counts and percentage. Descriptive summaries for continuous variables will include number of participants (n), mean, standard deviation (SD), median, minimum, and maximum. Where appropriate, 95% confidence intervals (CIs) may be reported. Summaries will be presented by time point, where appropriate.

Standard PK parameters will be estimated using non-compartmental methods based on the concentration-time data. These parameters will include, where possible, Cmax, tmax, and AUC0-tau Exploratory analyses examining the relationship between PK and efficacy parameters may be performed for the PK analysis set.

Primary and Secondary Efficacy Measures

Headache Log Completed Via eDiary

An electronic tablet application for collecting information about a participant's headache activity before dosing (or approximately 24 hours after the previous dose) and approximately 4 hours and 10 hours post-dose. Information collected at all timepoints will include the following: frequency of headaches, duration of headaches, and severity of headaches (measured by Stanford Pain Scale). Information collected at 10 hours post-dose only will include the following: types of attacks, associated symptoms, and triggering factors, autonomic symptoms. Other information that will be collected via eDiary at 10 hours post-dose will include the following: Visual Analog Scale (VAS), activities of daily living, and level of disability.

Stanford Pain Scale

The Stanford Pain Scale is a comparative pain scale with descriptions assigned to each of the scale values, which range from 0 (No pain) to 10 (Unimaginable unspeakable). Pain rated from 0 through 3 is considered "Minor", pain rated from 4 through 6 is considered "Moderate", and pain rated from 7 through 10 is considered "Severe." The Stanford Pain Scale is completed by the participant.

Triggering Factors

Participants will be asked to rate whether their response to triggering factors (eg, brushing hair, touching face, chewing, etc.) has changed using a 5-point scale 0=no change 1=mild improvement 2=moderate improvement 3=significant improvement 4=resolution of triggering factors.

Visual Analog Scale

The visual analog scale will ask participants to rate their satisfaction with treatment using a Likert scale with categories ranging from 0=very poor effect to 10=very good effect.

Level of Disability

The participant's level of disability will be measured by the participant using a Goal Attainment Scale with the following categories: 0=no disability, 1=mild, 2=moderate, 3=severe, 4=unbearable.

36-Item Short Form Health Survey (v2 Acute)

The SF-36 is a 36-item survey that measures the overall health status of a participant (McHorney et al., 1994). The SF-36 assesses 8 health concepts. The scores are weighted sums of the questions in each section. Scores range from 0 to 100 where lower scores indicate greater disability. The acute version of the SF-36 will be completed by the participant where indicated in the SoA. The acute version asks participants about their health status in the previous week.

Activities of Daily Living

The participant will be asked to assess change in their ability to complete activities of daily living.

Example 6. Synthesis of 3-(ethoxydifluoromethyl)-6-(5-fluoro-6-(2,2,2-trifluoroethoxy) pyridin-3-yl)-[1,2,4]triazolo[4,3-a]pyrazine (Compound 1)

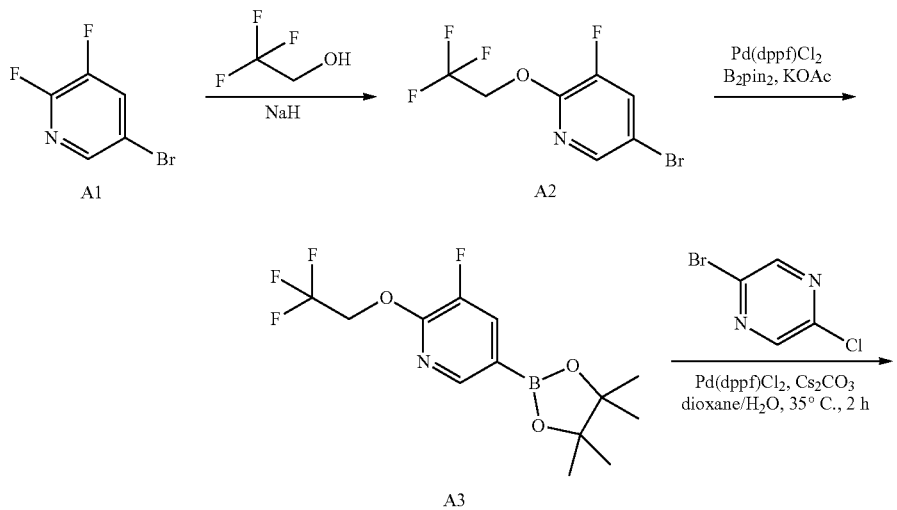

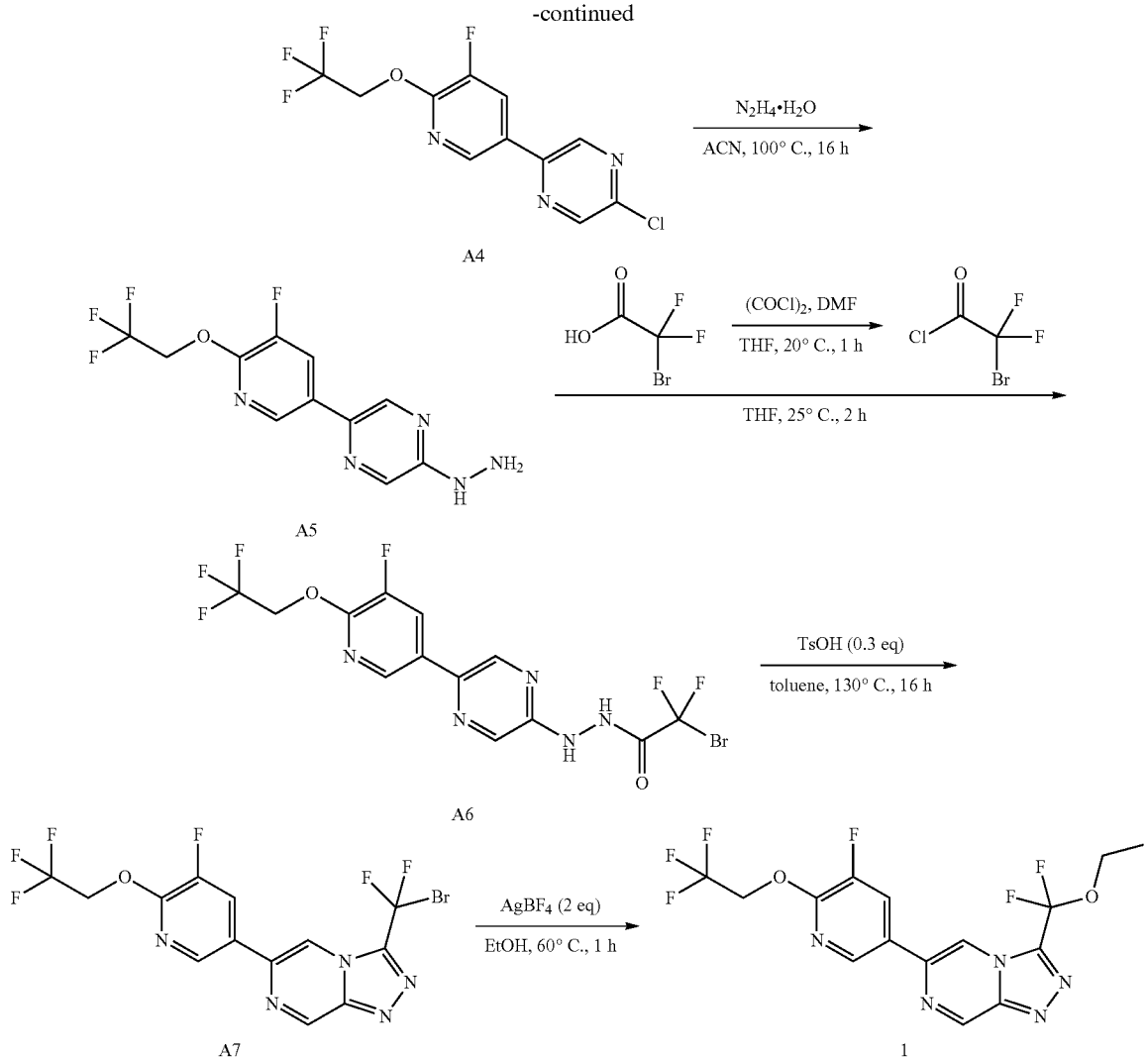

Synthesis of A2: To a stirred solution of 2,2,2-trifluoroethanol (5.67 g, 56.71 mmol) in THF (200 mL) at 0° C. was added NaH (60a in mineral oil, 2.26 g, 56.71 mmol) in small portions. The reaction mixture was stirred for 15 m and 5-bromo-2,3-difluoro-pyridine (10.0 g, 51.55 mmol) was added drop-wise. The reaction mixture was slowly warmed to room temperature and stirred for 2 hours. The reaction mixture was cooled to 10° C. and treated with ice water (100 mL). The reaction mixture was extracted with ethyl acetate (2×100 mL). The organic layer was washed with brine (80 mL), dried over anhydrous $Na_2SO_4$ and concentrated. The crude compound was purified by column chromatography on silica gel with 2% ethyl acetate/PE to afford the product (10.5 g, 38.1 mmol, 73% yield). LCMS: 273.9 (M+H) and 276.0 (M+2+H), Rt 2.53 m9 Column: ZORBAX XDB C-m (50×4.6 mm), 3.5 μm Mobile Phase: A: 0.1% HCOOH in water:ACN (95:5), B: ACN; Flow Rate: 1.5 mL/min.

Synthesis of A3: To a stirred solution of 5-bromo-3-fluoro-2-(2,2,2-trifluoroethoxy)pyridine (3.0 g, 10.95 mmol) and bis(pinacolato)diboron (3.61 g, 14.23 mmol) in 1,4-dioxane (30.0 mL) was added potassium acetate (2.15 g, 21.9 mmol). $Pd(dppf)Cl_2 \cdot DCM$ (0.89 g, 1.09 mmol) was added to the reaction mixture under nitrogen atmosphere and heated at 80° C. for 12 hours. The reaction mixture was cooled to room temperature, filtered through Celite and concentrated under reduced pressure. The crude compound was purified by column chromatography on silica gel with 15% ethyl acetate/PE to afford the product (2.0 g, 6.2 mmol, 56% yield). LCMS: 322.1 (M+H), Rt 2.97 min Column: Atlantis dC18(50×4.6 mm), 5 μm Mobile Phase: A: 0.1% HCOOH in water:ACN (95:5), B: ACN; Flow Rate: 1.5 mL/min.

Synthesis of A4: A mixture of $Pd(dppf)Cl_2$ (15.13 g, 20.68 mmol), $Cs_2CO_3$ (269.49 g 827.17 mmol), 3-fluoro-5-(4,4,5,5-tetramethyl-1,3,2-dioxaborolan-2-yl)-2-(2,2,2-trifluoroethoxy)pyridine (141.18 g, 439.69 mmol) and 2-bromo-5-chloro-pyrazine (80 g, 413.59 mmol) in 1,4-Dioxane (1 L) and Water (150 mL) under $N_2$ was stirred at 35° C. for 2 hours. After cooling to room temperature, to the mixture was added water (300 mL) and the mixture was filtered through Celite. After separating, the organic phase was washed with brine (300 mL), dried over anhydrous $Na_2SO_4$, filtered and concentrated to give the crude product. The crude product was re-dissolved in EA/PE=1/3 (500 mL) and then filtered through silica gel mat. The cake was washed with EA/PE=1/3 (500 mL). The combined organic phase was concentrated to give a residue as oil. To the oil was added PE (500 mL) slowly and some solid was obtained. The solid was collected and dried in oven to give the product (100 g, 242.4 mmol, 58% yield) as a solid. LCMS $R_t$=1.28 min in 2.0 min chromatography, 10-80AB, MS ESI calcd. for $C_{11}H_7ClF_4N_3O$ [M+H]$^+$ 308.0, found 307.9.

Synthesis of A5: A mixture of 2-chloro-5-[5-fluoro-6-(2,2,2-trifluoroethoxy)-3-pyridyl]pyrazine (140 g, 339.36 mmol) and hydrazine hydrate (169.88 g, 3393.6 mmol) in MeCN (1.4 L) was stirred at 100° C. for 16 hours. After cooling to room temperature, the mixture was poured into water (4.5 L). Some solid was observed and the solid was collected by filtered. The cake was washed with water (500 mL×2). The solid was re-dissolved in EtOAc (3 L), washed with brine (500 mL×2), dried over anhydrous $Na_2SO_4$, filtered and concentrated to give the crude product (100 g, 329.8 mmol, 97% yield) as a solid. LCMS $R_t$=0.74 min in 1.5 min chromatography, 5-95AB, MS ESI calcd. for $C_{11}H_{10}F_4N_5O$ [M+H]$^+$ 304.1, found 303.9.

Synthesis of A6: To a solution of 2-bromo-2,2-difluoro-acetic acid (87 g, 497.34 mmol) in THF (1 L) was added one drop of DMF and (COCl)$_2$ (50.5 mL, 596.81 mmol). The resulting mixture was stirred at 20° C. for 1 hour. The resulting solution was used into next step directly. To the solution of 2-bromo-2,2-difluoro-acetyl chloride (95.66 g, 494.69 mmol) in THF (1 L) was added [5-[5-fluoro-6-(2,2,2-trifluoroethoxy)-3-pyridyl]pyrazin-2-yl]hydrazine (100 g, 329.79 mmol). The resulting mixture was stirred at 20° C. for 2 hours. To the solution was added water (1 L), extracted with EtOAc (1L×2). The combined organic phase was washed with brine (500 mL×2), dried over anhydrous $Na_2SO_4$, filtered and concentrated to give the crude product (150 g, 326.0 mmol, 98% yield, mixture of mono- and bis-alkylated products) as a solid. LCMS $R_t$=0.92 min in 1.5 min chromatography, 5-95AB, MS ESI calcd. for $C_{13}H_9BrF_6N_5O_2$ [M+H]$^+$ 460.1, found 459.8.

Synthesis of A7: A solution of 2-bromo-2,2-difluoro-N'-[5-[5-fluoro-6-(2,2,2-trifluoroethoxy)-3-pyridyl]pyrazin-2-yl]acetohydrazide (150 g, 325.99 mmol) and TsOH (16.84 g, 97.8 mmol) in Toluene (1.5 L) was stirred at 130° C. for 16 hours. After cooling to room temperature, the mixture was poured into water (2 L), extracted with EtOAc (2L×2). The combined organic phase was washed with brine (1 L×2), dried over anhydrous $Na_2SO_4$, filtered and concentrated to give the crude product. The crude product was purified by chromatography flash on siliga gel (EtOAc in PE=0% to 15% to 30%) to give the product (80 g 181.0 mmol, 55% yield) as oil. $^1$H NMR (CDCl$_3$, 400 MHz) $\delta_H$=9.60 (d, 1H), 8.55 (d, 1H), 8.45 (s, 1H), 8.09 (dd, 1H), 4.93 (q, 2H).

Synthesis of Compound 1: A mixture of 3-[bromo(difluoro)methyl]-6-[5-fluoro-6-(2,2,2-trifluoroethoxy)-3-pyridyl]-[1,2,4]triazolo[4,3-a]pyrazine (76 g, 171.9 mmol) and AgBF$_4$ (66.93 g, 343.81 mmol) in Ethanol (760 mL) was stirred at 60° C. for 1 hour. After cooling to room temperature, the mixture was poured into saturated aqueous NaCl (1 L) and EtOAc (2 L). The mixture was filtered through Celite. After separating, the aqueous layer was extracted with EtOAc (500 mL×2). The combined organic phase was washed with brine (500 mL×2), dried over anhydrous $Na_2SO_4$, filtered and concentrated to give the crude product. The crude product was purified by chromatography flash column on silica gel (EtOAc in PE=0% to 30% to 50%) and then triturated from EtOH (50 mL) to give the product (44.45 g, 109.01 mmol, 63% yield) as a solid. $^1$H NMR (CDCl$_3$ 400 MHz) $\delta_H$=9.52 (d, 1H), 8.49 (dd, 2H), 8.07 (dd, 1H), 4.93 (q, 2H), 4.37 (q, 2H), 1.51 (t, 3H). LCMS $R_t$=1.25 min in 2.0 min chromatography, 10-80AB, MS ESI calcd. for $C_{15}H_{12}F_6N_5O_2$ [M+H]$^+$ 408.1, found 408.0.

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

The invention claimed is:

1. A process for making Compound 1 of the following formula:

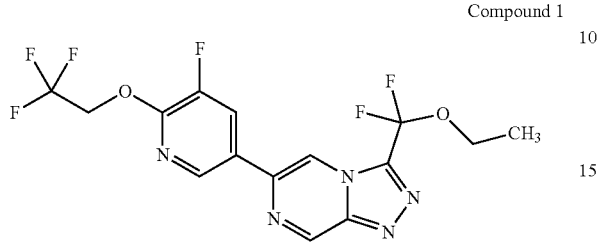
Compound 1 wherein the process comprises the following steps:

(i) contacting a solution of 2,2,2-trifluoroethanol with 5-bromo-2,3-difluoropyridine, thereby providing a compound of formula (II):

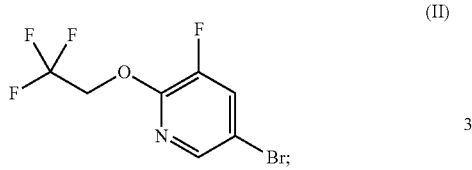
(II)

(ii) contacting the compound of formula (II) provided in step (i) above with a palladium catalyst and bis(pinacoloto)diboron, thereby providing a compound of formula (III):

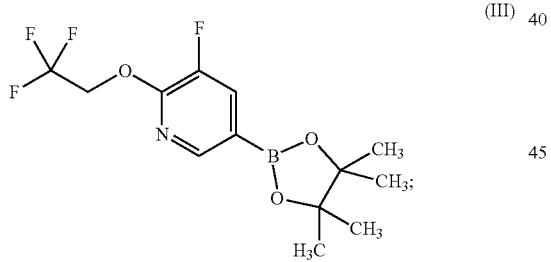
(III)

(iii) contacting the compound of formula (III) provided in step (ii) above with a palladium catalyst and 2-bromo-5-chloropyrazine, thereby providing a compound of formula (IV):

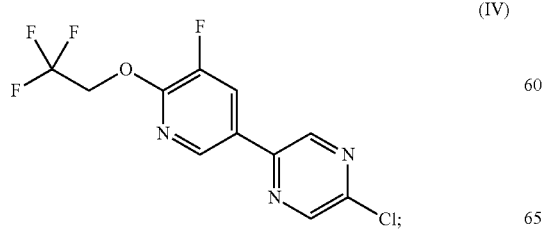
(IV)

(iv) contacting the compound of formula (IV) provided in step (iii) above with hydrazine, thereby providing a compound of formula (V):

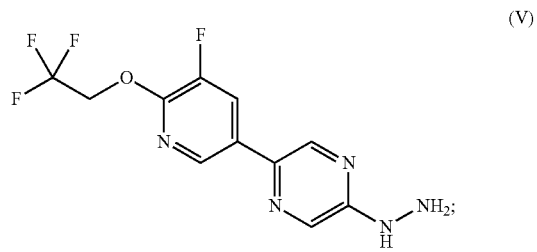 [SMILES: NNc1cnc(-c2cnc(OCC(F)(F)F)c(F)c2)cn1]
(V)

(v) contacting the compound of formula (V) provided in step (iv) above with 2-bromo-2,2-difluoroacetyl chloride, thereby providing a compound of formula (VI):

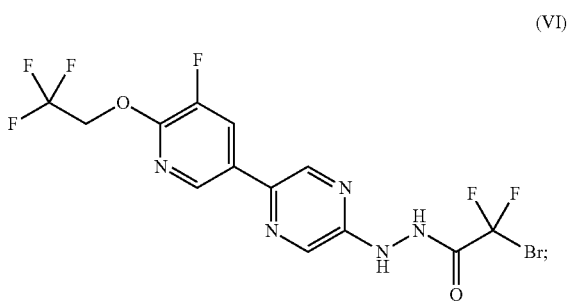 [SMILES: O=C(NNc1cnc(-c2cnc(OCC(F)(F)F)c(F)c2)cn1)C(F)(F)Br]
(VI)

(vi) contacting the compound of formula (VI) provided in step (v) above with an acid, thereby providing a compound of formula (VII):

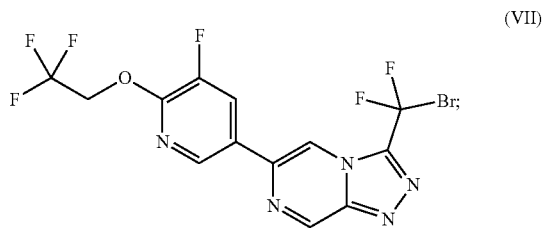 [SMILES: Fc1cc(-c2cn3c(C(F)(F)Br)nnc3cn2)cnc1OCC(F)(F)F]
(VII)

and (vii) contacting the compound of formula (VII) provided in step (vi) above with a silver catalyst and ethanol, thereby providing Compound 1 above.

2. The process of claim 1, wherein the silver catalyst in step (vii) is silver tetrafluoroborate.

3. The process of claim 1, wherein the acid in step (vi) is p-toluenesulfonic acid.

4. The process of claim 1, wherein the palladium catalyst in step (ii) is [1,1'-bis(diphenylphosphino)ferrocene]palladium(II) dichloride.

5. The process of claim 1, wherein the palladium catalyst in step (iii) is [1,1'-bis(diphenylphosphino)ferrocene]palladium(II) dichloride.

6. The process of claim 1, wherein:
(a) the palladium catalyst in step (ii) is [1,1'-bis(diphenylphosphino)ferrocene]palladium(II) dichloride;
(b) the palladium catalyst in step (iii) is [1,1'-bis(diphenylphosphino)ferrocene]palladium(II) dichloride;
(c) the acid in step (vi) is p-toluenesulfonic acid; and
(d) the silver catalyst in step (vii) is silver tetrafluoroborate.

\* \* \* \* \*